(12) United States Patent
Lorentz et al.

(10) Patent No.: US 12,433,293 B2
(45) Date of Patent: Oct. 7, 2025

(54) HERBICIDAL COMPOSITIONS

(71) Applicant: BAYER AKTIENGESELLSCHAFT, Leverkusen (DE)

(72) Inventors: Lothar Lorentz, Waldbroel (DE); Klaus Bernhard Haaf, Kelkheim (DE); Klaus Trabold, Heidelberg (DE); Hubert Menne, Mainz-Kastel (DE); Elmar Gatzweiler, Bad Nauheim (DE); Christopher Hugh Rosinger, Hofheim (DE)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 805 days.

(21) Appl. No.: 17/624,108

(22) PCT Filed: Jun. 26, 2020

(86) PCT No.: PCT/EP2020/068003
§ 371 (c)(1),
(2) Date: Dec. 30, 2021

(87) PCT Pub. No.: WO2021/001273
PCT Pub. Date: Jan. 7, 2021

(65) Prior Publication Data
US 2022/0386605 A1 Dec. 8, 2022

(30) Foreign Application Priority Data

Jul. 4, 2019 (EP) ..................................... 19184436

(51) Int. Cl.
*A01N 43/26* (2006.01)
*A01P 13/00* (2006.01)
(52) U.S. Cl.
CPC .............. *A01N 43/26* (2013.01); *A01P 13/00* (2021.08)

(58) Field of Classification Search
CPC ................................ A01N 43/80; A01P 13/00
See application file for complete search history.

(56) References Cited

U.S. PATENT DOCUMENTS 9,078,442 B2 * 7/2015 Willms ................... A01N 43/40
9,516,880 B2 * 12/2016 Haaf ........................ A61P 17/00
2020/0369630 A1 11/2020 Lindell et al.

FOREIGN PATENT DOCUMENTS

WO WO-2012130798 A1 * 10/2012 ............ A01N 25/32
WO WO-2019034602 A1 * 2/2019 ............ A01N 43/80
WO 2019145245 A1 8/2019

* cited by examiner

*Primary Examiner* — Craig D Ricci
*Assistant Examiner* — Paul Hoerner
(74) *Attorney, Agent, or Firm* — Paul D. Tietz; Michael Van Engelen

(57) ABSTRACT

The present invention provides compositions comprising herbicidally active compounds (A) and (B), wherein (A) represents one or more compounds of the general formula (I) or agrochemically acceptable salts thereof [component (A)],

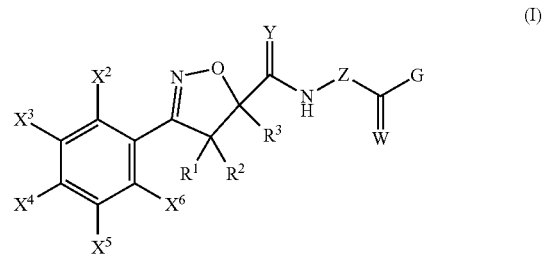

(I)

and (B) represents one or more herbicides [component (B)]. The application further relates to a method and to the use of the herbicidal composition of the invention for controlling harmful plants or for regulating growth.

5 Claims, No Drawings

HERBICIDAL COMPOSITIONS

CROSS-REFERENCE TO RELATED APPLICATIONS

This application is the National Stage entry of International Application No. PCT/EP2020/068003, filed 26 Jun. 2020, which claims priority to European Patent Application No. 19184436.4, filed 4 Jul. 2019.

BACKGROUND

Field

The invention is in the technical field of crop protection products that can be used to counter unwanted plant growth on uncultivated land, for preparation for seeding or in plant crops, and comprise a combination of at least two herbicides as herbicidally active ingredients, wherein the compositions comprise herbicidally active compounds (A) and (B), in which (A) represents one or more compounds of the general formula (I) or agrochemically acceptable salts thereof [herbicides (A) or component (A)] and (B) represents one or more herbicides (component B).

Description of Related Art

Compounds from the structure class of the 3-phenylisoxazoline-5-carboxamides are known as herbicides (see, for example, WO2012/130798 A). The compounds are effective against a broad spectrum of harmful plants when applied by the pre-emergence method or else by the post-emergence method, with the possibility of non-selective use for control of unwanted plant growth or selective use in plant crops.

The efficacy of these herbicides against harmful plants is at a high level, but generally depends on the application rate, the form of the respective preparation, the spectrum of harmful plants, the harmful plants to be controlled in each case, climate and soil conditions, etc. A further criterion is the duration of action or the rate of degradation of the herbicide. Other considerations, as the case may be, are changes in the susceptibility of harmful plants which may occur on prolonged use of the herbicides or in a geographically restricted manner. Compensation for losses in action in the case of individual plants by higher application rates of the herbicides is only possible to a limited degree, for example because this frequently worsens the selectivity of the herbicides or because there is no improvement in action, even in the case of a higher application rate. There is generally need for methods of achieving herbicidal action with a lower application rate of active ingredients. A lower application rate not only reduces the amount of active ingredient required for the application but generally also reduces the amount of formulation auxiliaries needed. Both reduce economic expenditure and improve the environmental compatibility of the herbicide treatment.

One way of improving the application profile of a herbicide may be to combine the active ingredient with one or more other active ingredients which contribute the desired additional properties. However, in the case of combined application of two or more active ingredients, it is not uncommon for there to be phenomena of physical and biological incompatibility, for example lack of stability in a coformulation, decomposition of an active ingredient and/or antagonism of the active ingredients. What are desired, by contrast, are combinations of active ingredients having a favourable profile of activity, high stability and ideally an unexpectedly synergistically enhanced activity which allows the application rate to be reduced compared to the individual application of the active ingredients to be combined.

SUMMARY

It is an object of the present invention to provide alternative or advantageous herbicidal compositions that have a good profile of biological use and have as many as possible of the abovementioned desirable favourable properties.

It has now been found that, surprisingly, this object can be achieved by using a composition comprising herbicidally active compounds (A) and (B), wherein (A) represents one or more compounds of the general formula (I) or agrochemically acceptable salts thereof [component (A)] and (B) represents one or more herbicides [component (B)] selected from the group of the active herbicidal ingredients (B1) to (B11).

The compositions of the invention interact in a particularly favourable manner, for example when they are used to control unwanted plant growth in crop plants such as wheat (hard and soft wheat), maize, soya, sugarbeet, sugarcane, cotton, rice, beans (for example, bush beans and broad beans), flax, barley, oats, rye, triticale, potato and millet/sorghum, uncultivated land, pastureland and areas of grass/lawn and plantation crops.

The present invention thus provides compositions comprising herbicidally active compounds (A) and (B), where (A) represents one or more compounds of the general formula (I) or agrochemically acceptable salts thereof [component (A)],

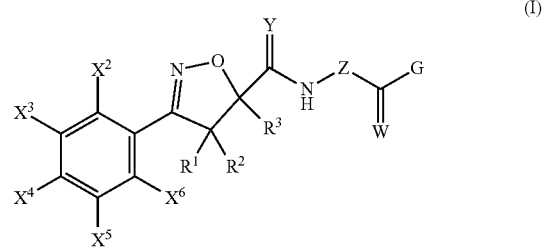

(I)

in which

G is a group of the formula $OR^4$ or $NR^{11}R^{12}$;

$R^1$ and $R^2$ are each independently hydrogen, halogen or cyano, or are $(C_1-C_4)$-alkyl or $(C_1-C_4)$-alkoxy, each substituted by m radicals from the group consisting of halogen and cyano;

$R^3$ is cyano or fluorine, or is $(C_1-C_5)$-alkyl, $(C_3-C_6)$-cycloalkyl, $(C_2-C_5)$-alkenyl, $(C_2-C_5)$-alkynyl or $(C_1-C_5)$-alkoxy, each substituted by m radicals from the group consisting of halogen, cyano, $(C_1-C_5)$-alkoxy and hydroxy;

$R^4$ is hydrogen, or is $(C_1-C_{12})$-alkyl, $(C_3-C_7)$-cycloalkyl, $(C_3-C_7)$-cycloalkyl-$(C_1-C_8)$-alkyl, $(C_2-C_8)$-alkenyl, $(C_5-C_6)$-cycloalkenyl or $(C_2-C_8)$-alkynyl, each substituted by m radicals from the group consisting of halogen, cyano, $(C_1-C_6)$-alkoxy, hydroxy and aryl;

Y is oxygen or sulfur;
W is oxygen or sulfur;
Z represents a monounsaturated cyclopentane ring substituted by k radicals from the group of $R^{10}$,

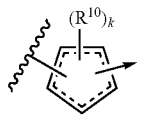

where the arrow in each case represents a bond to the C=W group in the formula (I);
$R^{10}$ is halogen, cyano or $CO_2R^7$,
or
is $(C_1-C_2)$-alkyl or $(C_1-C_2)$-alkoxy, each substituted by m radicals from the group consisting of fluorine and chlorine;
$R^{11}$, $R^{12}$ are each independently hydrogen, cyano, $OR^7$, $S(O)_nR^5$, $SO_2NR^6R^7$, $CO_2R^8$, $CONR^6R^8$, $COR^6$, $NR^6R^8$, $NR^6COR^8$, $NR^6CONR^8R^8$, $NR^6CO_2R^8$, $NR^6SO_2R^8$, $NR^6SO_2NR^6R^8$, $C(R^6)=NOR^8$, optionally substituted aryl, optionally substituted heteroaryl or optionally substituted heterocyclyl,
or
are $(C_1-C_{12})$-alkyl, $(C_3-C_8)$-cycloalkyl, $(C_3-C_7)$-cycloalkyl-$(C_1-C_7)$-alkyl, $(C_2-C_{12})$-alkenyl, $(C_5-C_7)$-cycloalkenyl or $(C_2-C_{12})$-alkynyl, each substituted by m radicals from the group consisting of halogen, cyano, nitro, $OR^7$, $S(O)_nR^5$, $SO_2NR^6R^7$, $CO_2R^8$, $CONR^6R^8$, $COR^6$, $NR^6R^8$, $NR^6COR^8$, $NR^6CONR^8R^8$, $NR^6CO_2R^8$, $NR^6SO_2R^8$, $NR^6SO_2NR^6R^8$, $C(R^6)=NOR^8$, optionally substituted aryl, optionally substituted heteroaryl and optionally substituted heterocyclyl,
or
$R^{11}$ and $R^{12}$ together with the nitrogen atom to which they are bonded form a saturated or partly or fully unsaturated five-, six- or seven-membered ring which is optionally mono- to hexasubstituted by radicals from the group consisting of halogen, cyano, nitro, $(C_1-C_6)$-alkyl, halo-$(C_1-C_6)$-alkyl, oxo, $OR^7$, $S(O)_nR^5$, $SO_2NR^6R^7$, $CO_2R^8$, $CONR^6R^8$, $COR^6$, $NR^6R^8$, $NR^6COR^8$, $NR^6CONR^8R^8$, $NR^6CO_2R^8$, $NR^6SO_2R^8$, $NR^6SO_2NR^6R^8$ and $C(R^6)=NOR^8$ and which, in addition to that nitrogen atom, contains r carbon atoms, o oxygen atoms, p sulfur atoms and q elements from the group consisting of $NR^7$ and $NCOR^7$ as ring atoms;
$X^2$, $X^4$ and $X^6$ are each independently hydrogen, halogen or cyano,
or
are $(C_1-C_2)$-alkyl, in each case substituted by m radicals from the group consisting of fluorine, chlorine, bromine and $(C_1-C_2)$-alkoxy;
$X^3$ and $X^5$ are each independently hydrogen, fluorine, chlorine, bromine, iodine, hydroxy, cyano, nitro, $S(O)_nR^6$ or $CO_2R^7$,
or
are $(C_1-C_3)$-alkyl, $(C_1-C_3)$-alkoxy, $(C_3-C_4)$-cycloalkyl, $(C_2-C_3)$-alkenyl or $(C_2-C_3)$-alkynyl, each substituted by m radicals from the group consisting of fluorine, chlorine and bromine;
$R^5$ is $(C_1-C_8)$-alkyl, $(C_3-C_6)$-cycloalkyl or aryl, each substituted by m radicals from the group consisting of halogen, cyano and hydroxy;

$R^6$ is hydrogen or $R^5$; $R^7$ is hydrogen,
or
is $(C_1-C_6)$-alkyl, $(C_3-C_6)$-cycloalkyl, $(C_3-C_4)$-alkenyl or $(C_3-C_4)$-alkynyl, each substituted by m radicals from the group consisting of halogen, cyano and $(C_1-C_2)$-alkoxy;
$R^8$ is hydrogen,
or
is $(C_1-C_8)$-alkyl, $(C_3-C_6)$-cycloalkyl, $(C_3-C_8)$-alkenyl or $(C_3-C_8)$-alkynyl, each substituted by m radicals from the group consisting of halogen, cyano and $(C_1-C_2)$-alkoxy;
the index k is 0, 1 or 2; where, when k>1, $R^{10}$ may independently be the same or different;
the index m is 0, 1, 2, 3, 4 or 5;
the index n is 0, 1 or 2;
the index o is 0, 1 or 2;
the index p is 0 or 1;
the index q is 0 or 1; and
the index r is 3, 4, 5 or 6.
and
(B) represents one or more herbicides [component (B)] from the group of the active herbicidal ingredients (B1) to (B11), in which
(B1) represents active herbicidal ingredients from the group of the 1,3-diketo compounds selected from

| (B1.1) | alloxydim, | (CAS 55634-91-8), (CAS 55635-13-7) |
|---|---|---|
| (B1.2) | bicyclopyrone, | (CAS 352010-68-5) |
| (B1.3) | butroxydim, | (CAS 138164-12-2) |
| (B1.4) | clethodim, | (CAS 99129-21-2) |
| (B1.5) | cycloxydim, | (CAS 101205-02-1) |
| (B1.6) | fenquinotrione, | (CAS 1342891-70-6) |
| (B1.7) | mesotrione, | (CAS 104206-82-8) |
| (B1.8) | pinoxaden, | (CAS 243973-20-8) |
| (B1.9) | profoxydim, | (CAS 139001-49-3) |
| (B1.10) | sethoxydim, | (CAS 74051-80-2) |
| (B1.11) | sulcotrione, | (CAS 99105-77-8) |
| (B1.12) | SYP-9121 | (CAS 1976053-87-8) |
| (B1.13) | tefuryltrione, | (CAS 473278-76-1) |
| (B1.14) | tembotrione, | (CAS 335104-84-2) |
| (B1.15) | tepraloxydim, | (CAS 149979-41-9) |
| (B1.16) | tralkoxydim, | (CAS 87820-88-0) |
| (B1.17) | Y13161, | (CAS 1639426-14-4) |
| (B1.18) | Y13287; | (CAS 1639426-42-8) |

(B2) represents active herbicidal ingredients from the group of the (sulfon)amides selected from

| (B2.1) | acetochlor, | |
|---|---|---|
| (B2.2) | alachlor, | (CAS 15972-60-8) |
| (B2.3) | amidosulfuron, | (CAS 120923-37-7) |
| (B2.4) | asulam, | (CAS 3337-71-1) (CAS 14089-43-1), (CAS 2302-17-2) |
| (B2.5) | azimsulfuron, | (CAS 120162-55-2) |
| (B2.6) | beflubutamid, | (CAS 113614-08-7), (CAS 113614-09-8) |
| (B2.7) | bensulfuron, | (CAS 83055-99-6), (CAS 83055-99-6) |
| (B2.8) | butachlor, | (CAS 23184-66-99) |
| (B2.9) | carbetamide, | (CAS 16118-49-3) |
| (B2.10) | chlorimuron, | (CAS 99283-00-8), (CAS 90982-32-4), |
| (B2.11) | chlorpropham, | (CAS 101-21-3) |
| (B2.12) | chlorsulfuron, | (CAS 64902-72-3) |
| (B2.13) | cinosulfuron, | (CAS 94593-91-6) |
| (B2.14) | cloransulam, | (CAS159518-97-5), (CAS 147150-35-4) |
| (B2.15) | cyclosulfamuron, | (CAS 136849-15-5) |
| (B2.16) | desmedipham, | (CAS 13684-56-5) |
| (B2.17) | diclosulam, | (CAS 145701-21-9) |
| (B2.18) | diflufenican, | (CAS 83164-33-4) |
| (B2.19) | dimethachlor, | (CAS 50563-36-5) |
| (B2.20) | dimethenamid, | (CAS 87674-68-8), (CAS 163515-14-8) |
| (B2.21) | esprocarb | (CAS 85785-20-2) |
| (B2.22) | ethametsulfuron, | (CAS 111353-84-5), (CAS 97780-06-8) |
| (B2.23) | ethoxysulfuron, | (CAS 126801-58-9) |

-continued

| | | |
|---|---|---|
| (B2.24) | flazasulfuron, | (CAS 104040-78-0) |
| (B2.25) | florasulam, | (CAS 145701-23-1) |
| (B2.26) | flucarbazone, | (CAS 145026-88-6), (CAS 181274-17-9) |
| (B2.27) | flucetosulfuron, | (CAS 412928-75-7) |
| (B2.28) | flufenacet, | (CAS 142459-58-3) |
| (B2.29) | flumetsulam, | (CAS 98967-40-9) |
| (B2.30) | flupyrsulfuron, | (CAS 150315-10-9), (CAS 144740-53-4), (CAS 144740-54-5) |
| (B2.31) | foramsulfuron, | (CAS 173159-57-4) |
| (B2.32) | halosulfuron, | (CAS 135397-30-7), (CAS 100784-20-1) |
| (B2.33) | imazosulfuron, | (CAS 122548-33-8) |
| (B2.34) | iodosulfuron, | (CAS 185119-76-0), (CAS 144550-06-1), (CAS 144550-36-7) |
| (B2.35) | ipfencarbazone, | (CAS 212201-70-2) |
| (B2.36) | mefenacet, | (CAS 73250-68-7) |
| (B2.37) | mesosulfuron, | (CAS 400852-66-6), (CAS 208465-21-8) |
| (B2.38) | metazachlor, | (CAS 67129-08-2) |
| (B2.39) | metazosulfuron, | (CAS 868680-84-6) |
| (B2.40) | metolachlor, | (CAS 51218-45-2) |
| (B2.41) | metosulam, | (CAS 139528-85-1) |
| (B2.42) | metsulfuron, | (CAS 79510-48-8), (CAS 74223-64-6) |
| (B2.43) | nicosulfuron, | (CAS 111991-09-4) |
| (B2.44) | orthosulfamuron, | (CAS 213464-77-8) |
| (B2.45) | oxasulfuron, | (CAS 144651-06-9) |
| (B2.46) | penoxsulam, | (CAS 219714-96-2) |
| (B2.47) | pethoxamide, | (CAS 106700-29-2) |
| (B2.48) | phenmedipham, | (CAS 13684-63-4) |
| (B2.49) | picolinafen, | (CAS 137641-05-5) |
| (B2.50) | pretilachlor, | (CAS 51218-49-6) |
| (B2.51) | primisulfuron, | (CAS 113036-87-6), (CAS 86209-51-0) |
| (B2.52) | propachlor, | (CAS 1918-16-7) |
| (B2.53) | propanil, | (CAS 709-98-8) |
| (B2.54) | propham, | (CAS 122-42-9) |
| (B2.55) | propisochlor, | (CAS 86763-47-5) |
| (B2.56) | propoxycarbazone, | (CAS 145026-81-9), (CAS 181274-15-7) |
| (B2.57) | propyrisulfuron, | (CAS 570415-88-2) |
| (B2.58) | propyzamide, | (CAS 23950-58-5) |
| (B2.59) | prosulfocarb, | (CAS 52888-80-9) |
| (B2.60) | prosulfuron, | (CAS 94125-34-5) |
| (B2.61) | pyrazosulfuron, | (CAS 98389-04-9), (CAS 93697-74-6) |
| (B2.62) | pyroxsulam, | (CAS 422556-08-9) |
| (B2.63) | rimsulfuron, | (CAS 122931-48-0) |
| (B2.64) | S-metolachlor, | (CAS 87392-12-9) |
| (B2.65) | sulfometuron, | (CAS 74223-56-6), (CAS 74222-97-2), (CAS 144651-06-9) |
| (B2.66) | sulfosulfuron, | (CAS 141776-32-1) |
| (B2.67) | thenylchlor, | (CAS 96491-05-3) |
| (B2.68) | thiencarbazone, | (CAS 936331-72-5), (CAS 317815-83-1) |
| (B2.69) | thifensulfuron, | (CAS 79277-67-1), (CAS 79277-27-3) |
| (B2.70) | tri-allate, | (CAS 2303-17-5) |
| (B2.71) | triasulfuron, | (CAS 82097-50-5) |
| (B2.72) | tribenuron, | (CAS 106040-48-6), (CAS 101200-48-0) |
| (B2.73) | trifloxysulfuron, | (CAS 145099-21-4, (CAS 199119-58-9) |
| (B2.74) | triflusulfuron, | (CAS 135990-29-3), (CAS 126535-15-7) |
| (B2.75) | tritosulfuron, | (CAS 142469-14-5) |
| (B2.76) | esprocarb, | (CAS 85785-20-2) |
| (B2.77) | profluazol, | (CAS 190314-43-3) |
| (B2.78) | tri-allate; | (CAS 2303-17-5) |

(B3) represents active herbicidal ingredients from the group of the aryl nitriles selected from

| | | |
|---|---|---|
| (B3.1) | bromoxynil, | (CAS 1689-84-5) (CAS 3861-41-4), (CAS 56634-95-8), (CAS 1689-99-2), (CAS 2961-68-4) |
| (B3.2) | chlorthiamid, | (CAS 1918-13-4) |
| (B3.3) | dichlobenil, | (CAS 1194-65-6) |
| (B3.4) | ioxynil, | (CAS 1689-83-4), (CAS 2961-61-7), (CAS 3861-47-0), (CAS 2961-62-8) |
| (B3.5) | pyraclonil; | (CAS 158353-15-2) |

(B4) represents active herbicidal ingredients from the group of the azoles selected from

| | | |
|---|---|---|
| (B4.1) | amicarbazone, | |
| (B4.2) | amitrole, | (CAS 61-82-5) |
| (B4.3) | azafenidin, | (CAS 68049-83-2) |
| (B4.4) | benzofenap, | (CAS 82692-44-2) |
| (B4.5) | benzuofucaotong, | (CAS 1992017-55-6) |
| (B4.6) | biscarfentrazone, | (CAS 1622908-18-2) |
| (B4.7) | cafenstrole, | (CAS 125306-83-4) |
| (B4.8) | carfentrazone, | (CAS 128621-72-7), (CAS128639-02-1) |
| (B4.9) | fentrazamide, | (CAS 158237-07-1) |
| (B4.10) | imazamethabenz, | (CAS 100728-84-5), (CAS 81405-85-8) |
| (B4.11) | imazamox, | (CAS 114311-32-9), (CAS 247057-22-3) |
| (B4.12) | imazapic, | (CAS 104098-48-8), (CAS 115136-53-3) |
| (B4.13) | imazapyr, | (CAS 81334-34-1), (CAS 81510-83-0) |
| (B4.14) | imazaquin, | (CAS 81335-37-7), (CAS 81335-47-9), (CAS 81335-43-5), (CAS 81335-46-8) |
| (B4.15) | imazethapyr, | (CAS 81335-77-5), (CAS 101917-66-2) |
| (B4.16) | isouron, | (CAS 55861-78-4) |
| (B4.17) | isoxaben, | (CAS 82558-50-7) |
| (B4.18) | isoxaflutole, | (CAS 141112-29-0) |
| (B4.19) | oxadiargyl, | (CAS 39807-15-3) |
| (B4.20) | oxadiazon, | (CAS 19666-30-9) |
| (B4.21) | pyraflufen, | (CAS 129630-17-7), (CAS 129630-19-9) |
| (B4.22) | pyrasulfotole, | (CAS 365400-11-9) |
| (B4.23) | pyrazolynate, | (CAS 58011-68-0) |
| (B4.24) | pyrazoxyfen, | (CAS 71561-11-0) |
| (B4.25) | pyroxasulfone, | (CAS 447399-55-5) |
| (B4.26) | sulfentrazone, | (CAS 122836-35-5) |
| (B4.27) | tolpyralate, | (CAS 1101132-67-5) |
| (B4.28) | topramezone, | (CAS 210631-68-8) |
| (B4.29) | triazolesulcotrione (QYR-301), | (CAS 1911613-97-2) |
| (B4.30) | QYM-201, | (CAS 1855925-45-1) |
| (B4.31) | bencarbazone, | (CAS 173980-17-1) |
| (B4.32) | fluazolate, | (CAS 174514-07-9) |
| (B4.33) | flupoxam, | (CAS 119126-15-7) |
| (B4.34) | isoxachlortole; | (CAS 141112-06-3) |

(B5) represents further active herbicidal ingredients selected from

| | | |
|---|---|---|
| (B5.1) | aminocyclo-pyrachlor, | (CAS 858956-08-8), (CAS 858954-83-3), (CAS 858956-35-1) |
| (B5.2) | aminopyralid, | (CAS 150114-71-9), (CAS 566191-87-5), (CAS 566191-89-7) |
| (B5.3) | benazolin-ethyl, | (CAS 3813-05-6), (CAS 38561-76-1), (CAS 25059-80-7), (CAS 67338-65-2) |
| (B5.4) | benfluralin, | (CAS 1861-40-1) |
| (B5.5) | bentazone, | (CAS 25057-89-0), (CAS 50723-80-3) |
| (B5.6) | benzobicyclon, | (CAS 156963-66-5) |
| (B5.7) | bixlozone, | (CAS 81777-95-9) |
| (B5.8) | bromofenoxim, | (CAS 13181-17-4) |
| (B5.9) | butralin, | (CAS 33629-47-9) |
| (B5.10) | chloridazon/pyrazon, | (CAS 1698-60-8) |
| (B5.11) | chlorthal, | (CAS 2136-79-0), (CAS 1861-32-1), (CAS 887-54-7) |
| (B5.12) | cinidon-ethyl, | (CAS 142891-20-1) |
| (B5.13) | cinmethylin, | (CAS 87818-31-3) |
| (B5.14) | clomazone, | (CAS 81777-89-1) |
| (B5.15) | cyclopyrimorate, | (CAS 499231-24-2) |
| (B5.16) | dinitramine, | (CAS 29091-05-2) |
| (B5.17) | diquat, | (CAS 2764-72-9), (CAS 85-00-7), (CAS 4032-26-2) |
| (B5.18) | dithiopyr, | (CAS 97886-45-8) |
| (B5.19) | acetic acid, | (CAS 64-19-7) |
| (B5.20) | ethalfluralin, | (CAS 55283-68-6) |
| (B5.21) | ethofumesate, | (CAS 26225-79-6) |
| (B5.22) | flamprop, | (CAS 58667-63-3, (CAS 90134-59-1), (CAS 63782-90-1), (CAS 63729-98-6) |
| (B5.23) | florpyrauxifen, | (CAS 943832-81-3), (CAS 1390661-72-9) |
| (B5.24) | flufenpyr, | (CAS 188490-07-5), (CAS 188489-07-8) |
| (B5.25) | flumiclorac, | (CAS 87547-04-4), (CAS 87546-18-7) |
| (B5.26) | flumioxazin, | (CAS 103361-09-7) |
| (B5.27) | fluridone, | (CAS 59756-60-4) |

| | | |
|---|---|---|
| (B5.28) | flurochloridone, | (CAS 61213-25-0) |
| (B5.29) | flurtamone, | (CAS 96525-23-4) |
| (B5.30) | fluthiacet-methyl, | (CAS 149253-65-6) |
| (B5.31) | halauxifen, | (CAS 943832-60-8), (CAS 943831-98-9) |
| (B5.32) | indanofan, | (CAS 13320-30-1) |
| (B5.33) | norflurazon, | (CAS 27314-13-2) |
| (B5.34) | oleic acid, | (CAS 112-80-1) |
| (B5.35) | oryzalin, | (CAS 19044-88-3) |
| (B5.36) | oxaziclomefone, | (CAS 153197-14-9) |
| (B5.37) | paraquat, | (CAS 4685-14-7), (CAS 1910-42-5), (CAS 2074-50-2) |
| (B5.38) | pelargonic acid, | (CAS 112-05-0) |
| (B5.39) | pendimethalin, | (CAS 40487-42-1) |
| (B5.40) | pentoxazone, | (CAS 110956-75-7) |
| (B5.41) | pyridafol, | (CAS 40020-01-7) |
| (B5.42) | pyridate, | (CAS 55512-33-9) |
| (B5.43) | tetflupyrolimet, | (CAS 2053901-33-8) |
| (B5.44) | thiazopyr, | (CAS 117718-60-2) |
| (B5.45) | triafamone, | (CAS 874195-61-6) |
| (B5.46) | trifluralin, | (CAS 1582-09-8) |
| (B5.47) | 4-amino-3-chloro-5-fluoro-6-(7-fluoro-1H-indol-6-yl)pyridine-2-carboxylic acid, | |
| (B5.48) | cyclopyrimorate, | (CAS 499231-24-2) |
| (B5.49) | diquat, | (CAS 2764-72-9, CAS 85-00-7, CAS4032-26-2) |
| (B5.50) | oxaziclomefone, | (CAS 153197-14-9) |
| (B5.51) | pentanochlor, | (CAS 2307-68-8) |
| (B5.52) | tebutam, | (CAS 35256-85-0) |
| (B5.53) | thidiazimin; | (CAS 123249-43-4) |

(B6) represents active herbicidal ingredients from the group of the (het)arylcarboxylic acids selected from

| | | |
|---|---|---|
| (B6.1) | chloramben, | (CAS 133-90-4), (CAS 1076-46-6), (CAS 53404-16-3), (CAS 7286-84-2), (CAS 25182-03-0), (1954-81-0) |
| (B6.2) | clopyralid, | (CAS 1702-17-6), (CAS 1532-24-7), (CAS 57754-85-5), (CAS 58509-83-4), (CAS 73455-09-1) |
| (B6.3) | dicamba, | (CAS 1918-00-9), (CAS 1286239-22-2), (CAS 104040-79-1), (CAS 2300-66-5), (CAS 25059-78-3), (CAS 55871-02-8), (CAS 6597-78-0), (CAS 53404-28-7), (CAS 10007-85-9), (CAS 1982-69-0), (53404-29-8), (CAS 56141-00-5) |
| (B6.4) | fluroxypyr, | (CAS 69377-81-7), (CAS -27-8), (CAS 81406-37-3) |
| (B6.5) | picloram, | (CAS 1918-02-1), (CAS 55870-98-9), (CAS 36374-99-9), (CAS 26952-20-5), (CAS 14143-55-6), (CAS 55871-00-6), (CAS 2545-60-0), (CAS 35832-11-2), (CAS 6753-47-5), (CAS 82683-78-1) |
| (B6.6) | quinclorac, | (CAS 84087-01-4), (CAS 84087-48-9), (CAS 84087-33-2) |
| (B6.7) | quinmerac, | (CAS 90717-03-6) |
| (B6.8) | TBA, | (CAS 50-31-7), (CAS 3426-62-8), (CAS 71750-37-3), (CAS 4559-30-2), (CAS 2078-42-4) |
| (B6.9) | trichlopyr; | (CAS 55335-06-3), (CAS [64700-56-7), (CAS 1048373-85-8), (CAS 60825-27-6), (CAS 57213-69-1) |

(B7) represents active herbicidal ingredients from the group of the organic phosphorus compounds selected from

| | | |
|---|---|---|
| (B7.1) | anilofos, | (CAS 64249-01-0) |
| (B7.2) | bialaphos, | (CAS 35597-43-4), (CAS 71048-99-2) |
| (B7.3) | butamifos, | (CAS 36335-67-8) |
| (B7.4) | glufosinate, | (CAS 51276-47-2), (CAS 35597-44-5), (CAS 77182-82-2), (CAS 35597-44-5), (CAS 70033-13-5) |
| (B7.5) | glyphosate, | (CAS 1071-83-6), (CAS 69254-40-6), (CAS 34494-04-7), (CAS 38641-94-0), (CAS 40465-66-5), (CAS 39600-42-5), (CAS 70393-85-0), (CAS 81591-81-3) |
| (B7.6) | piperophos, | (CAS 24151-93-7) |
| (B7.7) | sulfosate, | (CAS 1591-81-3) |
| (B7.8) | amiprofos; | (CAS 33857-23-7, CAS 36001-88-4) |

(B8) represents active herbicidal ingredients from the group of the phenyl ethers selected from

| | | |
|---|---|---|
| (B8.1) | 2,4-D, | (CAS 94-75-7), (CAS 2307-55-3), (CAS 1929-73-3), (CAS 1320-18-9), (CAS 1928-45-6), (CAS 94-80-4), (CAS 1048373-72-3), (CAS 20940-37-8), (CAS 2008-39-1), (CAS 5742-19-8), (CAS 2212-54-6), (CAS 533-23-3), (CAS 1928-43-4), (CAS 37102-63-9), (CAS 713-15-1), (CAS 25168-26-7), (CAS 94-11-1), (CAS 5742-17-6), (CAS 3766-27-6), (CAS 1917-97-1), (CAS 1928-38-7), (CAS 1928-44-5), (CAS 1917-92-6), (CAS 1928-61-6), (CAS 2702-72-9), (CAS 15146-99-3), (CAS 28685-18-9), (CAS 2646-78-8), (CAS 18584-79-7),(CAS 2569-01-9), (CAS 215655-76-8) |
| (B8.2) | 2,4-DB, | (CAS 94-82-6), (CAS 2758-42-1), (CAS 1320-15-6), (CAS 19480-40-1), (CAS 10433-59-7) |
| (B8.3) | 2,4-DP, | (CAS 120-36-5), (CAS 53404-31-2), (CAS 53404-32-3), (CAS 79270-78-3), (CAS 28631-35-8), (CAS 57153-17-0), (CAS 5746-17-8), (CAS 39104-30-8) |
| (B8.4) | acifluorfen, | (CAS 50594-66-6), (CAS 50594-67-7), (CAS 62476-59-9) |
| (B8.5) | aclonifen, | (CAS 74070-46-5) |
| (B8.6) | bifenox, | (CAS 42576-02-3) |
| (B8.7) | chlomethoxyfen, | (CAS 32861-85-1) |
| (B8.8) | clodinafop-propargyl, | (CAS 114420-56-3 ), (CAS 105512-06-9) |
| (B8.9) | clomeprop, | (CAS 84496-56-0) |
| (B8.10) | cyhalofop, | (CAS 122008-78-0), (CAS 122008-85-9) |
| (B8.11) | diclofop, | (CAS 40843-25-2 ), (CAS 51338-27-3) |
| (B8.12) | ethoxyfen, | (CAS 188634-90-4), (CAS 131086-42-5) |
| (B8.13) | fenoxaprop, | (CAS 95617-09-7 ), (CAS 113158-40-0), (CAS 71283-80-2) |
| (B8.14) | fluazifop, | (CAS 69335-91-7), (CAS 83066-88-0), (CAS 79241-46-6) |
| (B8.15) | fluoroglycofen, | (CAS 77501-60-1), (CAS 77501-90-7) |
| (B8.16) | fomesafen, | (CAS 72178-02-0), (CAS 108731-70-0) |
| (B8.17) | halosafen, | (CAS 77227-69-1) |
| (B8.18) | haloxyfop, | (CAS 69806-34-4), (CAS 95977-29-0), (CAS 72619-32-0) |
| (B8.19) | lactofen, | (CAS 77501-63-4) |
| (B8.20) | MCPA, | (CAS 94-74-6), (CAS 19480-43-4), (CAS 1713-12-8), (CAS 2039-46-5), (CAS 20405-19-0), (CAS 2698-38-6), (CAS 29450-45-1), (CAS 1713-11-7), (CAS 26544-20-7), (CAS 2698-40-0), (CAS 2436-73-9), (CAS 6365-62-4), (CAS 5221-16-9), (CAS 3653-48-3), (CAS 42459-68-7) |
| (B8.21) | MCPB, | (CAS 94-81-5), (CAS 10443-70-6), (CAS 57153-18-1), (CAS 6062-26-6) |
| (B8.22) | mecoprop, | (CAS 93-65-2), (CAS 32351-70-5), (CAS 1432-14-0), (CAS 71526-69-7), (CAS 28473-03-2), (CAS 2786-19-8), (CAS 1929-86-8), (CAS 19095-88-6), (CAS 53404-61-8), (CAS 16484-77-8) |

| | | |
|---|---|---|
| (B8.23) | metamifop, | (CAS 256412-89-2) |
| (B8.24) | oxyfluorfen, | (CAS 42874-03-3) |
| (B8.25) | propaquizafop, | (CAS 111479-05-1) |
| (B8.26) | quizalofop, | (CAS 76578-12-6), (CAS 76578-14-8), |
| (B8.27) | quizalofop-p, | (CAS 94051-08-8), (CAS 100646-51-3), (CAS 200509-41-7) |
| (B8.28) | benzfendizone; | |
| | | (CAS 158755-95-4) |

(B9) represents active herbicidal ingredients from the group of the pyrimidines selected from

| | | |
|---|---|---|
| (B9.1) | bispyrac-sodium, | |
| (B9.2) | bromacil, | (CAS 314-40-9), (CAS 53404-19-6), (CAS 69484-12-4) |
| (B9.3) | butafenacil, | (CAS 134605-64-4) |
| (B9.4) | lenacil, | (CAS 2164-08-1) |
| (B9.5) | pyribenzoxim, | (CAS 168088-61-7) |
| (B9.6) | pyriftalid, | (CAS 135186-78-6) |
| (B9.7) | pyriminobac, | (CAS 136191-56-5), (CAS 136191-64-5) |
| (B9.8) | pyrimisulfan, | (CAS 221205-90-9) |
| (B9.9) | pyrithiobac-sodium, | (CAS 123342-93-8), (CAS 123343-16-8) |
| (B9.10) | saflufenacil, | (CAS 372137-35-4) |
| (B9.11) | terbacil, | (CAS 5902-51-2) |
| (B9.12) | tiafenacil, | (CAS 1220411-29-9) |
| (B9.13) | trifludimoxazin, | (CAS 1258836-72-4) |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate; | |

(B10) represents active herbicidal ingredients from the group of the (thio)ureas selected from

| | | |
|---|---|---|
| (B10.1) | chlorobromuron, | |
| (B10.2) | chlorotoluron, | (CAS 15545-48-9) |
| (B10.3) | daimuron, | (CAS 42609-52-9) |
| (B10.4) | dimefuron, | (CAS 34205-21-5) |
| (B10.5) | diuron, | (CAS 330-54-1) |
| (B10.6) | diflufenzopyr, | (CAS 1957168-02-3) |
| (B10.7) | fluometuron, | (CAS 2164-17-2) |
| (B10.8) | isoproturon, | (CAS 34123-59-6) |
| (B10.9) | linuron, | (CAS 330-55-2) |
| (B10.10) | methabenzthiazuron, | (CAS 18691-97-9) |
| (B10.11) | metobromuron, | (CAS 3060-89-7) |
| (B10.12) | metoxuron, | (CAS 19937-59-8) |
| (B10.13) | monolinuron, | (CAS 1746-81-2) |
| (B10.14) | neburon, | (CAS 555-37-3) |
| (B10.15) | siduron, | (CAS 1982-49-6) |
| (B10.16) | tebuthiuron, | (CAS 34014-18-1) |
| (B10.17) | fenuron, | (CAS 101-42-8) |
| (B10.18) | chloroxuron, | (CAS 1982-47-4) |
| (B10.19) | diflufenzopyr, | (CAS 1957168-02-3, CAS 109293-98-3) |
| (B10.20) | ethidimuron; | (CAS 30043-49-3) |

(B11) represents active herbicidal ingredients from the group of the triazines selected from

| | | |
|---|---|---|
| (B11.1) | ametryne, | |
| (B11.2) | atrazine, | (CAS 1912-24-9) |
| (B11.3) | cynazine, | (CAS 21725-46-2) |
| (B11.4) | dimethametryn, | (CAS 22936-75-0) |
| (B11.5) | hexazinone, | (CAS 51235-04-2) |
| (B11.6) | indaziflam, | (CAS 950782-86-2) |
| (B11.7) | metamitron, | (CAS 41394-05-2) |
| (B11.8) | metribuzin, | (CAS 21087-64-9) |
| (B11.9) | prometon, | (CAS 1610-18-0) |
| (B11.10) | prometryne, | (CAS 7287-19-6) |
| (B11.11) | propazine, | (CAS 139-40-2) |
| (B11.12) | simazine, | (CAS 122-34-9) |
| (B11.13) | simetryne, | (CAS 1014-70-6) |
| (B11.14) | terbumeton, | (CAS 33693-04-8) |
| (B11.15) | terbuthylazine, | (CAS 5915-41-3) |
| (B11.16) | terbutryne, | (CAS 886-50-0) |
| (B11.17) | triaziflam, | (CAS 131475-57-5) |
| (B11.18) | trietazine, | (CAS 1912-26-1) |
| (B11.19) | desmetryne | (CAS 1014-69-3). |

DETAILED DESCRIPTION OF A PREFERRED EMBODIMENT

The common name of the herbicides listed above is supplemented by the "CAS RN" (Chemical Abstracts Service Registry Number) ("CAS" for short) between parentheses. The CAS RN is a widely used reference number that enables unambiguous assignment of the substances in question since the "CAS RN" distinguishes inter alia between isomers, including stereoisomers, and salts and esters. For active ingredients that exist in various forms, the name of the neutral compound is given in each case in the above list. The CAS given between parentheses is directed to these and to all further known forms of the active ingredient. Only the neutral compound is ever mentioned hereinafter, and hence encompasses all existing forms as listed, unless a specific form of the active ingredient is relevant in a particular context, for example in table examples below for biological efficacy.

The compositions of the invention may contain further components, for example other active ingredients to counter harmful organisms such as harmful plants, plant-damaging animals or plant-damaging fungi, especially active ingredients from the group of the herbicides, fungicides, insecticides, acaricides, nematicides and miticides, and related substances, or else other kinds of active ingredients for crop protection (e.g. resistance inductors), plant growth regulators, and/or additions and/or formulation auxiliaries that are customary in crop protection. The components may be formulated together here (ready-to-use formulation) and employed as such, or they may be formulated separately and employed together, for example in a tankmix or in sequential application.

The individual active herbicidal ingredients of the general formula (I) present as component (A) are also referred to hereinafter as compounds (A), active ingredients (A), components (A) or herbicides (A). Correspondingly, the individual active herbicidal ingredients present as component (B) are also referred to hereinafter as compounds (B), active ingredients (B), components (B) or herbicides (B).

An advantageous property of the inventive combination of herbicides (A) and (B) is found to be that active ingredients (A) and (B) are compatible with one another, meaning that they can be employed together without occurrence of significant chemical incompatibility between the active ingredients (A) and/or (B) that leads to destruction of one or more active ingredients. This avoids any reduction in the active ingredient content in formulations or spray liquors. The favourable compatibility also extends to the biological properties of the active ingredients on combined use. For instance, antagonistic effects are generally not observed in the case of control of harmful plants with the active ingredient combinations of the invention. The active ingredients (A) and (B) are thus particularly suitable for employment together with or in addition to further active ingredients for crop protection or agrochemicals. The combined application enabled permits the utilization of advantageous effects, for example the broadening of the spectrum of harmful plants to be controlled on application, or the reduction of the application rate of the individual herbicides (A) or (B) compared to the respective application rate of the herbicide in question in the case of individual application. It is thus possible to influence the degradation characteristics of the active ingredients and to achieve more favourable conditions for the subsequent growing of crop plants. A further advantage is considered to be that the development of resistances of the harmful plants to the active ingredients can often be significantly reduced or avoided through the combination of active ingredients having different mechanisms of action.

More particularly, superadditive (=synergistic) effects surprisingly occur in the case of combined use of active ingredients (A) and (B) for a greater number of economically important harmful plants. The activity in the combination is higher here than the expected sum of the activities of the individual herbicides used. The synergistic effects allow the application rate to be reduced further, a broader spectrum of broadleaved weeds and weed grasses to be controlled, a more rapid onset of the herbicidal action, longer persistence, better control of the harmful plants with only one or a few applications, and extension of the application period possible. To some extent, the use of the products also reduces the amount of harmful ingredients, such as nitrogen or oleic acid, and their introduction into the soil.

Said properties and advantages are desirable in practical weed control in order to keep agricultural crops clear of unwanted competing plants and hence to ensure and/or increase the yields in terms of quality and quantity. The technical standard is clearly surpassed by the novel combinations with regard to the properties described.

The synergistic effects are observed in the case of joint deployment of active ingredients (A) and (B), but can also frequently occur in the case of offset application (splitting). It is also possible to apply the herbicides (A) or (B) or the herbicidal composition (A) and (B) in multiple portions (sequential application). For example, one or more pre-emergence applications may be followed by a post-emergence application, or an early post-emergence application may be followed by a moderately late or late post-emergence application. Preference is given to the simultaneous or immediately successive application of the active ingredients of the respective combination, if appropriate in several portions. But application of the individual active ingredients of a combination at different times is also possible, and may be advantageous in the individual case. It is also possible to integrate other crop protection products into the system for application, for example the other active ingredients mentioned (other herbicides, fungicides, insecticides, acaricides etc.) and/or various auxiliaries, adjuvants and/or applications of fertilizer.

Application by the pre-emergence method or by the post-emergence method, according to the context in which the terms are used, is respectively understood to mean the application of the active ingredients before and after the visible appearance of the harmful plants above the ground, or the use of the active ingredients against the harmful plants before emergence of the crop plants and after emergence of the crop plants.

In the formula (I) for compounds of the active herbicidal ingredients (A) and all the formulae that follow, the following definitions are applicable:

Alkyl denotes saturated straight-chain or branched hydrocarbyl radicals having the number of carbon atoms specified in each case, e.g. $C_1$-$C_6$-alkyl such as methyl, ethyl, propyl, 1-methylethyl, butyl, 1-methylpropyl, 2-methylpropyl, 1,1-dimethylethyl, pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

Halogen-substituted alkyl denotes straight-chain or branched alkyl groups where some or all of the hydrogen atoms in these groups may be replaced by halogen atoms, e.g. $C_1$-$C_2$-haloalkyl such as chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2-difluoroethyl, 2,2-dichloro-2-fluoroethyl, 2,2,2-trichloroethyl, pentafluoroethyl and 1,1,1-trifluoroprop-2-yl.

Alkenyl denotes unsaturated straight-chain or branched hydrocarbyl radicals having the number of carbon atoms stated in each case and one double bond in any position, for example $C_2$-$C_6$-alkenyl such as ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1-butenyl, 1,3-dimethyl-2-butenyl, 1,3-dimethyl-3-butenyl, 2,2-dimethyl-3-butenyl, 2,3-dimethyl-1-butenyl, 2,3-dimethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl and 1-ethyl-2-methyl-2-propenyl.

Alkynyl denotes straight-chain or branched hydrocarbyl radicals having the number of carbon atoms specified in each case and one triple bond in any position, e.g. $C_2$-$C_6$-alkynyl such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl and 1-ethyl-1-methyl-2-propynyl.

Cycloalkyl denotes a carbocyclic saturated ring system having preferably 3-8 ring carbon atoms, for example cyclopropyl, cyclobutyl, cyclopentyl or cyclohexyl. In the case of optionally substituted cycloalkyl, cyclic systems with substituents are included, also including substituents with a double bond on the cycloalkyl radical, for example an alkylidene group such as methylidene.

In the case of optionally substituted cycloalkyl, polycyclic aliphatic systems are also included, for example bicyclo[1.1.0]butan-1-yl, bicyclo[1.1.0]butan-2-yl, bicyclo[2.1.0]pentan-1-yl, bicyclo[2.1.0]pentan-2-yl, bicyclo[2.1.0]pentan-5-yl, bicyclo[2.2.1]hept-2-yl (norbornyl), adamantan-1-yl and adamantan-2-yl.

In the case of substituted cycloalkyl, spirocyclic aliphatic systems are also included, for example spiro[2.2]pent-1-yl, spiro[2.3]hex-1-yl, spiro[2.3]hex-4-yl, 3-spiro[2.3]hex-5-yl.

Cycloalkenyl denotes a carbocyclic, nonaromatic, partially unsaturated ring system having preferably 4-8 carbon atoms, e.g. 1-cyclobutenyl, 2-cyclobutenyl, 1-cyclopentenyl, 2-cyclopentenyl, 3-cyclopentenyl, or 1-cyclohexenyl, 2-cyclohexenyl, 3-cyclohexenyl, 1,3-cyclohexadienyl or 1,4-cyclohexadienyl, also including substituents with a double bond on the cycloalkenyl radical, for example an alkylidene group such as methylidene. In the case of optionally substituted cycloalkenyl, the elucidations for substituted cycloalkyl apply correspondingly.

Alkoxy denotes saturated straight-chain or branched alkoxy radicals having the number of carbon atoms specified in each case, for example $C_1$-$C_6$-alkoxy such as methoxy, ethoxy, propoxy, 1-methylethoxy, butoxy, 1-methylpropoxy, 2-methylpropoxy, 1,1-dimethylethoxy, pentoxy, 1-methylbutoxy, 2-methylbutoxy, 3-methylbutoxy, 2,2-dimethylpropoxy, 1-ethylpropoxy, hexoxy, 1,1-dimethylpropoxy, 1,2-dimethylpropoxy, 1-methylpentoxy, 2-methylpentoxy, 3-methylpentoxy, 4-methylpentoxy, 1,1-dimethylbutoxy, 1,2-dimethylbutoxy, 1,3-dimethylbutoxy, 2,2-dimethylbutoxy, 2,3-dimethylbutoxy, 3,3-dimethylbutoxy, 1-ethylbutoxy, 2-ethylbutoxy, 1,1,2-trimethylpropoxy, 1,2,2-trimethylpropoxy, 1-ethyl-1-methylpropoxy and 1-ethyl-2-methylpropoxy. Halogen-substituted alkoxy denotes straight-chain or branched alkoxy radicals having the number of carbon atoms specified in each case, where some or all of the hydrogen atoms in these groups may be replaced by halogen atoms as specified above, e.g. $C_1$-$C_2$-haloalkoxy such as chloromethoxy, bromomethoxy, dichloromethoxy, trichloromethoxy, fluoromethoxy, difluoromethoxy, trifluoromethoxy, chlorofluoromethoxy, dichlorofluoromethoxy, chlorodifluoromethoxy, 1-chloroethoxy, 1-bromoethoxy, 1-fluoroethoxy, 2-fluoroethoxy, 2,2-difluoroethoxy, 2,2,2-trifluoroethoxy, 2-chloro-2-fluoroethoxy, 2-chloro-1,2-difluoroethoxy, 2,2-dichloro-2-fluoroethoxy, 2,2,2-trichloroethoxy, pentafluoroethoxy and 1,1,1-trifluoroprop-2-oxy.

The term "aryl" denotes an optionally substituted mono-, bi- or polycyclic aromatic system having preferably 6 to 14, especially 6 to 10, ring carbon atoms, for example phenyl, naphthyl, anthryl, phenanthrenyl and the like, preferably phenyl.

The term "optionally substituted aryl" also embraces polycyclic systems, such as tetrahydronaphthyl, indenyl, indanyl, fluorenyl, biphenylyl, where the bonding site is on the aromatic system. In systematic terms, "aryl" is generally also encompassed by the term "optionally substituted phenyl".

The aryls listed above are preferably independently mono- to pentasubstituted, for example, by hydrogen, halogen, alkyl, haloalkyl, hydroxyl, alkoxy, cycloalkoxy, aryloxy, alkoxyalkyl, alkoxyalkoxy, cycloalkyl, halocycloalkyl, aryl, arylalkyl, heteroaryl, heterocyclyl, alkenyl, alkylcarbonyl, cycloalkylcarbonyl, arylcarbonyl, heteroarylcarbonyl, alkoxycarbonyl, hydroxycarbonyl, cycloalkoxycarbonyl, cycloalkylalkoxycarbonyl, alkoxycarbonylalkyl, arylalkoxycarbonyl, arylalkoxycarbonylalkyl, alkynyl, alkynylalkyl, alkylalkynyl, trisalkylsilylalkynyl, nitro, amino, cyano, haloalkoxy, haloalkylthio, alkylthio, hydrothio, hydroxyalkyl, heteroarylalkoxy, arylalkoxy, heterocyclylalkoxy, heterocyclylalkylthio, heterocyclyloxy, heterocyclylthio, heteroaryloxy, bisalkylamino, alkylamino, cycloalkylamino, hydroxycarbonylalkylamino, alkoxycarbonylalkylamino, arylalkoxycarbonylalkylamino, alkoxycarbonylalkyl(alkyl)amino, aminocarbonyl, alkylaminocarbonyl, bisalkylaminocarbonyl, cycloalkylaminocarbonyl, hydroxycarbonylalkylaminocarbonyl, alkoxycarbonylalkylaminocarbonyl, arylalkoxycarbonylalkylaminocarbonyl.

A heterocyclic radical (heterocyclyl) contains at least one heterocyclic ring (=carbocyclic ring in which at least one carbon atom has been replaced by a heteroatom, preferably by a heteroatom from the group of N, O, S, P) which is saturated, unsaturated, partially saturated or heteroaromatic and may be unsubstituted or substituted, in which case the bonding site is localized on a ring atom. If the heterocyclyl radical or the heterocyclic ring is optionally substituted, it may be fused to other carbocyclic or heterocyclic rings. In the case of optionally substituted heterocyclyl, polycyclic systems are also included, for example 8-azabicyclo[3.2.1]octanyl, 8-azabicyclo[2.2.2]octanyl or 1-azabicyclo[2.2.1]heptyl. In the case of optionally substituted heterocyclyl, spirocyclic systems are also included, for example 1-oxa-5-azaspiro[2.3]hexyl. Unless defined differently, the heterocyclic ring preferably contains 3 to 9 ring atoms, especially 3 to 6 ring atoms, and one or more, preferably 1 to 4, especially 1, 2 or 3, heteroatoms in the heterocyclic ring, preferably from the group of N, O and S, but no two oxygen atoms should be directly adjacent, for example with one heteroatom from the group of N, O and S: 1- or 2- or 3-pyrrolidinyl, 3,4-dihydro-2H-pyrrol-2- or 3-yl, 2,3-dihydro-1H-pyrrol-1- or 2- or 3- or 4- or 5-yl; 2,5-dihydro-1H-pyrrol-1- or 2- or 3-yl, 1- or 2- or 3- or 4-piperidinyl; 2,3,4,5-tetrahydropyridin-2- or 3- or 4- or 5-yl or 6-yl; 1,2,3,6-tetrahydropyridin-1- or 2- or 3- or 4- or 5- or 6-yl; 1,2,3,4-tetrahydropyridin-1- or 2- or 3- or 4- or 5- or 6-yl; 1,4-dihydropyridin-1- or 2- or 3- or 4-yl; 2,3-dihydropyridin-2- or 3- or 4- or 5- or 6-yl; 2,5-dihydropyridin-2- or 3- or 4- or 5- or 6-yl, 1- or 2- or 3- or 4-azepanyl; 2,3,4,5-tetrahydro-1H-azepin-1- or 2- or 3- or 4- or 5- or 6- or 7-yl; 2,3,4,7-tetrahydro-1H-azepin-1- or 2- or 3- or 4- or 5- or 6- or 7-yl; 2,3,6,7-tetrahydro-1H-azepin-1- or 2- or 3- or 4-yl; 3,4,5,6-tetrahydro-2H-azepin-2- or 3- or 4- or 5- or 6- or 7-yl; 4,5-dihydro-1H-azepin-1- or 2- or 3- or 4-yl; 2,5-dihydro-1H-azepin-1- or -2- or 3- or 4- or 5- or 6- or 7-yl; 2,7-dihydro-1H-azepin-1- or -2- or 3- or 4-yl; 2,3-dihydro-1H-azepin-1- or -2- or 3- or 4- or 5- or 6- or 7-yl; 3,4-dihydro-2H-azepin-2- or 3- or 4- or 5- or 6- or 7-yl; 3,6-dihydro-2H-azepin-2- or 3- or 4- or 5- or 6- or 7-yl; 5,6-dihydro-2H-azepin-2- or 3- or 4- or 5- or 6- or 7-yl; 4,5-dihydro-3H-azepin-2- or 3- or 4- or 5- or 6- or 7-yl; 1H-azepin-1- or -2- or 3- or 4- or 5- or 6- or 7-yl; 2H-azepin- 2- or 3- or 4- or 5- or 6- or 7-yl; 3H-azepin-2- or 3- or 4- or 5- or 6- or 7-yl; 4H-azepin-2- or 3- or 4- or 5- or 6- or 7-yl, 2- or 3-oxolanyl (=2- or 3-tetrahydrofuranyl); 2,3-dihydrofuran-2- or 3- or 4- or 5-yl; 2,5-dihydrofuran-2- or 3-yl, 2- or 3- or 4-oxanyl (=2- or 3- or 4-tetrahydropyranyl); 3,4-dihydro-2H-pyran-2- or 3- or 4- or 5- or 6-yl; 3,6-dihydro-2H-pyran-2- or 3- or 4- or 5- or 6-yl; 2H-pyran-2- or 3- or 4- or 5- or 6-yl; 4H-pyran-2- or 3- or 4-yl, 2- or 3- or 4-oxepanyl; 2,3,4,5-tetrahydrooxepin-2- or 3- or 4- or 5- or 6- or 7-yl; 2,3,4,7-tetrahydrooxepin-2- or 3- or 4- or 5- or 6- or 7-yl; 2,3,6,7-tetrahydrooxepin-2- or 3- or 4-yl; 2,3-dihydrooxepin-2- or 3- or 4- or 5- or 6- or 7-yl; 4,5-dihydrooxepin-2- or 3- or 4-yl; 2,5-dihydrooxepin-2- or 3- or 4- or 5- or 6- or 7-yl; oxepin-2- or 3- or 4- or 5- or 6- or 7-yl; 2- or 3-tetrahydrothiophenyl; 2,3-dihydrothiophen-2- or 3- or 4- or 5-yl; 2,5-dihydrothiophen-2- or 3-yl; tetrahydro-2H-thiopyran-2- or 3- or 4-yl; 3,4-dihydro-2H-thiopyran-2- or 3- or 4- or 5- or 6-yl; 3,6-dihydro-2H-thiopyran-2- or 3- or 4- or 5- or 6-yl; 2H-thiopyran-2- or 3- or 4- or 5- or 6-yl; 4H-thiopyran-2- or 3- or 4-yl. Preferred 3-membered and 4-membered heterocycles are, for example, 1- or 2-aziridinyl, oxiranyl, thiiranyl, 1- or 2- or 3-azetidinyl, 2- or 3-oxetanyl, 2- or 3-thietanyl, 1,3-dioxetan-2-yl. Further examples of "heterocyclyl" are a partly or fully hydrogenated heterocyclic radical having two heteroatoms from the group of N, O and S, for example 1- or 2- or 3- or 4-pyrazolidinyl; 4,5-dihydro-3H-pyrazol-3- or 4- or 5-yl; 4,5-dihydro-1H-pyrazol-1- or 3- or 4- or 5-yl; 2,3-dihydro-1H-pyrazol-1- or 2- or 3- or 4- or 5-yl; 1- or 2- or 3- or 4-imidazolidinyl; 2,3-dihydro-1H-imidazol-1- or 2- or 3- or 4-yl; 2,5-dihydro-1H-imidazol-1- or 2- or 4- or 5-yl; 4,5-dihydro-1H-imidazol-1- or 2- or 4- or 5-yl; hexahydropyridazin-1- or 2- or 3- or 4-yl; 1,2,3,4-tetrahydropyridazin-1- or 2- or 3- or 4- or 5- or 6-yl; 1,2,3,6-tetrahydropyridazin-1- or 2- or 3- or 4- or 5- or 6-yl; 1,4,5,6-tetrahydropyridazin-1- or 3- or 4- or 5- or 6-yl; 3,4,5,6-tetrahydropyridazin-3- or 4- or 5-yl; 4,5-dihydropyridazin-3- or 4-yl; 3,4-dihydropyridazin-3- or 4- or 5- or 6-yl; 3,6-dihydropyridazin-3- or 4-yl; 1,6-dihydropyridazin-1- or 3- or 4- or 5- or 6-yl; hexahydropyrimidin-1- or 2- or 3- or 4-yl; 1,4,5,6-tetrahydropyrimidin-1- or 2- or 4- or 5- or 6-yl; 1,2,5,6-tetrahydropyrimidin-1- or 2- or 4- or 5- or 6-yl; 1,2,3,4-tetrahydropyrimidin-1- or 2- or 3- or 4- or 5- or 6-yl; 1,6-dihydropyrimidin-1- or 2- or 4- or 5- or 6-yl; 1,2-dihydropyrimidin-1- or 2- or 4- or 5- or 6-yl; 2,5-dihydropyrimidin-2- or 4- or 5-yl; 4,5-dihydropyrimidin-4- or 5- or 6-yl; 1,4-dihydropyrimidin-1- or 2- or 4- or 5- or 6-yl; 1- or 2- or 3-piperazinyl; 1,2,3,6-tetrahydropyrazin-1- or 2- or 3- or 5- or 6-yl; 1,2,3,4-tetrahydropyrazin-1- or 2- or 3- or 4- or 5- or 6-yl; 1,2-dihydropyrazin-1- or 2- or 3- or 5- or 6-yl; 1,4-dihydropyrazin-1- or 2- or 3-yl; 2,3-dihydropyrazin-2- or 3- or 5- or 6-yl; 2,5-dihydropyrazin-2- or 3-yl; 1,3-dioxolan-2- or 4- or 5-yl; 1,3-dioxol-2- or 4-yl; 1,3-dioxan-2- or 4- or 5-yl; 4H-1,3-dioxin-2- or 4- or 5- or 6-yl; 1,4-dioxan-2- or 3- or 5- or 6-yl; 2,3-dihydro-1,4-dioxin-2- or 3- or 5- or 6-yl; 1,4-dioxin-2- or 3-yl; 1,2-dithiolan-3- or 4-yl; 3H-1,2-dithiol-3- or 4- or 5-yl; 1,3-dithiolan-2- or 4-yl; 1,3-dithiol-2- or 4-yl; 1,2-dithian-3- or 4-yl; 3,4-dihydro-1,2-dithiin-3- or 4- or 5- or 6-yl; 3,6-dihydro-1,2-dithiin-3- or 4-yl; 1,2-dithiin-3- or 4-yl; 1,3-dithian-2- or 4- or 5-yl; 4H-1,3-dithiin-2- or 4- or 5- or 6-yl; isoxazolidin-2- or 3- or 4- or 5-yl; 2,3-dihydroisoxazol-2- or 3- or 4- or 5-yl; 2,5-dihydroisoxazol-2- or 3- or 4- or 5-yl; 4,5-dihydroisoxazol-3- or 4- or 5-yl; 1,3-oxazolidin-2- or 3- or 4- or 5-yl; 2,3-dihydro-1,3-oxazol-2- or 3- or 4- or 5-yl; 2,5-dihydro-1,3-oxazol-2- or 4- or 5-yl; 4,5-dihydro-1,3-oxazol-2- or 4- or 5-yl; 1,2-oxazinan-2- or 3- or 4- or 5- or 6-yl; 3,4-dihydro-2H-1,2-oxazin-2- or 3- or 4- or 5- or 6-yl; 3,6-dihydro-2H-1,2-oxazin-2- or 3- or 4- or 5- or 6-yl; 5,6-dihydro-2H-1,2-oxazin-2- or 3- or 4- or 5- or 6-yl; 5,6-dihydro-4H-1,2-oxazin-3- or 4- or 5- or 6-yl; 2H-1,2-oxazin-2- or 3- or 4- or 5- or 6-yl; 6H-1,2-oxazin-3- or 4- or 5- or 6-yl; 4H-1,2-oxazin-3- or 4- or 5- or 6-yl; 1,3-oxazinan-2- or 3- or 4- or 5- or 6-yl; 3,4-dihydro-2H-1,3-oxazin-2- or 3- or 4- or 5- or 6-yl; 3,6-dihydro-2H-1,3-oxazin-2- or 3- or 4- or 5- or 6-yl; 5,6-dihydro-2H-1,3-oxazin-2- or 4- or 5- or 6-yl; 5,6-dihydro-4H-1,3-oxazin-2- or 4- or 5- or 6-yl; 2H-1,3-oxazin-2- or 4- or 5- or 6-yl; 6H-1,3-oxazin-2- or 4- or 5- or 6-yl; 4H-1,3-oxazin-2- or 4- or 5- or 6-yl; morpholin-2- or 3- or 4-yl; 3,4-dihydro-2H-1,4-oxazin-2- or 3- or 4- or 5- or 6-yl; 3,6-dihydro-2H-1,4-oxazin-2- or 3- or 5- or 6-yl; 2H-1,4-oxazin-2- or 3- or 5- or 6-yl; 4H-1,4-oxazin-2- or 3-yl; 1,2-oxazepan-2- or 3- or 4- or 5- or 6- or 7-yl; 2,3,4,5-tetrahydro-1,2-oxazepin-2- or 3- or 4- or 5- or 6- or 7-yl; 2,3,4,7-tetrahydro-1,2-oxazepin-2- or 3- or 4- or 5- or 6- or 7-yl; 2,3,6,7-tetrahydro-1,2-oxazepin-2- or 3- or 4- or 5- or 6- or 7-yl; 2,5,6,7-tetrahydro-1,2-oxazepin-2- or 3- or 4- or 5- or 6- or 7-yl; 4,5,6,7-tetrahydro-1,2-oxazepin-3- or 4- or 5- or 6- or 7-yl; 2,3-dihydro-1,2-oxazepin-2- or 3- or 4- or 5- or 6- or 7-yl; 2,5-dihydro-1,2-oxazepin-2- or 3- or 4- or 5- or 6- or 7-yl; 2,7-dihydro-1,2-oxazepin-2- or 3- or 4- or 5- or 6- or 7-yl; 4,5-dihydro-1,2-oxazepin-3- or 4- or 5- or 6- or 7-yl; 4,7-dihydro-1,2-oxazepin-3- or 4- or 5- or 6- or 7-yl; 6,7-dihydro-1,2-oxazepin-3- or 4- or 5- or 6- or 7-yl; 1,2-oxazepin-3- or 4- or 5- or 6- or 7-yl; 1,3-oxazepan-2- or 3- or 4- or 5- or 6- or 7-yl; 2,3,4,5-tetrahydro-1,3-oxazepin-2- or 3- or 4- or 5- or 6- or 7-yl; 2,3,4,7-tetrahydro-1,3-oxazepin-2- or 3- or 4- or 5- or 6- or 7-yl; 2,3,6,7-tetrahydro-1,3-oxazepin-2- or 3- or 4- or 5- or 6- or 7-yl; 2,5,6,7-tetrahydro-1,3-oxazepin-2- or 4- or 5- or 6- or 7-yl; 4,5,6,7-tetrahydro-1,3-oxazepin-2- or 4- or 5- or 6- or 7-yl; 2,3-dihydro-1,3-oxazepin-2- or 3- or 4- or 5- or 6- or 7-yl; 2,5-dihydro-1,3-oxazepin-2- or 4- or 5- or 6- or 7-yl; 2,7-dihydro-1,3-oxazepin-2- or 4- or 5- or 6- or 7-yl; 4,5-dihydro-1,3-oxazepin-2- or 4- or 5- or 6- or 7-yl; 4,7-dihydro-1,3-oxazepin-2- or 4- or 5- or 6- or 7-yl; 6,7-dihydro-1,3-oxazepin-2- or 4- or 5- or 6- or 7-yl; 1,3-oxazepin-2- or 4- or 5- or 6- or 7-yl; 1,4-oxazepan-2- or 3- or 5- or 6- or 7-yl; 2,3,4,5-tetrahydro-1,4-oxazepin-2- or 3- or 4- or 5- or 6- or 7-yl; 2,3,4,7-tetrahydro-1,4-oxazepin-2- or 3- or 4- or 5- or 6- or 7-yl; 2,3,6,7-tetrahydro-1,4-oxazepin-2- or 3- or 5- or 6- or 7-yl; 2,5,6,7-tetrahydro-1,4-oxazepin-2- or 3- or 5- or 6- or 7-yl; 4,5,6,7-tetrahydro-1,4-oxazepin-2- or 3- or 4- or 5- or 6- or 7-yl; 2,3-dihydro-1,4-oxazepin-2- or 3- or 5- or 6- or 7-yl; 2,5-dihydro-1,4-oxazepin-2- or 3- or 5- or 6- or 7-yl; 2,7-dihydro-1,4-oxazepin-2- or 3- or 5- or 6- or 7-yl; 4,5-dihydro-1,4-oxazepin-2- or 3- or 4- or 5- or 6- or 7-yl; 4,7-dihydro-1,4-oxazepin-2- or 3- or 4- or 5- or 6- or 7-yl; 6,7-dihydro-1,4-oxazepin-2- or 3- or 5- or 6- or 7-yl; 1,4-oxazepin-2- or 3- or 5- or 6- or 7-yl; isothiazolidin-2- or 3- or 4- or 5-yl; 2,3-dihydroisothiazol-2- or 3- or 4- or 5-yl; 2,5-dihydroisothiazol-2- or 3- or 4- or 5-yl; 4,5-dihydroisothiazol-3- or 4- or 5-yl; 1,3-thiazolidin-2- or 3- or 4- or 5-yl; 2,3-dihydro-1,3-thiazol-2- or 3- or 4- or 5-yl; 2,5-dihydro-1,3-thiazol-2- or 4- or 5-yl; 4,5-dihydro-1,3-thiazol-2- or 4- or 5-yl; 1,3-thiazinan-2- or 3- or 4- or 5- or 6-yl; 3,4-dihydro-2H-1,3-thiazin-2- or 3- or 4- or 5- or 6-yl; 3,6-dihydro-2H-1,3-thiazin-2- or 3- or 4- or 5- or 6-yl; 5,6-dihydro-2H-1,3-thiazin-2- or 4- or 5- or 6-yl; 5,6-dihydro-4H-1,3-thiazin-2- or 4- or 5- or 6-yl; 2H-1,3-thiazin-2- or 4- or 5- or 6-yl; 6H-1,3-thiazin-2- or 4- or 5- or 6-yl; 4H-1,3-thiazin-2- or 4- or 5- or 6-yl. Further examples of "heterocyclyl" are a partly or fully hydrogenated heterocyclic radical having 3 heteroatoms from the group of N, O and S, for example 1,4,2-dioxazolidin-2- or 3- or 5-yl; 1,4,2-dioxazol-3- or 5-yl; 1,4,2-dioxazinan-2- or -3- or 5- or 6-yl; 5,6-dihydro-1,4,2-dioxazin-3- or 5- or 6-yl; 1,4,2-dioxazin-3- or 5- or 6-yl; 1,4,2-dioxazepan-2- or 3- or 5- or 6- or 7-yl; 6,7-dihydro-5H-1,4,2-dioxazepin-3- or 5- or 6- or 7-yl; 2,3-dihydro-7H-1,4,2-dioxazepin-2- or 3- or 5- or 6- or 7-yl; 2,3-dihydro-5H-1,4,2-dioxazepin-2- or 3- or 5- or 6- or 7-yl; 5H-1,4,2-dioxazepin-3- or 5- or 6- or 7-yl; 7H-1,4,2-dioxazepin-3- or 5- or 6- or 7-yl.

The heterocycles listed above are preferably independently mono- to hexasubstituted, for example, by hydrogen, halogen, alkyl, haloalkyl, hydroxyl, alkoxy, cycloalkoxy, aryloxy, alkoxyalkyl, alkoxyalkoxy, cycloalkyl, halocycloalkyl, aryl, arylalkyl, heteroaryl, heterocyclyl, alkenyl, alkylcarbonyl, cycloalkylcarbonyl, arylcarbonyl, heteroarylcarbonyl, alkoxycarbonyl, hydroxycarbonyl, cycloalkoxycarbonyl, cycloalkylalkoxycarbonyl, alkoxycarbonylalkyl, arylalkoxycarbonyl, arylalkoxycarbonylalkyl, alkynyl, alkynylalkyl, alkylalkynyl, trisalkylsilylalkynyl, nitro, amino, cyano, haloalkoxy, haloalkylthio, alkylthio, hydrothio, hydroxyalkyl, oxo, heteroarylalkoxy, arylalkoxy, heterocyclylalkoxy, heterocyclylalkylthio, heterocyclyloxy, heterocyclylthio, heteroaryloxy, bisalkylamino, alkylamino, cycloalkylamino, hydroxycarbonylalkylamino, alkoxycarbonylalkylamino, arylalkoxycarbonylalkylamino, alkoxycarbonylalkyl(alkyl)amino, aminocarbonyl, alkylaminocarbonyl, bisalkylaminocarbonyl, cycloalkylaminocarbonyl, hydroxycarbonylalkylaminocarbonyl, alkoxycarbonylalkylaminocarbonyl, arylalkoxycarbonylalkylaminocarbonyl.

When a base structure is substituted "by one or more radicals" from a list of radicals (=group) or a generically defined group of radicals, this in each case includes simultaneous substitution by a plurality of identical and/or structurally different radicals.

In the case of a partially or fully saturated nitrogen heterocycle, this may be joined to the remainder of the molecule either via carbon or via the nitrogen.

Suitable substituents for a substituted heterocyclic radical are the substituents specified further down, and additionally also oxo and thioxo. The oxo group as a substituent on a ring carbon atom is then, for example, a carbonyl group in the heterocyclic ring. As a result, lactones and lactams are preferably also included.

The oxo group may also occur on the ring heteroatoms, which may exist in different oxidation states, for example in the case of N and S, and in that case form, for example, the divalent —N(O)—, —S(O)— (also SO for short) and $S(O)_2$ (also $SO_2$ for short) groups in the heterocyclic ring. In the case of —N(O)— and —S(O)— groups, both enantiomers in each case are included.

According to the invention, the expression "heteroaryl" represents heteroaromatic compounds, i.e. fully unsaturated aromatic heterocyclic compounds, preferably 5- to 7-membered rings having 1 to 4, preferably 1 or 2, identical or different heteroatoms, preferably O, S or N. Inventive heteroaryls are, for example, 1H-pyrrol-1-yl; 1H-pyrrol-2-yl; 1H-pyrrol-3-yl; furan-2-yl; furan-3-yl; thien-2-yl; thien-3-yl, 1H-imidazol-1-yl; 1H-imidazol-2-yl; 1H-imidazol-4-yl; 1H-imidazol-5-yl; 1H-pyrazol-1-yl; 1H-pyrazol-3-yl; 1H-pyrazol-4-yl; 1H-pyrazol-5-yl, 1H-1,2,3-triazol-1-yl, 1H-1,2,3-triazol-4-yl, 1H-1,2,3-triazol-5-yl, 2H-1,2,3-triazol-2-yl, 2H-1,2,3-triazol-4-yl, 1H-1,2,4-triazol-1-yl, 1H-1,2,4-triazol-3-yl, 4H-1,2,4-triazol-4-yl, 1,2,4-oxadiazol-3-yl, 1,2,4-oxadiazol-5-yl, 1,3,4-oxadiazol-2-yl, 1,2,3-oxadiazol-4-yl, 1,2,3-oxadiazol-5-yl, 1,2,5-oxadiazol-3-yl, azepinyl, pyridin-2-yl, pyridin-3-yl, pyridin-4-yl, pyrazin-2-yl, pyrazin-3-yl, pyrimidin-2-yl, pyrimidin-4-yl, pyrimidin-5-yl, pyridazin-3-yl, pyridazin-4-yl, 1,3,5-triazin-2-yl, 1,2,4-triazin-3-yl, 1,2,4-triazin-5-yl, 1,2,4-triazin-6-yl, 1,2,3-triazin-4-yl, 1,2,3-triazin-5-yl, 1,2,4-, 1,3,2-, 1,3,6- and 1,2,6-oxazinyl, isoxazol-3-yl, isoxazol-4-yl, isoxazol-5-yl, 1,3-oxazol-2-yl, 1,3-oxazol-4-yl, 1,3-oxazol-5-yl, isothiazol-3-yl, isothiazol-4-yl, isothiazol-5-yl, 1,3-thiazol-2-yl, 1,3-thiazol-4-yl, 1,3-thiazol-5-yl, oxepinyl, thiepinyl, 1,2,4-triazolonyl and 1,2,4-diazepinyl, 2H-1,2,3,4-tetrazol-5-yl, 1H-1,2,3,4-tetrazol-5-yl, 1,2,3,4-oxatriazol-5-yl, 1,2,3,4-thiatriazol-5-yl, 1,2,3,5-oxatriazol-4-yl, 1,2,3,5-thiatriazol-4-yl. The heteroaryl groups of the invention may also be substituted by one or more identical or different radicals. If two adjacent carbon atoms are part of a further aromatic ring, the systems are fused heteroaromatic systems, such as benzofused or polyannelated heteroaromatics.

Preferred examples are quinolines (e.g. quinolin-2-yl, quinolin-3-yl, quinolin-4-yl, quinolin-5-yl, quinolin-6-yl, quinolin-7-yl, quinolin-8-yl); isoquinolines (e.g. isoquinolin-1-yl, isoquinolin-3-yl, isoquinolin-4-yl, isoquinolin-5-yl, isoquinolin-6-yl, isoquinolin-7-yl, isoquinolin-8-yl); quinoxaline; quinazoline; cinnoline; 1,5-naphthyridine; 1,6-naphthyridine; 1,7-naphthyridine; 1,8-naphthyridine; 2,6-naphthyridine; 2,7-naphthyridine; phthalazine; pyridopyrazines; pyridopyrimidines; pyridopyridazines; pteridines; pyrimidopyrimidines. Examples of heteroaryl are also 5- or 6-membered benzofused rings from the group of 1H-indol-1-yl, 1H-indol-2-yl, 1H-indol-3-yl, 1H-indol-4-yl, 1H-indol-5-yl, 1H-indol-6-yl, 1H-indol-7-yl, 1-benzofuran-2-yl, 1-benzofuran-3-yl, 1-benzofuran-4-yl, 1-benzofuran-5-yl, 1-benzofuran-6-yl, 1-benzofuran-7-yl, 1-benzothiophen-2-yl, 1-benzothiophen-3-yl, 1-benzothiophen-4-yl, 1-benzothiophen-5-yl, 1-benzothiophen-6-yl, 1-benzothiophen-7-yl, 1H-indazol-1-yl, 1H-indazol-3-yl, 1H-indazol-4-yl, 1H-indazol-5-yl, 1H-indazol-6-yl, 1H-indazol-7-yl, 2H-indazol-2-yl, 2H-indazol-3-yl, 2H-indazol-4-yl, 2H-indazol-5-yl, 2H-indazol-6-yl, 2H-indazol-7-yl, 2H-isoindol-2-yl, 2H-isoindol-1-yl, 2H-isoindol-3-yl, 2H-isoindol-4-yl, 2H-isoindol-5-yl, 2H-isoindol-6-yl; 2H-isoindol-7-yl, 1H-benzimidazol-1-yl, 1H-benzimidazol-2-yl, 1H-benzimidazol-4-yl, 1H-benzimidazol-5-yl, 1H-benzimidazol-6-yl, 1H-benzimidazol-7-yl, 1,3-benzoxazol-2-yl, 1,3-benzoxazol-4-yl, 1,3-benzoxazol-5-yl, 1,3-benzoxazol-6-yl, 1,3-benzoxazol-7-yl, 1,3-benzothiazol-2-yl, 1,3-benzothiazol-4-yl, 1,3-benzothiazol-5-yl, 1,3-benzothiazol-6-yl, 1,3-benzothiazol-7-yl, 1,2-benzisoxazol-3-yl, 1,2-benzisoxazol-4-yl, 1,2-benzisoxazol-5-yl, 1,2-benzisoxazol-6-yl, 1,2-benzisoxazol-7-yl, 1,2-benzisothiazol-3-yl, 1,2-benzisothiazol-4-yl, 1,2-benzisothiazol-5-yl, 1,2-benzisothiazol-6-yl, 1,2-benzisothiazol-7-yl.

Independently of one another, the heteroaryls listed above are preferably mono- to tetrasubstituted, for example, by hydrogen, halogen, alkyl, haloalkyl, hydroxyl, alkoxy, cycloalkoxy, aryloxy, alkoxyalkyl, alkoxyalkoxy, cycloalkyl, halocycloalkyl, aryl, arylalkyl, heteroaryl, heterocyclyl, alkenyl, alkylcarbonyl, cycloalkylcarbonyl, arylcarbonyl, heteroarylcarbonyl, alkoxycarbonyl, hydroxycarbonyl, cycloalkoxycarbonyl, cycloalkylalkoxycarbonyl, alkoxycarbonylalkyl, arylalkoxycarbonyl, arylalkoxycarbonylalkyl, alkynyl, alkynylalkyl, alkylalkynyl, trisalkylsilylalkynyl, nitro, amino, cyano, haloalkoxy, haloalkylthio, alkylthio, hydrothio, hydroxyalkyl, oxo, heteroarylalkoxy, arylalkoxy, heterocyclylalkoxy, heterocyclylalkylthio, heterocyclyloxy, heterocyclylthio, heteroaryloxy, bisalkylamino, alkylamino, cycloalkylamino, hydroxycarbonylalkylamino, alkoxycarbonylalkylamino, arylalkoxycarbonylalkylamino, alkoxycarbonylalkyl(alkyl)amino, aminocarbonyl, alkylaminocarbonyl, bisalkylaminocarbonyl, cycloalkylaminocarbonyl, hydroxycarbonylalkylaminocarbonyl, alkoxycarbonylalkylaminocarbonyl, arylalkoxycarbonylalkylaminocarbonyl.

The term "halogen" means fluorine, chlorine, bromine or iodine. If the term is used for a radical, "halogen" means a fluorine, chlorine, bromine or iodine atom.

According to the nature of the substituents and the way in which they are joined, the compounds of the formula (I) may be present as stereoisomers. If, for example, there are one or more asymmetrically substituted carbon atoms and/or sulfoxides, it is possible for enantiomers and diastereomers to occur.

Stereoisomers can be obtained from the mixtures obtained in the preparation by customary separation methods, for example by chromatographic separation processes. It is likewise possible to selectively prepare stereoisomers by using stereoselective reactions with use of optically active starting materials and/or auxiliaries.

The invention also relates to all stereoisomers and mixtures thereof which are encompassed by the formula (I) but not defined specifically. For the sake of simplicity, however, reference will always be made hereinafter to compounds of the formula (I), even though this means not only the pure compounds but also, if appropriate, mixtures with different proportions of isomeric compounds.

According to the nature of the substituents defined above, the compounds of the formula (I) have acidic properties and can form salts, and if appropriate also internal salts or adducts with inorganic or organic bases or with metal ions. If the compounds of the formula (I) bear hydroxyl, carboxyl or other groups which induce acidic properties, these compounds can be reacted with bases to give salts. Suitable bases are, for example, hydroxides, carbonates, hydrogencarbonates of the alkali metals and alkaline earth metals, especially those of sodium, potassium, magnesium and calcium, and also ammonia, primary, secondary and tertiary amines having $(C_1-C_4)$-alkyl groups, mono-, di- and trialkanolamines of $(C_1-C_4)$-alkanols, choline and chlorocholine, and organic amines, such as trialkylamines, morpholine, piperidine or pyridine. These salts are compounds in which the acidic hydrogen is replaced by an agriculturally suitable cation, for example metal salts, especially alkali metal salts or alkaline earth metal salts, especially sodium and potassium salts, or else ammonium salts, salts with organic amines or quaternary ammonium salts, for example with cations of the formula [NRR'R''R''']$^+$ in which R to R''' are each independently an organic radical, especially alkyl, aryl, aralkyl or alkylaryl. Also suitable are alkylsulfonium and alkylsulfoxonium salts, such as $(C_1-C_4)$-trialkylsulfonium and $(C_1-C_4)$-trialkylsulfoxonium salts.

The compounds of the formula (I) can form salts by addition of a suitable inorganic or organic acid, for example mineral acids, for example HCl, HBr, $H_2SO_4$, $H_3PO_4$ or $HNO_3$, or organic acids, for example carboxylic acids such as formic acid, acetic acid, propionic acid, oxalic acid, lactic acid or salicylic acid or sulfonic acids, for example p-toluenesulfonic acid, onto a basic group, for example amino, alkylamino, dialkylamino, piperidino, morpholino or pyridino. In such a case, these salts comprise the conjugate base of the acid as the anion.

Suitable substituents present in deprotonated form, for example sulfonic acids or carboxylic acids, may form internal salts with groups which for their part can be protonated, such as amino groups.

If a group is polysubstituted by radicals, this means that this group is substituted by one or more identical or different radicals from those mentioned.

In all the formulae specified hereinafter, the substituents and symbols have the same meaning as described in the general formula (I) of the herbicides (A), unless defined differently. Arrows in a chemical formula denote the points at which it is joined to the rest of the molecule.

There follows a description of preferred, more preferred and even more preferred meanings for each of the individual substituents of the herbicides (A) of the general formula (I), as shown above. The other substituents of the herbicides (A) of the general formula (I) which are not specified hereinafter have the definition given above.

In a 1st embodiment of the present invention,
$R^1$ and $R^2$ are preferably each independently hydrogen, fluorine, chlorine or cyano, or are $(C_1-C_3)$-alkyl or $(C_1-C_3)$-alkoxy, each substituted by m radicals from the group consisting of fluorine, chlorine, bromine and cyano.

More preferably, $R^1$ and $R^2$ are each independently hydrogen, fluorine, chlorine or cyano, or are methyl or methoxy, each substituted by m radicals from the group consisting of fluorine and chlorine.

Most preferably, $R^1$ and $R^2$ are each hydrogen.

In a 2nd embodiment of the present invention,
$R^3$ is preferably cyano, or $(C_1-C_4)$-alkyl, $(C_3-C_5)$-cycloalkyl, $(C_2-C_4)$-alkenyl, $(C_2-C_4)$-alkynyl or $(C_1-C_4)$-alkoxy, each substituted by m radicals from the group consisting of fluorine, chlorine, bromine, cyano, $(C_1-C_4)$-alkoxy and hydroxy.

More preferably, $R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy.

In a 3rd embodiment of the present invention,
$R^4$ is preferably hydrogen, or $(C_1-C_6)$-alkyl, $(C_3-C_6)$-cycloalkyl, $(C_3-C_6)$-cycloalkyl-$(C_1-C_6)$-alkyl, $(C_2-C_6)$-alkenyl, $(C_5-C_6)$-cycloalkenyl or $(C_2-C_6)$-alkynyl, each substituted by m radicals from the group consisting of fluorine, chlorine, bromine, cyano, $(C_1-C_4)$-alkoxy, hydroxy and aryl.

Preferably, $R^4$ is hydrogen, or $(C_1-C_3)$-alkyl or $(C_2-C_6)$-alkenyl, each substituted by m radicals from the group consisting of fluorine, chlorine and $(C_1-C_2)$-alkoxy.

In a 4th embodiment of the present invention, Y is oxygen.

In a 5th embodiment of the present invention, W is oxygen.

In a 6th embodiment of the present invention,
Z is preferably a Z-1 to Z-22 group, where Z-1 to Z-22 are defined as follows:

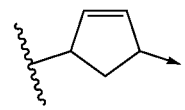

Z-1

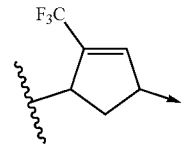

Z-2

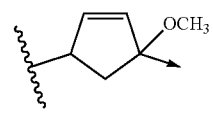

Z-3

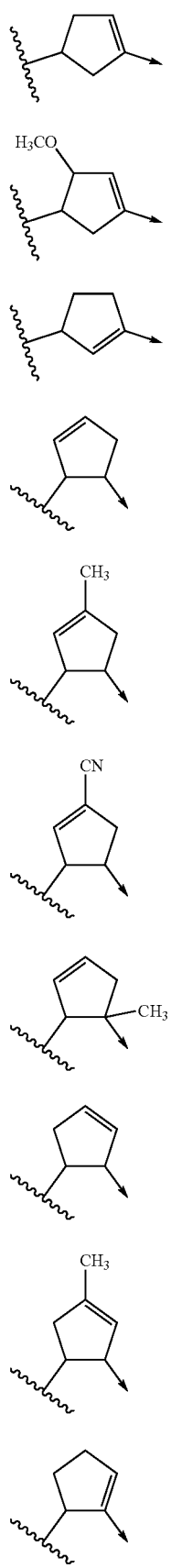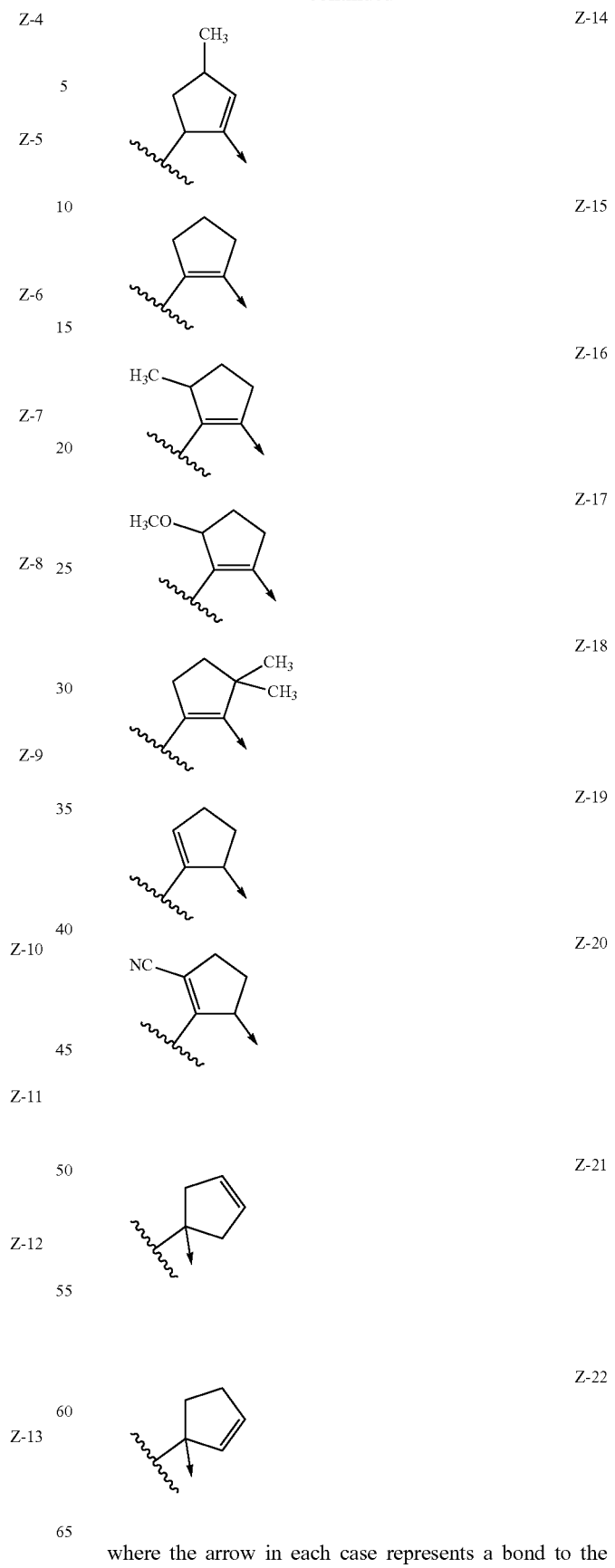
where the arrow in each case represents a bond to the group C=W of the formula (I).

More preferably, Z is a Z-1 to Z-12 group, where Z-1 to Z-12 are defined as follows:

Z-1 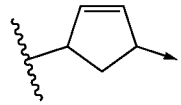

Z-2 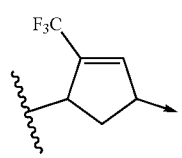

Z-3 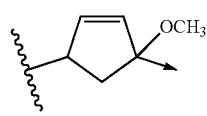

Z-4 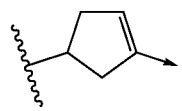

Z-5 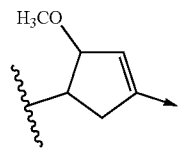

Z-6 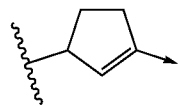

Z-7 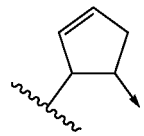

Z-8 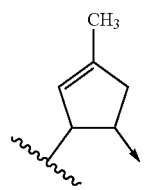

Z-9 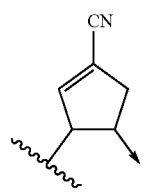

Z-10 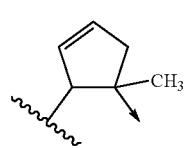

Z-11 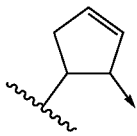

Z-12 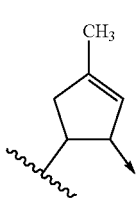

where the arrow in each case represents a bond to the group C=W of the formula (I).

Most preferably, Z is Z-1, Z-4 or Z-6:

Z-1 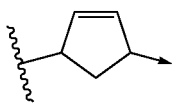

Z-4 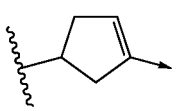

Z-6 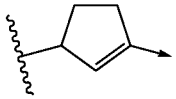

where the arrow in each case represents a bond to the group C=W of the formula (I).

In a 7th embodiment of the present invention, $R^{10}$ is preferably fluorine, chlorine, cyano, $CO_2H$, $CO_2CH_3$ or $CO_2CH_2CH_3$, or ($C_1$-$C_2$)-alkyl or ($C_1$-$C_2$)-alkoxy, each substituted by m radicals from the group consisting of fluorine and chlorine.

In an 8th embodiment of the present invention, $R^{11}$ is preferably hydrogen, or ($C_1$-$C_3$)-alkyl or ($C_3$-$C_6$)-cycloalkyl, each substituted by m radicals from the group consisting of fluorine and chlorine.

More preferably, $R^{11}$ is hydrogen or ($C_1$-$C_3$)-alkyl.

Most preferably, $R^{11}$ is hydrogen.

In a 9th embodiment of the present invention, $R^{12}$ is preferably hydrogen, cyano, $OR^7$, $S(O)_nR^5$, $SO_2NR^6R^7$, $COR^6$, $NR^6R^8$, $NR^6COR^8$ or $NR^6SO_2R^8$, or ($C_1$-$C_6$)-alkyl, ($C_3$-$C_6$)-cycloalkyl, ($C_2$-$C_3$)-alkenyl or ($C_2$-$C_3$)-alkynyl, each substituted by m radicals from the group consisting of fluorine, chlorine, bromine, cyano, $OR^7$, $S(O)_nR^5$, $NR^6R^8$ and $NR^6CO_2R^8$.

More preferably, $R^{12}$ is $OR^7$, $S(O)_nR^5$, $SO_2NR^6R^7$, or ($C_1$-$C_6$)-alkyl substituted in each case by m radicals from the group consisting of fluorine, chlorine, cyano, $OR^7$ and $S(O)_nR^5$.

In a 10th embodiment of the present invention, $R^{11}$ and $R^{12}$ together with the nitrogen atom to which they are bonded preferably form a saturated or partly or fully unsaturated five-, six- or seven-membered ring which is optionally mono- to hexasubstituted by radicals from the group consisting of halogen, cyano, nitro, ($C_1$-$C_6$)-alkyl, halo-$(C_1\text{-}C_6)$-alkyl, oxo, $OR^7$, $S(O)_nR^5$, $CO_2R^8$, $COR^6$, $NR^6COR^8$ and $NR^6SO_2R^8$ and which, in addition to that nitrogen atom, contains r carbon atoms, o oxygen atoms, p sulfur atoms and q elements from the group consisting of $NR^7$ and $NCOR^7$ as ring atoms.

More preferably, $R^{11}$ and $R^{12}$ together with the nitrogen atom to which they are bonded form a saturated or partly or fully unsaturated five-, six- or seven-membered ring which is optionally mono- to hexasubstituted by radicals from the group consisting of halogen, cyano, nitro, $(C_1\text{-}C_6)$-alkyl, halo-$(C_1\text{-}C_6)$-alkyl, oxo, $OR^7$, $CO_2R^8$ and $NR^6SO_2R^8$ and which, in addition to that nitrogen atom, contains r carbon atoms, o oxygen atoms, p sulfur atoms and q elements from the group consisting of $NR^7$ and $NCOR^7$ as ring atoms.

Most preferably, $R^{11}$ and $R^{12}$ together with the nitrogen atom to which they are bonded form a saturated or partly or fully unsaturated five- or six-membered ring which is optionally mono- to trisubstituted by radicals from the group consisting of halogen, $(C_1\text{-}C_6)$-alkyl, halo-$(C_1\text{-}C_6)$-alkyl and oxo and which, in addition to that nitrogen atom, contains r carbon atoms, o oxygen atoms, p sulfur atoms and q elements from the group consisting of $NR^7$ and $NCOR^7$ as ring atoms.

In an 11th embodiment of the present invention, $X^2$, $X^4$ and $X^6$ are preferably each independently hydrogen, fluorine, chlorine, bromine or cyano, or are methyl or methoxy, each substituted by m radicals from the group consisting of fluorine and chlorine.

More preferably, $X^2$, $X^4$ and $X^6$ are independently hydrogen or fluorine.

Most preferably, $X^2$, $X^4$ and $X^6$ are hydrogen.

In a 12th embodiment of the present invention, $X^3$ and $X^5$ are preferably each independently hydrogen, fluorine, chlorine, bromine, hydroxy or cyano, or are $(C_1\text{-}C_3)$-alkyl, $(C_1\text{-}C_3)$-alkoxy, $(C_3\text{-}C_4)$-cycloalkyl, $(C_2\text{-}C_3)$-alkenyl or $(C_2\text{-}C_3)$-alkynyl, each substituted by m radicals from the group consisting of fluorine, chlorine and bromine.

More preferably, $X^3$ and $X^5$ are each independently hydrogen, fluorine, chlorine, cyano, $CF_3$, $CHF_2$ or methyl.

Most preferably, $X^3$ and $X^5$ are each independently hydrogen, fluorine, cyano or methyl.

At the very most preferably, $X^3$ and $X^5$ are each fluorine.

In a 13th embodiment of the present invention, $R^5$ is preferably $(C_1\text{-}C_6)$-alkyl or $(C_3\text{-}C_6)$-cycloalkyl, each substituted by m radicals from the group consisting of fluorine and chlorine.

In a 14th embodiment of the present invention, $R^7$ is preferably hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy.

In a 15th embodiment of the present invention, $R^8$ is preferably hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy.

In a 16th embodiment of the present invention, the index m is preferably 0, 1, 2 or 3.

In the context of the present invention, the individual preferred, more preferred and most preferred definitions of the substituents $R^1$ to $R^8$, $R^{10}$ to $R^{12}$, $X^2$ to $X^6$, W, Y and Z, and the indices k, m, n, o, p, q and r, may be combined with one another as desired.

This means that the present invention encompasses compounds of the general formula (I) in which, for example, the substituent $R^1$ has a preferred definition and the substituents $R^5$ to $R^7$ have the general definition or else the substituent $R^2$ has a preferred definition, the substituent $R^3$ has a more preferred or even more preferred definition and the remaining substituents have a general definition.

Six of these combinations of the definitions given above for the substituents $R^1$ to $R^8$, $R^{10}$ to $R^{12}$, $X^2$ to $X^6$, W, Y and Z, and for the indices k, m, n, o, p, q and r are illustrated hereinafter by way of example, and each of them is disclosed as a further embodiment:

In a 17th embodiment of the present invention,

G is a group of the formula $OR^4$;

$R^1$ and $R^2$ are each independently hydrogen, fluorine, chlorine or cyano, or are $(C_1\text{-}C_3)$-alkyl or $(C_1\text{-}C_3)$-alkoxy, each substituted by m radicals from the group consisting of fluorine, chlorine, bromine and cyano;

$R^3$ is cyano, or $(C_1\text{-}C_3)$-alkyl, $(C_3\text{-}C_4)$-cycloalkyl, $(C_2\text{-}C_3)$-alkenyl, $(C_2\text{-}C_3)$-alkynyl or $(C_1\text{-}C_3)$-alkoxy, each substituted by m radicals from the group consisting of fluorine, chlorine, bromine, cyano, $(C_1\text{-}C_2)$-alkoxy and hydroxy;

$R^4$ is hydrogen, or $(C_1\text{-}C_6)$-alkyl, $(C_3\text{-}C_6)$-cycloalkyl, $(C_3\text{-}C_6)$-cycloalkyl-$(C_1\text{-}C_6)$-alkyl, $(C_2\text{-}C_6)$-alkenyl, $(C_5\text{-}C_6)$-cycloalkenyl or $(C_2\text{-}C_6)$-alkynyl, each substituted by m radicals from the group consisting of fluorine, chlorine, bromine, cyano, $(C_1\text{-}C_4)$-alkoxy, hydroxy and aryl;

Y is oxygen;

W is oxygen;

Z is a Z-1 to Z-12 group, where Z-1 to Z-12 are defined as follows:

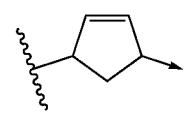
Z-1

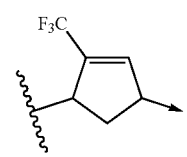
Z-2

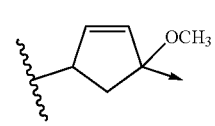
Z-3

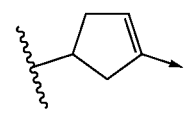
Z-4

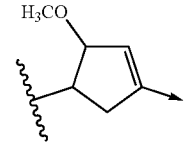
Z-5

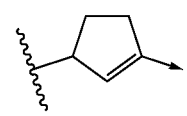
Z-6

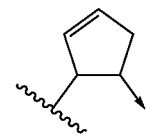
Z-7

-continued

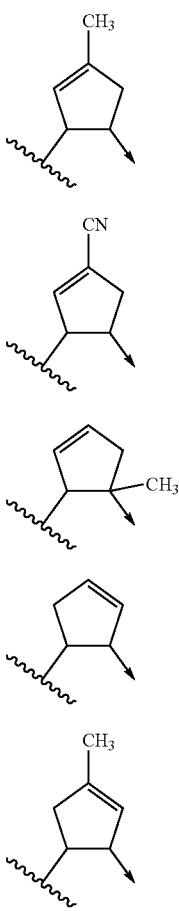

Z-8

Z-9

Z-10

Z-11

Z-12 where the arrow in each case represents a bond to the group C=W of the formula (I);
$X^2$, $X^4$ and $X^6$ are each independently hydrogen, fluorine, chlorine, bromine or cyano, or are methyl or methoxy, each substituted by m radicals from the group consisting of fluorine and chlorine;
$X^3$ and $X^5$ are each independently hydrogen, fluorine, cyano or methyl; and
m is the index 0, 1, 2 or 3.

In an 18th embodiment of the present invention,
G is a group of the formula $OR^4$;
$R^1$ and $R^2$ are each hydrogen;
$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;
$R^4$ is hydrogen, or $(C_1-C_3)$-alkyl or $(C_2-C_4)$-alkenyl, each substituted by m radicals from the group consisting of fluorine, chlorine and $(C_1-C_2)$-alkoxy;
Y is oxygen;
W is oxygen;
Z is a Z-1, Z-4 or Z-6 group:

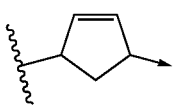

Z-1

-continued

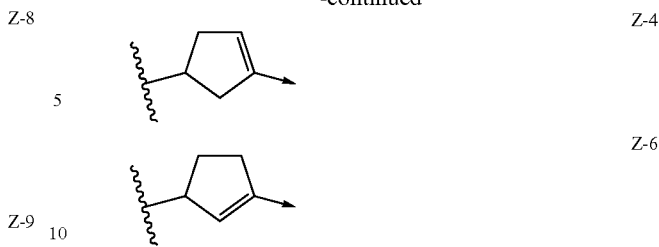

Z-4

Z-6 where the arrow in each case represents a bond to the group C=W of the formula (I);
$X^2$, $X^4$ and $X^6$ are each independently hydrogen or fluorine;
$X^3$ and $X^5$ are each independently hydrogen, fluorine, cyano or methyl; and
m is the index 0, 1, 2 or 3.

In a 19th embodiment of the present invention,
G is a group of the formula $OR^4$;
$R^1$ and $R^2$ are each hydrogen;
$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;
$R^4$ is hydrogen, or $(C_1-C_3)$-alkyl or $(C_2-C_4)$-alkenyl, each substituted by m radicals from the group consisting of fluorine, chlorine and $(C_1-C_2)$-alkoxy;
Y is oxygen;
W is oxygen;
Z is a Z-1, Z-4 or Z-6 group:

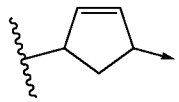

Z-1

Z-4

Z-6 where the arrow in each case represents a bond to the group C=W of the formula (I);
$X^2$, $X^4$ and $X^6$ are each hydrogen;
$X^3$ and $X^5$ are each fluorine; and
m is the index 0, 1, 2 or 3.

In a 20th embodiment of the present invention,
G is a group of the formula $NR^{11}R^{12}$;
$R^1$ and $R^2$ are each independently hydrogen, fluorine, chlorine or cyano, or are $(C_1-C_3)$-alkyl or $(C_1-C_3)$-alkoxy, each substituted by m radicals from the group consisting of fluorine, chlorine, bromine and cyano;
$R^3$ is cyano, or $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine, bromine, cyano, $(C_1-C_2)$-alkoxy and hydroxy;

Y is oxygen;

W is oxygen;

Z is a Z-1 to Z-12 group, where Z-1 to Z-12 are defined as follows:

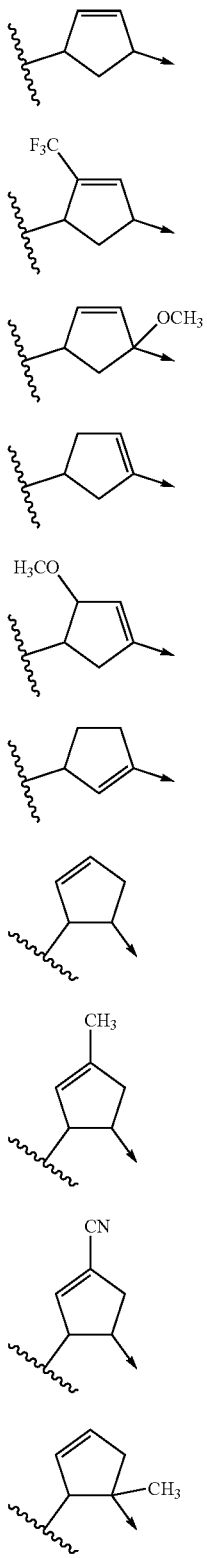

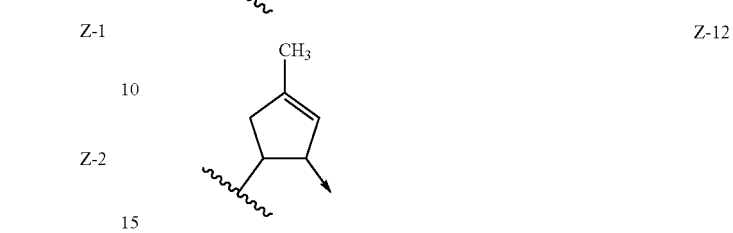

where the arrow in each case represents a bond to the group C═W of the formula (I);

$X^2$, $X^4$ and $X^6$ are each independently hydrogen, fluorine, chlorine, bromine or cyano, or are methyl or methoxy, each substituted by m radicals from the group consisting of fluorine and chlorine;

$X^3$ and $X^5$ are each independently hydrogen, fluorine, cyano or methyl; and $R^5$ is $(C_1-C_6)$-alkyl or $(C_3-C_6)$-cycloalkyl, each substituted by m radicals from the group consisting of fluorine and chlorine;

$R^6$ is hydrogen or $R^5$;

$R^7$ is hydrogen, or $(C_1-C_6)$-alkyl or $(C_3-C_6)$-cycloalkyl, each substituted by m radicals from the group consisting of fluorine, chlorine and $(C_1-C_2)$-alkoxy;

$R^8$ is hydrogen, or $(C_1-C_6)$-alkyl or $(C_3-C_6)$-cycloalkyl, each substituted by m radicals from the group consisting of fluorine, chlorine and $(C_1-C_2)$-alkoxy;

$R^{11}$ is hydrogen, or $(C_1-C_3)$-alkyl or $(C_3-C_6)$-cycloalkyl, each substituted by m radicals from the group consisting of fluorine and chlorine;

$R^{12}$ is preferably hydrogen, cyano, $OR^7$, $S(O)_nR^5$, $SO_2NR^6R^7$, $COR^6$, $NR^6R^8$, $NR^6COR^8$ or $NR^6SO_2R^8$, or $(C_1-C_6)$-alkyl, $(C_3-C_6)$-cycloalkyl, $(C_2-C_3)$-alkenyl or $(C_2-C_3)$-alkynyl, each substituted by m radicals from the group consisting of fluorine, chlorine, bromine, cyano, $OR^7$, $S(O)_nR^5$, $NR^6R^8$ and $NR^6CO_2R^8$; or $R^{11}$ and $R^{12}$ together with the nitrogen atom to which they are attached form a saturated, partially or fully unsaturated five-, six- or seven-membered ring which is optionally mono- to hexasubstituted by radicals from the group consisting of halogen, cyano, nitro, $(C_1-C_6)$-alkyl, halo-$(C_1-C_6)$-alkyl, oxo, $OR^7$, $CO_2R^8$ and $NR^6SO_2R^8$ and which, in addition to this nitrogen atom, contains r carbon atoms, o oxygen atoms, p sulfur atoms and q elements from the group consisting of $NR^7$ and $NCOR^7$ as ring atoms;

the index m is 0, 1, 2 or 3;

the index n is 0, 1 or 2;

the index o is 0, 1 or 2;

the index p is 0 or 1;

the index q is 0 or 1; and the index r is 3, 4 or 5.

In a 21st embodiment of the present invention,

G is a group of the formula $NR^{11}R^{12}$;

$R^1$ and $R^2$ are each hydrogen;

$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;

Y is oxygen;
W is oxygen;
Z is a Z-1, Z-4 or Z-6 group:

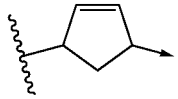

Z-1

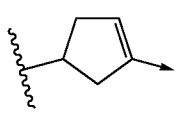

Z-4

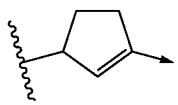

Z-6 where the arrow in each case represents a bond to the group C=W of the formula (I);
$X^2$, $X^4$ and $X^6$ are each independently hydrogen or fluorine;
$X^3$ and $X^5$ are each independently hydrogen, fluorine, cyano or methyl;
$R^5$ is $(C_1\text{-}C_6)$-alkyl or $(C_3\text{-}C_6)$-cycloalkyl, each substituted by m radicals from the group consisting of fluorine and chlorine;
$R^6$ is hydrogen or $R^5$;
$R^7$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^8$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^{11}$ is hydrogen or $(C_1\text{-}C_3)$-alkyl;
$R^{12}$ is $OR^7$, $S(O)_nR^5$, $SO_2NR^6R^7$, or $(C_1\text{-}C_6)$-alkyl substituted in each case by m radicals from the group consisting of fluorine, chlorine, cyano, $OR^7$ and $S(O)_nR^5$;
or
$R^{11}$ and $R^{12}$ together with the nitrogen atom to which they are bonded form a saturated or partly or fully unsaturated five- or six-membered ring which is optionally mono- to trisubstituted by radicals from the group consisting of halogen, $(C_1\text{-}C_6)$-alkyl, halo-$(C_1\text{-}C_6)$-alkyl and oxo and which, in addition to that nitrogen atom, contains r carbon atoms, o oxygen atoms, p sulfur atoms and q elements from the group consisting of $NR^7$ and $NCOR^7$ as ring atoms;
the index m is 0, 1, 2 or 3;
the index n is 0, 1 or 2;
the index o is 0, 1 or 2;
the index p is 0 or 1;
the index q is 0 or 1; and
the index r is 3, 4 or 5.

In a 22nd embodiment of the present invention,
G is a group of the formula $NR^{11}R^{12}$;
$R^1$ and $R^2$ are each hydrogen;
$R^3$ is $(C_1\text{-}C_3)$-alkyl, $(C_3\text{-}C_4)$-cycloalkyl, $(C_2\text{-}C_3)$-alkenyl or $(C_1\text{-}C_3)$-alkoxy, each substituted by m radicals from the group consisting of fluorine, chlorine and $(C_1\text{-}C_2)$-alkoxy;

Y is oxygen;
W is oxygen;
Z is a Z-1, Z-4 or Z-6 group:

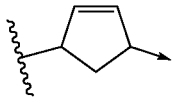

Z-1

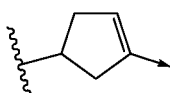

Z-4

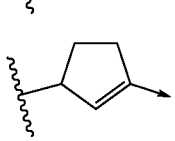

Z-6

where the arrow in each case represents a bond to the group C=W of the formula (I);
$X^2$, $X^4$ and $X^6$ are each hydrogen;
$X^3$ and $X^5$ are each fluorine;
$R^5$ is $(C_1\text{-}C_6)$-alkyl or $(C_3\text{-}C_6)$-cycloalkyl, each substituted by m radicals from the group consisting of fluorine and chlorine;
$R^6$ is hydrogen or $R^5$;
$R^7$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^8$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^{11}$ is hydrogen;
$R^{12}$ is $OR^7$, $S(O)_nR^5$, $SO_2NR^6R^7$, or $(C_1\text{-}C_6)$-alkyl substituted in each case by m radicals from the group consisting of fluorine, chlorine, cyano, $OR^7$ and $S(O)_nR^5$;
or
$R^{11}$ and $R^{12}$ together with the nitrogen atom to which they are bonded form a saturated or partly or fully unsaturated five- or six-membered ring which is optionally mono- to trisubstituted by radicals from the group consisting of halogen, $(C_1\text{-}C_6)$-alkyl, halo-$(C_1\text{-}C_6)$-alkyl and oxo and which, in addition to that nitrogen atom, contains r carbon atoms, o oxygen atoms, p sulfur atoms and q elements from the group consisting of $NR^7$ and $NCOR^7$ as ring atoms;
the index m is 0, 1, 2 or 3;
the index n is 0, 1 or 2;
the index o is 0, 1 or 2;
the index p is 0 or 1;
the index q is 0 or 1; and
the index r is 3, 4 or 5.

In a 23rd embodiment of the present invention, the herbicidal composition, as well as at least one component (B) as defined above, preferably comprises (A) one or more compounds [component (A)] of the general formula (I) [herbicides (A)] according to Table 1.

TABLE 1

| Compound No. | IUPAC name | Structural formula |
| --- | --- | --- |
| A1 | methyl (1S,4R)-4-[[[(5S)-3-(3,5-difluorophenyl)-5-vinyl-4H-1,2-oxazol-5-yl]carbonyl]amino]cyclopent-2-ene-1-carboxylate | |
| A2 | ethyl (1S,4R)-4-[[[3-(3,5-difluorophenyl)-5-methoxy-4H-1,2-oxazol-5-yl]carbonyl]amino]cyclopent-2-ene-1-carboxylate | |
| A3 | 2-methoxyethyl (1S,4R)-4-[[[(5R)-3-(3-cyano-5-fluorophenyl)-5-(trifluoromethyl)-4H-1,2-oxazol-5-yl]carbonyl]amino]cyclopent-2-ene-1-carboxylate | |
| A4 | methyl (4S)-4-[[[3-(3,5-difluorophenyl)-5-methyl-4H-1,2-oxazol-5-yl]carbonyl]amino]cyclopentene-1-carboxylate | |
| A5 | methyl (3S)-3-[[[(5R)-3-(3,5-difluorophenyl)-5-methyl-4H-1,2-oxazol-5-yl]carbonyl]amino]cyclopentene-1-carboxylate | |
| A6 | 3-(3,5-difluorophenyl)-N-[(1R,4S)-4-(oxazinan-2-ylcarbonyl)cyclopent-2-en-1-yl]-5-(trifluoromethyl)-4H-1,2-oxazole-5-carboxamide | |

TABLE 1-continued

IUPAC names and structural formulae of the preferred compounds of the formula (I) (herbicide (A))

| Compound No. | IUPAC name | Structural formula |
| --- | --- | --- |
| A7 | 3-(3,5-difluorophenyl)-N-[(1R,4S)-4-[(propylsulfonylamino)carbonyl]cyclopent-2-en-1-yl]-5-(trifluoromethyl)-4H-1,2-oxazole-5-carboxamide | |
| A8 | (1S,4R)-4-[[(5R)-3-(3,5-difluorophenyl)-5-methyl-4H-isoxazole-5-carbonyl]amino]cyclopent-2-ene-1-carboxylic acid | |

In Table 1, the compounds are identified by the chemical formula of the main component, this component being present in a chemical purity of preferably at least 95 percent by weight of the compound. The compounds can naturally also be used with lower purities. Especially when secondary components of the compounds consist entirely or predominantly of stereoisomers of the respective compounds (A), efficacies are achieved on application. Preferred herbicides (A) are therefore also mixtures of two or more compounds (A) of the invention.

When the stereochemical orientation at a carbon atom is defined in Table 1, the main component of the compound is a stereoisomer or stereoisomer mixture having the R or S configuration at the carbon atom in question.

If no stereochemistry is defined, the compound is a racemate. If there are multiple stereocentres and the configuration of each is identified as R or S, these are compounds having the stated stereochemistry at the centres in question.

If no R or S configuration is specified for multiple centres, the compounds are racemic mixtures, i.e. mirror-image stereoisomers (enantiomers of a pair of enantiomers) present therein are present in equal proportions in the mixture. Unless stated specifically, in Table 1, the diastereomeric components are present approximately in equal proportions in the case of racemic compounds (A) having multiple stereocentres. For practical use, however, mixtures of diastereomers having different proportions of the diastereomeric components exist in the case of racemic compounds having multiple stereocentres.

It is preferable here that the respective compounds listed are also present in a stereochemical purity of 60% to 100%, preferably 70-100%, especially 80% to 100%.

Preference is also given to the detailed mixtures of stereoisomeric compounds (A).

The compounds of the formula (I) are known from the application having reference PCT/EP2019/051333, which was yet to be published at the priority date of the present application, and can be prepared by the processes described therein.

The application rates of the herbicides (A) are in the range of 0.01 to 2000 g of active substance per hectare (g a.i./ha hereinafter), preferably 0.02 to 1000 g a.i./ha, especially 0.5 to 750 g a.i./ha. In the combinations of the invention, within the scope of the application rates mentioned by comparison to individual application, required application rates of the respective active ingredient are usually lower, preferably 0.01 to 1000 g a.i./ha, especially 0.02 to 500 g a.i./ha, and most preferably 5 to 250 g a.i./ha.

Suitable combination partners (B) [=component (B) or herbicides (B)] are in principle all active ingredients from subgroups (B1) to (B11), with the naming of the active herbicidal ingredients largely by their common name (in the English notation) according to the reference "The Pesticide Manual" 14th ed., British Crop Protection Council 2006, abbreviated to "PM", or by their chemical name according to the standard nomenclatures (IUPAC or Chemical Abstracts).

However, some herbicides (B) have surprisingly been found to be particularly good combination partners. The preferred, more preferred and most preferred herbicides (B) are listed hereinafter as further embodiments of the present invention.

In a 24th embodiment of the present invention, preference is given to the active herbicidal ingredients (B1):

| | |
| --- | --- |
| (B1.2) | bicyclopyrone, |
| (B1.4) | clethodim, |
| (B1.7) | mesotrione, |
| (B1.8) | pinoxaden, |
| (B1.10) | sethoxydim, |
| (B1.11) | sulcotrione, |
| (B1.14) | tembotrione and |
| (B1.16) | tralkoxydim. |

Particular preference is given to the active herbicidal ingredients

| | |
|---|---|
| (B1.7) | mesotrione, |
| (B1.8) | pinoxaden and |
| (B1.14) | tembotrione. |

In a 25th embodiment of the present invention, preference is given to the active herbicidal ingredients (B2):

| | |
|---|---|
| (B2.1) | acetochlor, |
| (B2.3) | amidosulfuron, |
| (B2.4) | asulam, |
| (B2.6) | beflubutamid, |
| (B2.10) | chlorimuron, |
| (B2.12) | chlorsulfuron, |
| (B2.14) | cloransulam, |
| (B2.17) | diclosulam, |
| (B2.18) | diflufenican, |
| (B2.23) | ethoxysulfuron, |
| (B2.24) | flazasulfuron, |
| (B2.25) | florasulam, |
| (B2.26) | flucarbazone, |
| (B2.28) | flufenacet, |
| (B2.29) | flumetsulam, |
| (B2.30) | flupyrsulfuron, |
| (B2.31) | foramsulfuron, |
| (B2.34) | iodosulfuron, |
| (B2.37) | mesosulfuron, |
| (B2.40) | metolachlor, |
| (B2.41) | metosulam, |
| (B2.42) | metsulfuron, |
| (B2.46) | penoxsulam, |
| (B2.49) | picolinafen, |
| (B2.56) | propoxycarbazone, |
| (B2.58) | propyzamide, |
| (B2.59) | prosulfocarb, |
| (B2.60) | prosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.68) | thiencarbazone, |
| (B2.69) | thifensulfuron, |
| (B2.72) | tribenuron, |
| (B2.76) | esprocarb, |
| (B2.78) | tri-allate. |

Particular preference is given to

| | |
|---|---|
| (B2.3) | amidosulfuron, |
| (B2.18) | diflufenican, |
| (B2.24) | flazasulfuron, |
| (B2.25) | florasulam, |
| (B2.26) | flucarbazone, |
| (B2.28) | flufenacet, |
| (B2.31) | foramsulfuron, |
| (B2.34) | iodosulfuron, |
| (B2.37) | mesosulfuron, |
| (B2.58) | propyzamide, |
| (B2.68) | thiencarbazone, |
| (B2.69) | thifensulfuron, |
| (B2.72) | tribenuron. |

In a 26th embodiment of the present invention, preference is given to the active herbicidal ingredients (B3):

| | |
|---|---|
| (B3.1) | bromoxynil and |
| (B3.4) | ioxynil. |

In a 27th embodiment of the present invention, preference is given to the active herbicidal ingredients (B4):

| | |
|---|---|
| (B4.2) | amitrole, |
| (B4.8) | carfentrazone, |
| (B4.10) | imazamethabenz, |
| (B4.11) | imazamox, |
| (B4.12) | imazapic, |
| (B4.13) | imazapyr, |
| (B4.15) | imazethapyr, |
| (B4.17) | isoxaben, |
| (B4.18) | isoxaflutole, |
| (B4.21) | pyraflufen, |
| (B4.22) | pyrasulfotole, |
| (B4.25) | pyroxasulfone and |
| (B4.28) | topramezone, |
| (B4.33) | flupoxam. |

Particular preference is given to

| | |
|---|---|
| (B4.18) | isoxaflutole and |
| (B4.25) | pyroxasulfone, |
| (B4.22) | pyrasulfotole. |

In a 28th embodiment of the present invention, preference is given to the active herbicidal ingredients (B5):

| | |
|---|---|
| (B5.1) | aminocyclopyrachlor, |
| (B5.2) | aminopyralid, |
| (B5.3) | benazolin, |
| (B5.5) | bentazone, |
| (B5.7) | bixlozone, |
| (B5.12) | cinidon, |
| (B5.13) | cinmethylin, |
| (B5.14) | clomazone, |
| (B5.21) | ethofumesate, |
| (B5.22) | flamprop, |
| (B5.23) | florpyrauxifen, |
| (B5.26) | flumioxazin, |
| (B5.27) | fluridone, |
| (B5.28) | flurochloridone, |
| (B5.29) | flurtamone, |
| (B5.31) | halauxifen, |
| (B5.32) | indanofan, |
| (B5.37) | paraquat, |
| (B5.38) | pelargonic acid, |
| (B5.39) | pendimethalin, |
| (B5.45) | triafamone and |
| (B5.46) | trifluralin, |
| (B5.47) | 4-amino-3-chloro-5-fluoro-6-(7-fluoro-1H-indol-6-yl)pyridine-2-carboxylic acid, |
| (B5.48) | cyclopyrimorate, |
| (B5.49) | diquat, |
| (B5.50) | oxaziclomefone. |

Particular preference is given to

| | |
|---|---|
| (B5.7) | bixlozone, |
| (B5.23) | florpyrauxifen, |
| (B5.31) | halauxifen and |
| (B5.38) | pelargonic acid. |

In a 29th embodiment of the present invention, preference is given to the active herbicidal ingredients (B6):

| | |
|---|---|
| (B6.2) | clopyralid, |
| (B6.3) | dicamba, |
| (B6.4) | fluroxypyr and |
| (B6.5) | picloram. |

Particular preference is given to

| | |
|---|---|
| (B6.2) | clopyralid, |
| (B6.3) | dicamba and |
| (B6.4) | fluroxypyr. |

In a 30th embodiment of the present invention, preference is given to the active herbicidal ingredients (B7):

| | |
|---|---|
| (B7.2) | bialaphos, |
| (B7.4) | glufosinate, |
| (B7.5) | glyphosate and |
| (B7.7) | sulfosate. |

Particular preference is given to

| | |
|---|---|
| (B7.4) | glufosinate and |
| (B7.5) | glyphosate. |

In a 31st embodiment of the present invention, preference is given to the active herbicidal ingredients (B8):

| | |
|---|---|
| (B8.1) | 2,4-D, |
| (B8.3) | 2,4-DP, |
| (B8.5) | aclonifen, |
| (B8.8) | clodinafop, |
| (B8.11) | diclofop, |
| (B8.13) | fenoxaprop, |
| (B8.20) | MCPA, |
| (B8.22) | mecoprop, |
| (B8.26) | quizalofop and |
| (B8.27) | quizalofop. |

Particular preference is given to (B8.1) 2,4-D and (B8.5) aclonifen.

In a 32nd embodiment of the present invention, preference is given to the active herbicidal ingredients (B9):

| | |
|---|---|
| (B9.10) | saflufenacil, |
| (B9.11) | terbacil, |
| (B9.13) | trifludimoxazin and |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate. |

Most preferred is (B9.10) saflufenacil.

In a 33rd embodiment of the present invention, preference is given to the active herbicidal ingredients (B10):

| | |
|---|---|
| (B10.1) | chlorbromuron, |
| (B10.2) | chlorotoluron, |
| (B10.5) | diuron, |
| (B10.8) | isoproturon, |
| (B10.9) | linuron, |
| (B10.10) | methabenzthiazuron, |
| (B10.11) | metobromuron, |
| (B10.12) | metoxuron and |
| (B10.13) | monolinuron. |

In a 34th embodiment of the present invention, preference is given to the active herbicidal ingredients (B11):

| | |
|---|---|
| (B11.1) | ametryne, |
| (B11.2) | atrazine, |
| (B11.5) | hexazinone, |
| (B11.6) | indaziflam, |
| (B11.8) | metribuzin, |
| (B11.12) | simazine, |
| (B11.15) | terbuthylazine and |
| (B11.16) | terbutryne. |

Particular preference is given to

| | |
|---|---|
| (B11.5) | hexazinone, |
| (B11.6) | indaziflam and |
| (B11.8) | metribuzin. |

In a 35th embodiment of the present invention, preference is given to the active herbicidal ingredients (B1) to (B11):

| | |
|---|---|
| (B1.2) | bicyclopyrone, |
| (B1.4) | clethodim, |
| (B1.7) | mesotrione, |
| (B1.8) | pinoxaden, |
| (B1.10) | sethoxydim, |
| (B1.11) | sulcotrione, |
| (B1.14) | tembotrione, |
| (B1.16) | tralkoxydim; |
| (B2.1) | acetochlor, |
| (B2.3) | amidosulfuron, |
| (B2.4) | asulam, |
| (B2.6) | beflubutamid, |
| (B2.10) | chlorimuron, |
| (B2.12) | chlorsulfuron, |
| (B2.14) | cloransulam, |
| (B2.17) | diclosulam, |
| (B2.18) | diflufenican, |
| (B2.23) | ethoxysulfuron, |
| (B2.24) | flazasulfuron, |
| (B2.25) | florasulam, |
| (B2.26) | flucarbazone, |
| (B2.28) | flufenacet, |
| (B2.29) | flumetsulam, |
| (B2.30) | flupyrsulfuron, |
| (B2.31) | foramsulfuron, |
| (B2.34) | iodosulfuron, |
| (B2.37) | mesosulfuron, |
| (B2.40) | metolachlor, |
| (B2.41) | metosulam, |
| (B2.42) | metsulfuron, |
| (B2.46) | penoxsulam, |
| (B2.49) | picolinafen, |
| (B2.56) | propoxycarbazone, |
| (B2.58) | propyzamide, |
| (B2.59) | prosulfocarb, |
| (B2.60) | prosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.68) | thiencarbazone, |
| (B2.69) | thifensulfuron, |
| (B2.72) | tribenuron, |
| (B2.76) | esprocarb, |
| (B2.78) | tri-allate; |
| (B3.1) | bromoxynil, |
| (B3.4) | ioxynil; |
| (B4.2) | amitrole, |
| (B4.8) | carfentrazone, |
| (B4.10) | imazamethabenz, |
| (B4.11) | imazamox, |
| (B4.12) | imazapic, |
| (B4.13) | imazapyr, |

| | |
|---|---|
| (B4.15) | imazethapyr, |
| (B4.17) | isoxaben, |
| (B4.18) | isoxaflutole, |
| (B4.21) | pyraflufen, |
| (B4.22) | pyrasulfotole, |
| (B4.25) | pyroxasulfone, |
| (B4.28) | topramezone, |
| (B4.33) | flupoxam; |
| (B5.1) | aminocyclopyrachlor, |
| (B5.2) | aminopyralid, |
| (B5.3) | benazolin, |
| (B5.5) | bentazone, |
| (B5.7) | bixlozone, |
| (B5.12) | cinidon, |
| (B5.13) | cinmethylin, |
| (B5.14) | clomazone, |
| (B5.21) | ethofumesate, |
| (B5.22) | flamprop, |
| (B5.23) | florpyrauxifen, |
| (B5.26) | flumioxazin, |
| (B5.27) | fluridone, |
| (B5.28) | flurochloridone, |
| (B5.29) | flurtamone, |
| (B5.31) | halauxifen, |
| (B5.32) | indanofan, |
| (B5.37) | paraquat, |
| (B5.38) | pelargonic acid, |
| (B5.39) | pendimethalin, |
| (B5.45) | triafamone, |
| (B5.46) | trifluralin, |
| (B5.47) | 4-amino-3-chloro-5-fluoro-6-(7-fluoro-1H-indol-6-yl)pyridine-2-carboxylic acid, |
| (B5.48) | cyclopyrimorate, |
| (B5.49) | diquat, |
| (B5.50) | oxaziclomefone; |
| (B6.2) | clopyralid, |
| (B6.3) | dicamba, |
| (B6.4) | fluroxypyr, |
| (B6.5) | picloram; |
| (B7.2) | bialaphos, |
| (B7.4) | glufosinate, |
| (B7.5) | glyphosate, |
| (B7.7) | sulfosate; |
| (B8.1) | 2,4-D, |
| (B8.3) | 2,4-DP, |
| (B8.5) | aclonifen, |
| (B8.8) | clodinafop, |
| (B8.11) | diclofop, |
| (B8.13) | fenoxaprop, |
| (B8.20) | MCPA, |
| (B8.22) | mecoprop, |
| (B8.26) | quizalofop, |
| (B8.27) | quizalofop; |
| (B9.10) | saflufenacil, |
| (B9.11) | terbacil, |
| (B9.13) | trifludimoxazin, |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate; |
| (B10.1) | chlorobromuron, |
| (B10.2) | chlorotoluron, |
| (B10.5) | diuron, |
| (B10.6) | diflufenzopyr, |
| (B10.8) | isoproturon, |
| (B10.9) | linuron, |
| (B10.10) | methabenzthiazuron, |
| (B10.11) | metobromuron, |
| (B10.12) | metoxuron, |
| (B10.13) | monolinuron; |
| (B11.1) | ametryne, |
| (B11.2) | atrazine, |
| (B11.5) | hexazinone, |
| (B11.6) | indaziflam, |
| (B11.8) | metribuzin, |
| (B11.12) | simazine, |
| (B11.15) | terbuthylazine, |
| (B11.16) | terbutryne. |

Particular preference is given to:

| | |
|---|---|
| (B1.7) | mesotrione, |
| (B1.8) | pinoxaden, |
| (B1.14) | tembotrione; |
| (B2.3) | amidosulfuron, |
| (B2.18) | diflufenican, |
| (B2.24) | flazasulfuron, |
| (B2.25) | florasulam, |
| (B2.26) | flucarbazone, |
| (B2.28) | flufenacet, |
| (B2.31) | foramsulfuron, |
| (B2.34) | iodosulfuron, |
| (B2.37) | mesosulfuron, |
| (B2.58) | propyzamide, |
| (B2.68) | thiencarbazone, |
| (B2.69) | thifensulfuron, |
| (B2.72) | tribenuron; |
| (B3.1) | bromoxynil, |
| (B4.18) | isoxaflutole, |
| (B4.22) | pyrasulfotole, |
| (B4.25) | pyroxasulfone; |
| (B5.7) | bixlozone, |
| (B5.23) | florpyrauxifen, |
| (B5.38) | pelargonic acid, |
| (B6.2) | clopyralid, |
| (B6.3) | dicamba, |
| (B6.4) | fluroxypyr, |
| (B7.4) | glufosinate, |
| (B7.5) | glyphosate, |
| (B8.1) | 2,4-D; |
| (B8.5) | aclonifen, |
| (B9.10) | saflufenacil, |
| (B11.5) | hexazinone, |
| (B11.6) | indaziflam, |
| (B11.8) | metribuzin. |

In the context of the present invention, it is possible to combine the individual preferred, more preferred and most preferred embodiments with one another as desired. This means that herbicidal compositions comprising (A) one or more compounds of the general formula (I) or agrochemically acceptable salts thereof [component (A)] and (B) one or more herbicides [component (B)] selected from the group of the active herbicidal ingredients (B1) to (B11) are encompassed by the present invention, in which any desired preferred, more preferred and most preferred embodiments disclosed can be combined with one another as detailed above.

Some binary compositions comprising (A) one or more herbicidally active compounds (A) of the general formula (I) or agrochemically acceptable salts thereof [herbicides (A)] and a herbicide (B) have surprisingly been found to be particularly advantageous. The preferred, more preferred and most preferred binary systems are listed hereinafter as further embodiments of the present invention.

In a 36th embodiment of the present invention, the composition preferably comprises (A) a compound of the general formula (I) or agrochemically acceptable salts thereof [herbicides (A)]

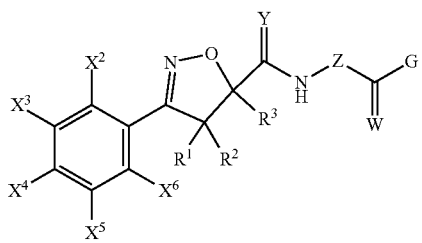

(I)

in which
G is a group of the formula $OR^4$;
$R^1$ and $R^2$ are each hydrogen;
$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;
$R^4$ is hydrogen, or $(C_1-C_3)$-alkyl or $(C_2-C_4)$-alkenyl, each substituted by m radicals from the group consisting of fluorine, chlorine and $(C_1-C_2)$-alkoxy;
Y is oxygen;
W is oxygen;
Z is a Z-1, Z-4 or Z-6 group:

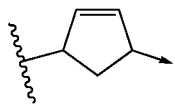

Z-1

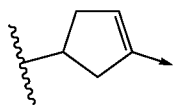

Z-4

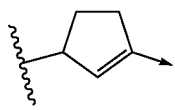

Z-6 where the arrow in each case represents a bond to the group C=W of the formula (I);
$X^2$, $X^4$ and $X^6$ are each independently hydrogen or fluorine;
$X^3$ and $X^5$ are each independently hydrogen, fluorine, cyano or methyl; and
the index m is 0, 1, 2 or 3;
and
(B) a herbicide [component (B)] from the group consisting of

| | |
|---|---|
| (B1.2) | bicyclopyrone, |
| (B1.4) | clethodim, |
| (B1.7) | mesotrione, |
| (B1.8) | pinoxaden, |
| (B1.10) | sethoxydim, |
| (B1.11) | sulcotrione, |
| (B1.14) | tembotrione, |
| (B1.16) | tralkoxydim; |
| (B2.1) | acetochlor, |
| (B2.3) | amidosulfuron, |
| (B2.4) | asulam, |
| (B2.6) | beflubutamid, |
| (B2.10) | chlorimuron, |
| (B2.12) | chlorsulfuron, |
| (B2.14) | cloransulam, |
| (B2.17) | diclosulam, |
| (B2.18) | diflufenican, |
| (B2.23) | ethoxysulfuron, |
| (B2.24) | flazasulfuron, |
| (B2.25) | florasulam, |
| (B2.26) | flucarbazone, |
| (B2.28) | flufenacet, |
| (B2.29) | flumetsulam, |
| (B2.30) | flupyrsulfuron, |
| (B2.31) | foramsulfuron, |
| (B2.34) | iodosulfuron, |
| (B2.37) | mesosulfuron, |
| (B2.40) | metolachlor, |
| (B2.41) | metosulam, |
| (B2.42) | metsulfuron, |
| (B2.46) | penoxsulam, |
| (B2.49) | picolinafen, |
| (B2.56) | propoxycarbazone, |
| (B2.58) | propyzamide, |
| (B2.59) | prosulfocarb, |
| (B2.60) | prosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.68) | thiencarbazone, |
| (B2.69) | thifensulfuron, |
| (B2.72) | tribenuron, |
| (B2.76) | esprocarb, |
| (B2.78) | tri-allate; |
| (B3.1) | bromoxynil, |
| (B3.4) | ioxynil; |
| (B4.2) | amitrole, |
| (B4.8) | carfentrazone, |
| (B4.10) | imazamethabenz, |
| (B4.11) | imazamox, |
| (B4.12) | imazapic, |
| (B4.13) | imazapyr, |
| (B4.15) | imazethapyr, |
| (B4.17) | isoxaben, |
| (B4.18) | isoxaflutole, |
| (B4.21) | pyraflufen, |
| (B4.22) | pyrasulfotole, |
| (B4.25) | pyroxasulfone, |
| (B4.28) | topramezone, |
| (B4.33) | flupoxam; |
| (B5.1) | aminocyclopyrachlor, |
| (B5.2) | aminopyralid, |
| (B5.3) | benazolin, |
| (B5.5) | bentazone, |
| (B5.7) | bixlozone, |
| (B5.12) | cinidon, |
| (B5.13) | cinmethylin, |
| (B5.14) | clomazone, |
| (B5.21) | ethofumesate, |
| (B5.22) | flamprop, |
| (B5.23) | florpyrauxifen, |
| (B5.26) | flumioxazin, |
| (B5.27) | fluridone, |
| (B5.28) | flurochloridone, |
| (B5.29) | flurtamone, |
| (B5.31) | halauxifen, |
| (B5.32) | indanofan, |
| (B5.37) | paraquat, |
| (B5.38) | pelargonic acid, |
| (B5.39) | pendimethalin, |
| (B5.45) | triafamone, |
| (B5.46) | trifluralin, |
| (B5.47) | 4-amino-3-chloro-5-fluoro-6-(7-fluoro-1H-indol-6-yl)pyridine-2-carboxylic acid, |
| (B5.48) | cyclopyrimorate, |
| (B5.49) | diquat, |
| (B5.50) | oxaziclomefone; |
| (B6.2) | clopyralid, |
| (B6.3) | dicamba, |
| (B6.4) | fluroxypyr, |
| (B6.5) | picloram; |
| (B7.2) | bialaphos, |

-continued

| | |
|---|---|
| (B7.4) | glufosinate, |
| (B7.5) | glyphosate, |
| (B7.7) | sulfosate; |
| (B8.1) | 2,4-D, |
| (B8.3) | 2,4-DP, |
| (B8.5) | aclonifen, |
| (B8.8) | clodinafop, |
| (B8.11) | diclofop, |
| (B8.13) | fenoxaprop, |
| (B8.20) | MCPA, |
| (B8.22) | mecoprop, |
| (B8.26) | quizalofop, |
| (B8.27) | quizalofop; |
| (B9.10) | saflufenacil, |
| (B9.11) | terbacil, |
| (B9.13) | trifludimoxazin, |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate; |
| (B10.1) | chlorobromuron, |
| (B10.2) | chlorotoluron, |
| (B10.5) | diuron, |
| (B10.6) | diflufenzopyr, |
| (B10.8) | isoproturon, |
| (B10.9) | linuron, |
| (B10.10) | methabenzthiazuron, |
| (B10.11) | metobromuron, |
| (B10.12) | metoxuron, |
| (B10.13) | monolinuron; |
| (B11.1) | ametryne, |
| (B11.2) | atrazine, |
| (B11.5) | hexazinone, |
| (B11.6) | indaziflam, |
| (B11.8) | metribuzin, |
| (B11.12) | simazine, |
| (B11.15) | terbuthylazine, |
| (B11.16) | terbutryne. |

In a 37th embodiment of the present invention, the composition preferably comprises (A) a compound of the general formula (I) or agrochemically acceptable salts thereof [herbicides (A)]

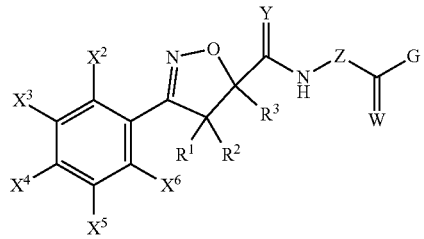

in which

G is a group of the formula $OR^4$;

$R^1$ and $R^2$ are each hydrogen;

$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;

$R^4$ is hydrogen, or $(C_1-C_3)$-alkyl or $(C_2-C_4)$-alkenyl, each substituted by m radicals from the group consisting of fluorine, chlorine and $(C_1-C_2)$-alkoxy;

Y is oxygen;

W is oxygen;

Z is a Z-1, Z-4 or Z-6 group:

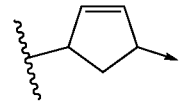

Z-1

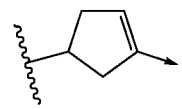

Z-4

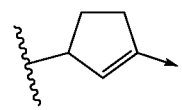

Z-6 where the arrow in each case represents a bond to the group C=W of the formula (I);

$X^2$, $X^4$ and $X^6$ are each hydrogen;

$X^3$ and $X^5$ are each fluorine; and the index m is 0, 1, 2 or 3;

and (B) a herbicide [component (B)] from the group consisting of

| | |
|---|---|
| (B1.7) | mesotrione, |
| (B1.8) | pinoxaden, |
| (B1.14) | tembotrione, |
| (B2.3) | amidosulfuron, |
| (B2.18) | diflufenican, |
| (B2.24) | flazasulfuron, |
| (B2.25) | florasulam, |
| (B2.26) | flucarbazone, |
| (B2.28) | flufenacet, |
| (B2.31) | foramsulfuron, |
| (B2.34) | iodosulfuron, |
| (B2.37) | mesosulfuron, |
| (B2.58) | propyzamide, |
| (B2.68) | thiencarbazone, |
| (B2.69) | thifensulfuron, |
| (B2.72) | tribenuron, |
| (B3.1) | bromoxynil, |
| (B4.18) | isoxaflutole, |
| (B4.22) | pyrasulfotole, |
| (B4.25) | pyroxasulfone, |
| (B5.7) | bixlozone, |
| (B5.23) | florpyrauxifen, |
| (B5.31) | halauxifen, |
| (B5.38) | pelargonic acid, |
| (B6.2) | clopyralid, |
| (B6.3) | dicamba, |
| (B6.4) | fluroxypyr, |
| (B7.4) | glufosinate, |
| (B7.5) | glyphosate, |
| (B8.1) | 2,4-D, |
| (B8.5) | aclonifen, |
| (B9.10) | saflufenacil, |
| (B11.5) | hexazinone, |
| (B11.6) | indaziflam, |
| (B11.8) | metribuzin. |

In a 38th embodiment of the present invention, the composition preferably comprises (A) a compound of the general formula (I) or agrochemically acceptable salts thereof [herbicides (A)]

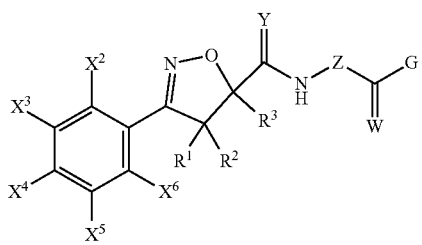

(I)

in which
G is a group of the formula $NR^{11}R^{12}$;
$R^1$ and $R^2$ are each hydrogen;
$R^3$ is $(C_1-C_3)$-alkyl, $(C_3-C_4)$-cycloalkyl, $(C_2-C_3)$-alkenyl or $(C_1-C_3)$-alkoxy, each substituted by m radicals from the group consisting of fluorine, chlorine and $(C_1-C_2)$-alkoxy;
Y is oxygen;
W is oxygen;
Z is a Z-1, Z-4 or Z-6 group:

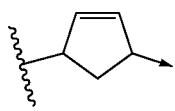

Z-1

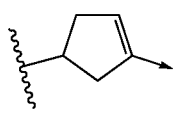

Z-4

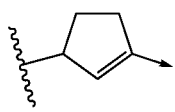

Z-6 where the arrow in each case represents a bond to the group C=W of the formula (I);
$X^2$, $X^4$ and $X^6$ are each independently hydrogen or fluorine;
$X^3$ and $X^5$ are each independently hydrogen, fluorine, cyano or methyl;
$R^5$ is $(C_1-C_6)$-alkyl or $(C_3-C_6)$-cycloalkyl, each substituted by m radicals from the group consisting of fluorine and chlorine;
$R^6$ is hydrogen or $R^5$;
$R^7$ is hydrogen, or $(C_1-C_6)$-alkyl or $(C_3-C_6)$-cycloalkyl, each substituted by m radicals from the group consisting of fluorine, chlorine and $(C_1-C_2)$-alkoxy;
$R^8$ is hydrogen, or $(C_1-C_6)$-alkyl or $(C_3-C_6)$-cycloalkyl, each substituted by m radicals from the group consisting of fluorine, chlorine and $(C_1-C_2)$-alkoxy;
$R^{11}$ is hydrogen or $(C_1-C_3)$-alkyl;
$R^{12}$ is $OR^7$, $S(O)_nR^5$, $SO_2NR^6R^7$, or $(C_1-C_6)$-alkyl substituted in each case by m radicals from the group consisting of fluorine, chlorine, cyano, $OR^7$ and $S(O)_nR^5$;
or
$R^{11}$ and $R^{12}$ together with the nitrogen atom to which they are bonded form a saturated or partly or fully unsaturated five- or six-membered ring which is optionally mono- to trisubstituted by radicals from the group consisting of halogen, $(C_1-C_6)$-alkyl, halo-$(C_1-C_6)$-alkyl and oxo and which, in addition to that nitrogen atom, contains r carbon atoms, o oxygen atoms, p sulfur atoms and q elements from the group consisting of $NR^7$ and $NCOR^7$ as ring atoms;

the index m is 0, 1, 2 or 3;
the index n is 0, 1 or 2;
the index o is 0, 1 or 2;
the index p is 0 or 1;
the index q is 0 or 1; and
the index r is 3, 4 or 5;
and
(B) a herbicide [component (B)] from the group consisting of

| | |
|---|---|
| (B1.2) | bicyclopyrone, |
| (B1.4) | clethodim, |
| (B1.7) | mesotrione, |
| (B1.8) | pinoxaden, |
| (B1.10) | sethoxydim, |
| (B1.11) | sulcotrione, |
| (B1.14) | tembotrione, |
| (B1.16) | tralkoxydim; |
| (B2.1) | acetochlor, |
| (B2.3) | amidosulfuron, |
| (B2.4) | asulam, |
| (B2.6) | beflubutamid, |
| (B2.10) | chlorimuron, |
| (B2.12) | chlorsulfuron, |
| (B2.14) | cloransulam, |
| (B2.17) | diclosulam, |
| (B2.18) | diflufenican, |
| (B2.23) | ethoxysulfuron, |
| (B2.24) | flazasulfuron, |
| (B2.25) | florasulam, |
| (B2.26) | flucarbazone, |
| (B2.28) | flufenacet, |
| (B2.29) | flumetsulam, |
| (B2.30) | flupyrsulfuron, |
| (B2.31) | foramsulfuron, |
| (B2.34) | iodosulfuron, |
| (B2.37) | mesosulfuron, |
| (B2.40) | metolachlor, |
| (B2.41) | metosulam, |
| (B2.42) | metsulfuron, |
| (B2.46) | penoxsulam, |
| (B2.49) | picolinafen, |
| (B2.56) | propoxycarbazone, |
| (B2.58) | propyzamide, |
| (B2.59) | prosulfocarb, |
| (B2.60) | prosulfuron, |
| (B2.62) | pyroxsulam, |
| (B2.63) | rimsulfuron, |
| (B2.64) | S-metolachlor, |
| (B2.65) | sulfometuron, |
| (B2.66) | sulfosulfuron, |
| (B2.68) | thiencarbazone, |
| (B2.69) | thifensulfuron, |
| (B2.72) | tribenuron, |
| (B2.76) | esprocarb, |
| (B2.78) | tri-allate; |
| (B3.1) | bromoxynil, |
| (B3.4) | ioxynil; |
| (B4.2) | amitrole, |
| (B4.8) | carfentrazone, |
| (B4.10) | imazamethabenz, |
| (B4.11) | imazamox, |
| (B4.12) | imazapic, |
| (B4.13) | imazapyr, |
| (B4.15) | imazethapyr, |
| (B4.17) | isoxaben, |
| (B4.18) | isoxaflutole, |
| (B4.21) | pyraflufen, |
| (B4.22) | pyrasulfotole, |
| (B4.25) | pyroxasulfone, |
| (B4.28) | topramezone, |
| (B4.33) | flupoxam; |
| (B5.1) | aminocyclopyrachlor, |
| (B5.2) | aminopyralid, |
| (B5.3) | benazolin, |
| (B5.5) | bentazone, |
| (B5.7) | bixlozone, |
| (B5.12) | cinidon, |
| (B5.13) | cinmethylin, |

-continued

| | |
|---|---|
| (B5.14) | clomazone, |
| (B5.21) | ethofumesate, |
| (B5.22) | flamprop, |
| (B5.23) | florpyrauxifen, |
| (B5.26) | flumioxazin, |
| (B5.27) | fluridone, |
| (B5.28) | flurochloridone, |
| (B5.29) | flurtamone, |
| (B5.31) | halauxifen, |
| (B5.32) | indanofan, |
| (B5.37) | paraquat, |
| (B5.38) | pelargonic acid, |
| (B5.39) | pendimethalin, |
| (B5.45) | triafamone, |
| (B5.46) | trifluralin, |
| (B5.47) | 4-amino-3-chloro-5-fluoro-6-(7-fluoro-1H-indol-6-yl)pyridine-2-carboxylic acid, |
| (B5.48) | cyclopyrimorate, |
| (B5.49) | diquat, |
| (B5.50) | oxaziclomefone; |
| (B6.2) | clopyralid, |
| (B6.3) | dicamba, |
| (B6.4) | fluroxypyr, |
| (B6.5) | picloram; |
| (B7.2) | bialaphos, |
| (B7.4) | glufosinate, |
| (B7.5) | glyphosate, |
| (B7.7) | sulfosate; |
| (B8.1) | 2,4-D, |
| (B8.3) | 2,4-DP, |
| (B8.5) | aclonifen, |
| (B8.8) | clodinafop, |
| (B8.11) | diclofop, |
| (B8.13) | fenoxaprop, |
| (B8.20) | MCPA, |
| (B8.22) | mecoprop, |
| (B8.26) | quizalofop, |
| (B8.27) | quizalofop; |
| (B9.10) | saflufenacil, |
| (B9.11) | terbacil, |
| (B9.13) | trifludimoxazin, |
| (B9.14) | ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate; |
| (B10.1) | chlorobromuron, |
| (B10.2) | chlorotoluron, |
| (B10.5) | diuron, |
| (B10.6) | diflufenzopyr, |
| (B10.8) | isoproturon, |
| (B10.9) | linuron, |
| (B10.10) | methabenzthiazuron, |
| (B10.11) | metobromuron, |
| (B10.12) | metoxuron, |
| (B10.13) | monolinuron; |
| (B11.1) | ametryne, |
| (B11.2) | atrazine, |
| (B11.5) | hexazinone, |
| (B11.6) | indaziflam, |
| (B11.8) | metribuzin, |
| (B11.12) | simazine, |
| (B11.15) | terbuthylazine, |
| (B11.16) | terbutryne. |

In a 39th embodiment of the present invention, the composition preferably comprises
(A) a compound of the general formula (I) or agrochemically acceptable salts thereof [herbicides (A)]

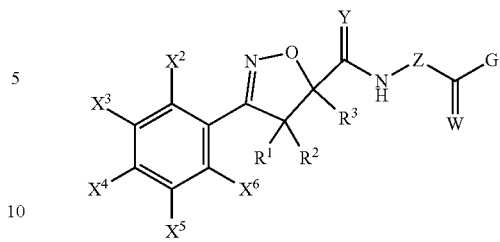

in which
G is a group of the formula $NR^{11}R^{12}$;
$R^1$ and $R^2$ are each hydrogen;
$R^3$ is $(C_1\text{-}C_3)$-alkyl, $(C_3\text{-}C_4)$-cycloalkyl, $(C_2\text{-}C_3)$-alkenyl or $(C_1\text{-}C_3)$-alkoxy, each substituted by m radicals from the group consisting of fluorine, chlorine and $(C_1\text{-}C_2)$-alkoxy;
Y is oxygen;
W is oxygen;
Z is a Z-1, Z-4 or Z-6 group:

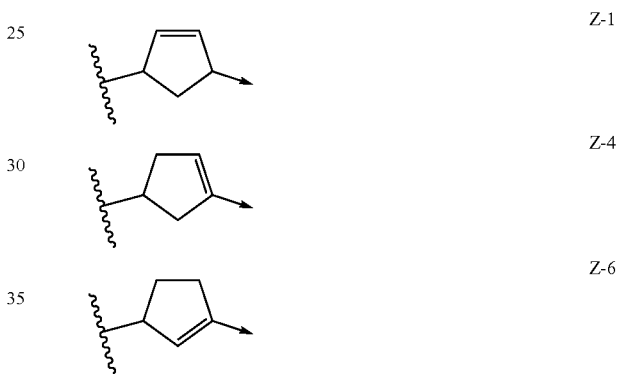

where the arrow in each case represents a bond to the group C=W of the formula (I);
$X^2$, $X^4$ and $X^6$ are each hydrogen;
$X^3$ and $X^5$ are each fluorine;
$R^5$ is $(C_1\text{-}C_6)$-alkyl or $(C_3\text{-}C_6)$-cycloalkyl, each substituted by m radicals from the group consisting of fluorine and chlorine;
$R^6$ is hydrogen or $R^5$;
$R^7$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^8$ is hydrogen, or $(C_1\text{-}C_6)$-alkyl or $(C_3\text{-}C_6)$-cycloalkyl, each substituted by m radicals from the group consisting of fluorine, chlorine and $(C_1\text{-}C_2)$-alkoxy;
$R^{11}$ is hydrogen;
$R^{12}$ is $OR^7$, $S(O)_nR^5$, $SO_2NR^6R^7$, or $(C_1\text{-}C_6)$-alkyl substituted in each case by m radicals from the group consisting of fluorine, chlorine, cyano, $OR^7$ and $S(O)_nR^5$;
or
$R^{11}$ and $R^{12}$ together with the nitrogen atom to which they are bonded form a saturated or partly or fully unsaturated five- or six-membered ring which is optionally mono- to trisubstituted by radicals from the group consisting of halogen, $(C_1\text{-}C_6)$-alkyl, halo-$(C_1\text{-}C_6)$-alkyl and oxo and which, in addition to that nitrogen atom, contains r carbon atoms, o oxygen atoms, p sulfur atoms and q elements from the group consisting of $NR^7$ and $NCOR^7$ as ring atoms;

the index m is 0, 1, 2 or 3;
the index n is 0, 1 or 2;
the index o is 0, 1 or 2;
the index p is 0 or 1;
the index q is 0 or 1; and
the index r is 3, 4 or 5,
and
(B) a herbicide [component (B)] from the group consisting of

| | |
|---|---|
| (B1.7) | mesotrione, |
| (B1.8) | pinoxaden, |
| (B1.14) | tembotrione, |
| (B2.3) | amidosulfuron, |
| (B2.18) | diflufenican, |
| (B2.24) | flazasulfuron, |
| (B2.25) | florasulam, |
| (B2.26) | flucarbazone, |
| (B2.28) | flufenacet, |
| (B2.31) | foramsulfuron, |
| (B2.34) | iodosulfuron, |
| (B2.37) | mesosulfuron, |
| (B2.58) | propyzamide, |
| (B2.68) | thiencarbazone, |
| (B2.69) | thifensulfuron, |
| (B2.72) | tribenuron, |
| (B3.1) | bromoxynil, |
| (B4.18) | isoxaflutole, |
| (B4.22) | pyrasulfotole, |
| (B4.25) | pyroxasulfone, |
| (B5.7) | bixlozone, |
| (B5.23) | florpyrauxifen, |
| (B5.31) | halauxifen, |
| (B5.38) | pelargonic acid, |
| (B6.2) | clopyralid, |
| (B6.3) | dicamba, |
| (B6.4) | fluroxypyr, |
| (B7.4) | glufosinate, |
| (B7.5) | glyphosate, |
| (B8.1) | 2,4-D, |
| (B8.5) | aclonifen, |
| (B9.10) | saflufenacil, |
| (B11.5) | hexazinone, |
| (B11.6) | indaziflam, |
| (B11.8) | metribuzin. |

Particularly preferred compositions in the context of the present invention are the compositions listed in Tables 2.1-2.9 below:

TABLE 2.1

Particularly preferred binary compositions comprising (A1)

| Binary composition | Compound (A) | Compound (B) |
|---|---|---|
| Z1 | A1 | (B1.7) |
| Z2 | A1 | (B1.8) |
| Z3 | A1 | (B1.14) |
| Z4 | A1 | (B2.3) |
| Z5 | A1 | (B2.18) |
| Z6 | A1 | (B2.24) |
| Z7 | A1 | (B2.25) |
| Z8 | A1 | (B2.26) |
| Z9 | A1 | (B2.28) |
| Z10 | A1 | (B2.31) |
| Z11 | A1 | (B2.34) |
| Z12 | A1 | (B2.37) |
| Z13 | A1 | (B2.68) |
| Z14 | A1 | (B2.69) |
| Z15 | A1 | (B2.72) |
| Z16 | A1 | (B4.18) |
| Z17 | A1 | (B4.25) |
| Z18 | A1 | (B5.7) |
| Z19 | A1 | (B5.23) |
| Z20 | A1 | (B5.31) |
| Z21 | A1 | (B5.38) |
| Z22 | A1 | (B6.2) |
| Z23 | A1 | (B6.3) |
| Z24 | A1 | (B6.4) |
| Z25 | A1 | (B7.4) |
| Z26 | A1 | (B7.5) |
| Z27 | A1 | (B8.1) |
| Z28 | A1 | (B8.5) |
| Z29 | A1 | (B9.10) |
| Z30 | A1 | (B11.5) |
| Z31 | A1 | (B11.6) |
| Z32 | A1 | (B11.8) |

TABLE 2.2

Particularly preferred binary compositions comprising (A2)

| Binary composition | Compound (A) | Compound (B) |
|---|---|---|
| Z33 | A2 | (B1.7) |
| Z34 | A2 | (B1.8) |
| Z35 | A2 | (B1.14) |
| Z36 | A2 | (B2.3) |
| Z37 | A2 | (B2.18) |
| Z38 | A2 | (B2.24) |
| Z39 | A2 | (B2.25) |
| Z40 | A2 | (B2.26) |
| Z41 | A2 | (B2.28) |
| Z42 | A2 | (B2.31) |
| Z43 | A2 | (B2.34) |
| Z44 | A2 | (B2.37) |
| Z45 | A2 | (B2.68) |
| Z46 | A2 | (B2.69) |
| Z47 | A2 | (B2.72) |
| Z48 | A2 | (B4.18) |
| Z49 | A2 | (B4.25) |
| Z50 | A2 | (B5.7) |
| Z51 | A2 | (B5.23) |
| Z52 | A2 | (B5.31) |
| Z53 | A2 | (B5.38) |
| Z54 | A2 | (B6.2) |
| Z55 | A2 | (B6.3) |
| Z56 | A2 | (B6.4) |
| Z57 | A2 | (B7.4) |
| Z58 | A2 | (B7.5) |
| Z59 | A2 | (B8.1) |
| Z60 | A2 | (B8.5) |
| Z61 | A2 | (B9.10) |
| Z62 | A2 | (B11.5) |
| Z63 | A2 | (B11.6) |
| Z64 | A2 | (B11.8) |

TABLE 2.3

Particularly preferred binary compositions comprising (A3)

| Binary composition | Compound (A) | Compound (B) |
|---|---|---|
| Z65 | A3 | (B1.7) |
| Z66 | A3 | (B1.8) |
| Z67 | A3 | (B1.14) |
| Z68 | A3 | (B2.3) |
| Z69 | A3 | (B2.18) |
| Z70 | A3 | (B2.24) |
| Z71 | A3 | (B2.25) |
| Z72 | A3 | (B2.26) |
| Z73 | A3 | (B2.28) |
| Z74 | A3 | (B2.31) |
| Z75 | A3 | (B2.34) |
| Z76 | A3 | (B2.37) |
| Z77 | A3 | (B2.68) |
| Z78 | A3 | (B2.69) |

TABLE 2.3-continued

Particularly preferred binary compositions comprising (A3)

| Binary composition | Compound (A) | Compound (B) |
|---|---|---|
| Z79 | A3 | (B2.72) |
| Z80 | A3 | (B4.18) |
| Z81 | A3 | (B4.25) |
| Z82 | A3 | (B5.7) |
| Z83 | A3 | (B5.23) |
| Z84 | A3 | (B5.31) |
| Z85 | A3 | (B5.38) |
| Z86 | A3 | (B6.2) |
| Z87 | A3 | (B6.3) |
| Z88 | A3 | (B6.4) |
| Z89 | A3 | (B7.4) |
| Z90 | A3 | (B7.5) |
| Z91 | A3 | (B8.1) |
| Z92 | A3 | (B8.5) |
| Z93 | A3 | (B9.10) |
| Z94 | A3 | (B11.5) |
| Z95 | A3 | (B11.6) |
| Z96 | A3 | (B11.8) |

TABLE 2.4

Particularly preferred binary compositions comprising (A4)

| Binary composition | Compound (A) | Compound (B) |
|---|---|---|
| Z97 | A4 | (B1.7) |
| Z98 | A4 | (B1.8) |
| Z99 | A4 | (B1.14) |
| Z100 | A4 | (B2.3) |
| Z101 | A4 | (B2.18) |
| Z102 | A4 | (B2.24) |
| Z103 | A4 | (B2.25) |
| Z104 | A4 | (B2.26) |
| Z105 | A4 | (B2.28) |
| Z106 | A4 | (B2.31) |
| Z107 | A4 | (B2.34) |
| Z108 | A4 | (B2.37) |
| Z109 | A4 | (B2.68) |
| Z110 | A4 | (B2.69) |
| Z111 | A4 | (B2.72) |
| Z112 | A4 | (B4.18) |
| Z113 | A4 | (B4.25) |
| Z114 | A4 | (B5.7) |
| Z115 | A4 | (B5.23) |
| Z116 | A4 | (B5.31) |
| Z117 | A4 | (B5.38) |
| Z118 | A4 | (B6.2) |
| Z119 | A4 | (B6.3) |
| Z120 | A4 | (B6.4) |
| Z121 | A4 | (B7.4) |
| Z122 | A4 | (B7.5) |
| Z123 | A4 | (B8.1) |
| Z124 | A4 | (B8.5) |
| Z125 | A4 | (B9.10) |
| Z126 | A4 | (B11.5) |
| Z127 | A4 | (B11.6) |
| Z128 | A4 | (B11.8) |

TABLE 2.5

Particularly preferred binary compositions comprising (A5)

| Binary composition | Compound (A) | Compound (B) |
|---|---|---|
| Z129 | A5 | (B1.7) |
| Z130 | A5 | (B1.8) |
| Z131 | A5 | (B1.14) |
| Z132 | A5 | (B2.3) |
| Z133 | A5 | (B2.18) |
| Z134 | A5 | (B2.24) |
| Z135 | A5 | (B2.25) |
| Z136 | A5 | (B2.26) |
| Z137 | A5 | (B2.28) |
| Z138 | A5 | (B2.31) |
| Z139 | A5 | (B2.34) |
| Z140 | A5 | (B2.37) |
| Z141 | A5 | (B2.68) |
| Z142 | A5 | (B2.69) |
| Z143 | A5 | (B2.72) |
| Z144 | A5 | (B4.18) |
| Z145 | A5 | (B4.25) |
| Z146 | A5 | (B5.7) |
| Z147 | A5 | (B5.23) |
| Z148 | A5 | (B5.31) |
| Z149 | A5 | (B5.38) |
| Z150 | A5 | (B6.2) |
| Z151 | A5 | (B6.3) |
| Z152 | A5 | (B6.4) |
| Z153 | A5 | (B7.4) |
| Z154 | A5 | (B7.5) |
| Z155 | A5 | (B8.1) |
| Z156 | A5 | (B8.5) |
| Z157 | A5 | (B9.10) |
| Z158 | A5 | (B11.5) |
| Z159 | A5 | (B11.6) |
| Z160 | A5 | (B11.8) |

TABLE 2.6

Particularly preferred binary compositions comprising (A6)

| Binary composition | Compound (A) | Compound (B) |
|---|---|---|
| Z161 | A6 | (B1.7) |
| Z162 | A6 | (B1.8) |
| Z163 | A6 | (B1.14) |
| Z164 | A6 | (B2.3) |
| Z165 | A6 | (B2.18) |
| Z166 | A6 | (B2.24) |
| Z167 | A6 | (B2.25) |
| Z168 | A6 | (B2.26) |
| Z169 | A6 | (B2.28) |
| Z170 | A6 | (B2.31) |
| Z171 | A6 | (B2.34) |
| Z172 | A6 | (B2.37) |
| Z173 | A6 | (B2.68) |
| Z174 | A6 | (B2.69) |
| Z175 | A6 | (B2.72) |
| Z176 | A6 | (B4.18) |
| Z177 | A6 | (B4.25) |
| Z178 | A6 | (B5.7) |
| Z179 | A6 | (B5.23) |
| Z180 | A6 | (B5.31) |
| Z181 | A6 | (B5.38) |
| Z182 | A6 | (B6.2) |
| Z183 | A6 | (B6.3) |
| Z184 | A6 | (B6.4) |
| Z185 | A6 | (B7.4) |
| Z186 | A6 | (B7.5) |
| Z187 | A6 | (B8.1) |
| Z188 | A6 | (B8.5) |
| Z189 | A6 | (B9.10) |
| Z190 | A6 | (B11.5) |
| Z191 | A6 | (B11.6) |
| Z192 | A6 | (B11.8) |

TABLE 2.7

Particularly preferred binary compositions comprising (A7)

| Binary composition | Compound (A) | Compound (B) |
|---|---|---|
| Z193 | A7 | (B1.7) |
| Z194 | A7 | (B1.8) |
| Z195 | A7 | (B1.14) |
| Z196 | A7 | (B2.3) |
| Z197 | A7 | (B2.18) |
| Z198 | A7 | (B2.24) |
| Z199 | A7 | (B2.25) |
| Z200 | A7 | (B2.26) |
| Z201 | A7 | (B2.28) |
| Z202 | A7 | (B2.31) |
| Z203 | A7 | (B2.34) |
| Z204 | A7 | (B2.37) |
| Z205 | A7 | (B2.68) |
| Z206 | A7 | (B2.69) |
| Z207 | A7 | (B2.72) |
| Z208 | A7 | (B4.18) |
| Z209 | A7 | (B4.25) |
| Z210 | A7 | (B5.7) |
| Z211 | A7 | (B5.23) |
| Z212 | A7 | (B5.31) |
| Z213 | A7 | (B5.38) |
| Z214 | A7 | (B6.2) |
| Z215 | A7 | (B6.3) |
| Z216 | A7 | (B6.4) |
| Z217 | A7 | (B7.4) |
| Z218 | A7 | (B7.5) |
| Z219 | A7 | (B8.1) |
| Z220 | A7 | (B8.5) |
| Z221 | A7 | (B9.10) |
| Z222 | A7 | (B11.5) |
| Z223 | A7 | (B11.6) |
| Z224 | A7 | (B11.8) |

TABLE 2.8

Particularly preferred binary compositions comprising (A8)

| Binary composition | Compound (A) | Compound (B) |
|---|---|---|
| Z225 | A8 | (B1.7) |
| Z226 | A8 | (B1.8) |
| Z227 | A8 | (B1.14) |
| Z228 | A8 | (B2.3) |
| Z229 | A8 | (B2.18) |
| Z230 | A8 | (B2.24) |
| Z231 | A8 | (B2.25) |
| Z232 | A8 | (B2.26) |
| Z233 | A8 | (B2.28) |
| Z234 | A8 | (B2.31) |
| Z235 | A8 | (B2.34) |
| Z236 | A8 | (B2.37) |
| Z237 | A8 | (B2.68) |
| Z238 | A8 | (B2.69) |
| Z239 | A8 | (B2.72) |
| Z240 | A8 | (B4.18) |
| Z241 | A8 | (B4.25) |
| Z242 | A8 | (B5.7) |
| Z243 | A8 | (B5.23) |
| Z244 | A8 | (B5.31) |
| Z245 | A8 | (B5.38) |
| Z246 | A8 | (B6.2) |
| Z247 | A8 | (B6.3) |
| Z248 | A8 | (B6.4) |
| Z249 | A8 | (B7.4) |
| Z250 | A8 | (B7.5) |
| Z251 | A8 | (B8.1) |
| Z252 | A8 | (B8.5) |
| Z253 | A8 | (B9.10) |
| Z254 | A8 | (B11.5) |
| Z255 | A8 | (B11.6) |
| Z256 | A8 | (B11.8) |

TABLE 2.9

Further particularly preferred binary compositions comprising (A1)

| Binary composition | Compound (A) | Compound (B) |
|---|---|---|
| Z257 | A1 | (B3.1) |
| Z258 | A1 | (B2.58) |
| Z259 | A1 | (B4.22) |

Furthermore, the combinations of the invention can be used together with other active ingredients such as the active ingredients mentioned (herbicides, fungicides, insecticides, acaricides etc.) and/or plant growth regulators or auxiliaries from the group of additives customary in crop protection, such as adjuvants and formulation aids. The combination of the active crop protection ingredients comprising the active ingredients (A) and (B) and optionally further active ingredients are referred to here as "herbicide combination" for short. Their use forms such as formulations or tank mixes are herbicidal products (compositions).

The invention therefore also provides the herbicidal products comprising the active ingredient combinations of the invention with additives customary in crop protection, such as adjuvants and formulation aids, and optionally further active crop protection ingredients.

The invention also provides for the use of, or the application method using, the active ingredient combinations of the invention as herbicides and plant growth regulators, preferably as herbicides and plant growth regulators having a synergistically active content of the respective active ingredient combination present.

The application rates of the herbicides (B) are known in principle and are generally in the range of 0.01 to 4000 g a.i./ha, preferably in the range of 0.02 to 2000 g a.i./ha, especially 1 to 2000 g a.i./ha. For the active ingredient pelargonic acid (B5.38) from group (B5), the application rate is in the range of 1 to 100 000 g a.i./ha.

In the mixtures of the invention, in the context of the application rates mentioned, required application rates of the respective active ingredient are generally lower compared to individual application.

For the active ingredients from group (B1), the application rate is preferably in the range of 5 to 250 g a.i./ha, especially in the range of 5 to 150 g/ha and most preferably in the range of 5 to 60 g a.i./ha.

For the active ingredients from group (B2), the application rate is preferably in the range of 1 to 4000 g a.i./ha, especially in the range of 1 to 2000 g a.i./ha and most preferably in the range of 1 to 400 g a.i./ha.

For the active ingredient from group (B3), the application rate is preferably in the range of 10 to 1000 g a.i./ha, especially in the range of 10 to 500 g a.i./ha and most preferably in the range of 10 to 300 g a.i./ha.

For the active ingredient from group (B4), the application rate is preferably in the range of 1 to 700 g a.i./ha, especially in the range of 1 to 400 g a.i./ha and most preferably in the range of 1 to 200 g a.i./ha.

For the active ingredient from group (B5), excluding pelargonic acid (B5.38), the application rate is preferably in the range of 1 to 2400 g a.i./ha, especially in the range of 1 to 1200 g a.i./ha and most preferably in the range of 1 to 400 g a.i./ha. For pelargonic acid (B5.38), the application rate is preferably 1 to 100 000 g a.i./ha, more preferably 1 to 40 000 g a.i./ha and especially in the range from 1 to 30 000 g a.i./ha.

For the active ingredient from group (B6), the application rate is preferably in the range of 10 to 1000 g a.i./ha, especially in the range of 10 to 600 g a.i./ha.

For the active ingredient from group (B7), the application rate is preferably in the range of 20 to 3500 g a.i./ha, especially in the range of 20 to 2500 g a.i./ha and most preferably in the range of 20 to 2000 g a.i./ha.

For the active ingredient from group (B8), the application rate is preferably in the range of 5 to 1500 g a.i./ha, especially in the range of 5 to 1000 g a.i./ha and most preferably in the range of 5 to 900 g a.i./ha.

For the active ingredient from group (B9), the application rate is preferably in the range of 2 to 2000 g a.i./ha, especially in the range of 2 to 1000 g a.i./ha, more preferably in the range of 2 to 200 g a.i./ha and most preferably in the range of 2 to 50 g a.i./ha.

For the active ingredient from group (B10), the application rate is preferably in the range of 20 to 3500 g a.i./ha, especially in the range of 20 to 2000 g a.i./ha.

For the active ingredient from group (B11), the application rate is preferably in the range of 25 to 3000 g a.i./ha, especially in the range of 25 to 2500 g a.i./ha and most preferably in the range of 25 to 2000 g a.i./ha.

The ratios of (A):(B) based on weight, depending on the effective application rates, are generally in the range of 1:100 000 to 2000:1, preferably 1:40 000 to 750:1, especially in the range of 1:15 000 to 500:1 and even further preferably in the range of 1:300 to 400:1.

For the active ingredients from groups (B1) to (B11), the preferred weight ratios (A):(B) are as follows:
 (A):(B1) preferably in the range of 30:1 to 1:30, especially of 15:1 to 1:15;
 (A):(B2) preferably in the range of 400:1 to 1:400, especially of 200:1 to 1:200;
 (A):(B3) preferably in the range of 30:1 to 1:30, especially of 15:1 to 1:15;
 (A):(B4) preferably in the range of 300:1 to 1:300, especially of 150:1 to 1:150;
 (A):(B5) preferably in the range of 400:1 to 1:300, especially of 300:1 to 1:150;
 (A):(B6) preferably in the range of 60:1 to 1:60, especially of 30:1 to 1:30;
 (A):(B7) preferably in the range of 10:1 to 1:200, especially of 1:1 to 1:100;
 (A):(B8) preferably in the range of 30:1 to 1:300, especially of 10:1 to 1:80;
 (A):(B9) preferably in the range of 80:1 to 1:200, especially of 40:1 to 1:100;
 (A):(B10) preferably in the range of 10:1 to 1:300, especially of 3:1 to 1:150;
 (A):(B11) preferably in the range of 30:1 to 1:300, especially of 15:1 to 1:150.

The herbicidal compositions of the invention can also be combined with further herbicides and plant growth regulators, for example to supplement the activity spectrum. Combination partners usable for the compounds according to the invention in mixed formulations or in a tankmix are, for example, known active ingredients based on inhibition of, for example, acetolactate synthase, acetyl-CoA carboxylase, cellulose synthase, enolpyruvylshikimate-3-phosphate synthase, glutamine synthetase, p-hydroxyphenylpyruvate dioxygenase, phytoene desaturase, photosystem I, photosystem II, protoporphyrinogen oxidase, as known, for example, from Weed Research 26 (1986) 441-445 or "The Pesticide Manual", 14th edition, The British Crop Protection Council and the Royal Soc. of Chemistry, 2006, the corresponding "e-Pesticide Manual Version 4 (2006)", and literature cited therein. Further trade names and "common names" are listed in the "Compendium of Pesticide Common Names" (available on the Internet under http://www.alanwood.net/pesticides).

Examples of known herbicides which can be combined with the compounds of the invention include the active ingredients which follow (N.B.: the compounds are designated either by the common name according to the International Organization for Standardization (ISO) or by the chemical name, in some cases together with a standard code number) and always encompass all use forms, such as acids, salts, esters and isomers, such as stereoisomers and optical isomers. The list includes one and in some cases also more than one application form: 2,4-D, acetochlor, acifluorfen, acifluorfen-sodium, aclonifen, alachlor, alloxydim, alloxydim-sodium, ametryn, amicarbazone, amidosulfuron, amitrole, anilofos, asulam, atrazine, azafenidin, azimsulfuron, beflubutamid, benazolin, benazolin-ethyl, benfuresate, bensulfuron-methyl, bentazone, benzfendizone, benzobicyclon, benzofenap, bifenox, bilanafos, bispyribac-sodium, bromacil, bromobutide, bromofenoxim, bromoxynil, butachlor, butafenacil, butenachlor, butralin, butroxydim, butylate, cafenstrole, carbetamide, carfentrazone-ethyl, chlomethoxyfen, chloridazon, chlorimuron-ethyl, chlornitrofen, chlorotoluron, chlorsulfuron, cinidon-ethyl, cinmethylin, cinosulfuron, clefoxydim, clethodim, clodinafop-propargyl, clomazone, clomeprop, clopyralid, cloransulam-methyl, cumyluron, cyanazine, cyclosulfamuron, cycloxydim, cyhalofop-butyl, desmedipham, dicamba, dichlobenil, dichlorprop, dichlorprop-P, diclofop-methyl, diclosulam, difenzoquat, diflufenican, diflufenzopyr, dikegulac-sodium, dimefuron, dimepiperate, dimethachlor, dimethametryn, dimethenamid, triaziflam, diquat-dibromide, dithiopyr, diuron, dymron, EPTC, esprocarb, ethalfluralin, ethametsulfuron-methyl, ethoxyfen, ethoxysulfuron, etobenzanid, fenoxaprop-ethyl, fenoxaprop-P-ethyl, fentrazamide, flamprop-M-isopropyl, flamprop-M-methyl, flazasulfuron, florasulam, fluazifop, fluazifop-butyl, fluazifop-butyl, fluazolate, flucarbazone-sodium, flucetosulfuron, fluchloralin, flufenacet, flufenpyr, flumetsulam, flumiclorac-pentyl, flumioxazin, fluometuron, fluorochloridone, fluoroglycofen-ethyl, flupoxam, flupyrsulfuron-methyl-sodium, fluridone, fluroxypyr, fluroxypyr-butoxypropyl, fluroxypyr-meptyl, flurprimidol, flurtamone, fluthiacet-methyl, fomesafen, foramsulfuron, glufosinate, glufosinate-ammonium, glyphosate, halosulfuron-methyl, haloxyfop, haloxyfop-ethoxyethyl, haloxyfop-methyl, haloxyfop-P-methyl, hexazinone, imazamethabenz-methyl, imazamox, imazapic, imazapyr, imazaquin, imazethapyr, imazosulfuron, indanofan, iodosulfuron-methyl-sodium, ioxynil, isoproturon, isouron, isoxaben, isoxachlortole, isoxaflutole, ketospiradox, lactofen, lenacil, linuron, MCPA, mecoprop, mecoprop-P, mefenacet, mesosulfuron-methyl, mesotrione, metamifop, metamitron, metazachlor, methabenzthiazuron, methyldymron, metobromuron, metolachlor, metosulam, metoxuron, metribuzin, metsulfuron-methyl, molinate, monolinuron, naproanilide, napropamide, neburon, nicosulfuron, norflurazon, orbencarb, oryzalin, oxadiargyl, oxadiazon, oxasulfuron, oxaziclomefone, oxyfluorfen, paraquat, pelargonic acid, pendimethalin, pendralin, pentoxazone, pethoxamid, phenmedipham, picloram, picolinafen, pinoxaden, piperophos, pretilachlor, primisulfuron-methyl, profluazol, profoxydim, prometryn, propachlor, propanil, propaquizafop, propisochlor, propoxycarbazone-sodium, propyzamide, prosulfocarb, prosulfuron, pyraclonil, pyraflufen-ethyl, pyrazolate, pyrazosulfuron-ethyl, pyrazoxyfen, pyribenzoxim, pyributicarb, pyridafol, pyridate, pyriftalid, pyriminobac-methyl, pyrithiobac-sodium, quinclorac, quinmerac, quinoclamine, quizalofop-ethyl, quizalofop-P-ethyl, quizalofop-P-tefuryl, rimsulfuron, sethoxydim, simazine, simetryn, S-metolachlor, sulcotrione, sulfentrazone, sulfometuron-methyl, sulfosate, sulfosulfuron, tebuthiuron, tepraloxydim, terbuthylazine, terbutryn, thenylchlor, thiazopyr, thifensulfuron-methyl, thiobencarb, tiocarbazil, tralkoxydim, triallate, triasulfuron, tribenuron-methyl, triclopyr, tridiphane, trifloxysulfuron, trifluralin, triflusulfuron-methyl, tritosulfuron, WL 110547, i.e. 5-phenoxy-1-[3-(trifluoromethyl)phenyl]-1H-tetrazole; HOK-201, HOK-202, UBH-509; D-489; LS 82-556; KPP-300; NC-324; NC-330; KH-218; DPX-N8189; SC-0774; TH-547, DOWCO-535; DK-8910; V-53482; PP-600; MBH-001; KIH-9201; ET-751; KIH-6127; KIH-2023 and KIH5996.

If the respective common name encompasses more than one form of the active ingredient, the name preferably defines the commercially available form.

Each of the further active ingredients mentioned (=active ingredients (C*), (C1*), (C2*) etc.) may then preferably be combined with one of the binary combinations according to the present invention, according to the scheme (A)+(B)+(C*) or else according to the scheme (A)+(B)+(C1*)+(C2*) etc.

The stated amounts are application rates (g a.i./ha=grams of active substance per hectare) and hence also define the ratios in a co-formulation, a premix, a tankmix or a sequential application of the combined active ingredients.

The combinations can be applied both by the pre-emergence method and by the post-emergence method. This applies both to pre- and post-emergence with respect to the harmful plants and, in the case of selective control of the harmful plants, to pre- or post-emergence of the crop plants. Mixed forms are also possible, for example control of the harmful plants at their pre- or post-emergence stage after emergence of the crop plants.

The herbicide combinations of the invention may comprise further components, for example other active ingredients against harmful organisms such as harmful plants, plant-damaging animals or plant-damaging fungi, in this case especially active ingredients from the group of herbicides, fungicides, insecticides, acaricides, nematicides, miticides and related substances.

Fungicidally active compounds that can be used in combination with the herbicide combinations of the invention are preferably standard commercial active ingredients, for example (analogously to the herbicides, the compounds are generally named by their common names):

1) Ergosterol biosynthesis inhibitors, for example (1.001) cyproconazole, (1.002) difenoconazole, (1.003) epoxiconazole, (1.004) fenhexamid, (1.005) fenpropidin, (1.006) fenpropimorph, (1.007) fenpyrazamine, (1.008) fluquinconazole, (1.009) flutriafol, (1.010) imazalil, (1.011) imazalil sulfate, (1.012) ipconazole, (1.013) metconazole, (1.014) myclobutanil, (1.015) paclobutrazole, (1.016) prochloraz, (1.017) propiconazole, (1.018) prothioconazole, (1.019) pyrisoxazole, (1.020) spiroxamine, (1.021) tebuconazole, (1.022) tetraconazole, (1.023) triadimenol, (1.024) tridemorph, (1.025) triticonazole, (1.026) (1R,2S,5S)-5-(4-chlorobenzyl)-2-(chloromethyl)-2-methyl-1-(1H-1,2,4-triazol-1-ylmethyl)cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.028) (2R)-2-(1-chlorocyclopropyl)-4-[(1R)-2,2-dichlorocyclopropyl]-1-(1H-1,2,4-triazol-1-yl)butan-2-ol, (1.029) (2R)-2-(1-chlorocyclopropyl)-4-[(1S)-2,2-dichlorocyclopropyl]-1-(1H-1,2,4-triazol-1-yl)butan-2-ol, (1.030) (2R)-2-[4-(4-chlorophenoxy)-2-(trifluoromethyl)phenyl]-1-(1H-1,2,4-triazol-1-yl)propan-2-ol, (1.031) (2S)-2-(1-chlorocyclopropyl)-4-[(1R)-2,2-dichlorocyclopropyl]-1-(1H-1,2,4-triazol-1-yl)butan-2-ol, (1.032) (2S)-2-(1-chlorocyclopropyl)-4-[(1S)-2,2-dichlorocyclopropyl]-1-(1H-1,2,4-triazol-1-yl)butan-2-ol, (1.033) (2S)-2-[4-(4-chlorophenoxy)-2-(trifluoromethyl)phenyl]-1-(1H-1,2,4-triazol-1-yl)propan-2-ol, (1.034) (R)-[3-(4-chloro-2-fluorophenyl)-5-(2,4-difluorophenyl)-1,2-oxazol-4-yl](pyridin-3-yl)methanol, (1.035) (S)-[3-(4-chloro-2-fluorophenyl)-5-(2,4-difluorophenyl)-1,2-oxazol-4-yl](pyridin-3-yl)methanol, (1.036) [3-(4-chloro-2-fluorophenyl)-5-(2,4-difluorophenyl)-1,2-oxazol-4-yl](pyridin-3-yl)methanol, (1.037) 1-({(2R,4S)-2-[2-chloro-4-(4-chlorophenoxy)phenyl]-4-methyl-1,3-dioxolan-2-yl}methyl)-1H-1,2,4-triazole, (1.038) 1-({(2S,4S)-2-[2-chloro-4-(4-chlorophenoxy)phenyl]-4-methyl-1,3-dioxolan-2-yl}methyl)-1H-1,2,4-triazole, (1.039) 1-{[3-(2-chlorophenyl)-2-(2,4-difluorophenyl)oxiran-2-yl]methyl}-1H-1,2,4-triazol-5-yl thiocyanate, (1.040) 1-{[rel(2R,3R)-3-(2-chlorophenyl)-2-(2,4-difluorophenyl)oxiran-2-yl]methyl}-1H-1,2,4-triazol-5-yl thiocyanate, (1.041) 1-{[rel(2R,3S)-3-(2-chlorophenyl)-2-(2,4-difluorophenyl)oxiran-2-yl]methyl}-1H-1,2,4-triazol-5-yl thiocyanate, (1.042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (1.043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (1.044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (1.045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (1.046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (1.047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (1.048) 2-[(2S,4S,5R)-1-(2,4-dichlorophenyl)-5-hydroxy-2,6,6-trimethylheptan-4-yl]-2,4-dihydro-3H-1,2,4-triazole-3-thione, (1.049) 2-[(2S,4S,5S)-1-(2,4-dichlorophenyl)-5-hydroxy-2,6,6-trimethylheptan-4-yl]-2,4-dihydro-3H-1,2,4-triazole-3-thione, (1.050) 2-[1-(2,4-dichlorophenyl)-5-hydroxy-2,6,6-trimethylheptan-4-yl]-2,4-dihydro-3H-1,2,4-triazole-3-thione, (1.051) 2-[2-chloro-4-(2,4-dichlorophenoxy)phenyl]-1-(1H-1,2,4-triazol-1-yl)propan-2-ol, (1.052) 2-[2-chloro-4-(4-chlorophenoxy)phenyl]-1-(1H-1,2,4-triazol-1-yl)butan-2-ol, (1.053) 2-[4-(4-chlorophenoxy)-2-(trifluoromethyl)phenyl]-1-(1H-1,2,4-triazol-1-yl)butan-2-ol, (1.054) 2-[4-(4-chlorophenoxy)-2-(trifluoromethyl)phenyl]-1-(1H-1,2,4-triazol-1-yl)pentan-2-ol, (1.055) 2-[4-(4-chlorophenoxy)-2-(trifluoromethyl)phenyl]-1-(1H-1,2,4-triazol-1-yl)propan-2-ol, (1.056) 2-{[3-(2-chlorophenyl)-2-(2,4-difluorophenyl)oxiran-2-yl]methyl}-2,4-dihydro-3H-1,2,4-triazole-3-thione, (1.057) 2-{[rel(2R,3R)-3-(2-chlorophenyl)-2-(2,4-difluorophenyl)oxiran-2-yl]methyl}-2,4-dihydro-3H-1,2,4-triazole-3-thione, (1.058) 2-{[rel(2R,3S)-3-(2-chlorophenyl)-2-(2,4-difluorophenyl)oxiran-2-yl]methyl}-2,4-dihydro-3H-1,2,4-triazole-3-thione, (1.059) 5-(4-chlorobenzyl)-2-(chloromethyl)-2-methyl-1-(1H-1,2,4-triazol-1-ylmethyl)cyclopentanol, (1.060) 5-(allylsulfanyl)-1-{[3-(2-chlorophenyl)-2-(2,4-difluorophenyl)oxiran-2-yl]methyl}-1H-1,2,4-triazole, (1.061) 5-(allylsulfanyl)-1-{[rel(2R,3R)-3-(2-chlorophenyl)-2-(2,4-difluorophenyl)oxiran-2-yl]methyl}-1H-1,2,4-triazole, (1.062) 5-(allylsulfanyl)-1-{[rel(2R,3S)-3-(2-chlorophenyl)-2-(2,4-difluorophenyl)oxiran- 2-yl]methyl}-1H-1,2,4-triazole, (1.063) N'-(2,5-dimethyl-4-{[3-(1,1,2,2-tetrafluoroethoxy)phenyl]sulfanyl}phenyl)-N-ethyl-N-methylimidoformamide, (1.064) N'-(2,5-dimethyl-4-{[3-(2,2,2-trifluoroethoxy)phenyl]sulfanyl}phenyl)-N-ethyl-N-methylimidoformamide, (1.065) N'-(2,5-dimethyl-4-{[3-(2,2,3,3-tetrafluoropropoxy)phenyl]sulfanyl}phenyl)-N-ethyl-N-methylimidoformamide, (1.066) N'-(2,5-dimethyl-4-{[3-(pentafluoroethoxy)phenyl]sulfanyl}phenyl)-N-ethyl-N-methylimidoformamide, (1.067) N'-(2,5-dimethyl-4-{3-[(1,1,2,2-tetrafluoroethyl)sulfanyl]phenoxy}phenyl)-N-ethyl-N-methylimidoformamide, (1.068) N'-(2,5-dimethyl-4-{3-[(2,2,2-trifluoroethyl)sulfanyl]phenoxy}phenyl)-N-ethyl-N-methylimidoformamide, (1.069) N'-(2,5-dimethyl-4-{3-[(2,2,3,3-tetrafluoropropyl)sulfanyl]phenoxy}phenyl)-N-ethyl-N-methylimidoformamide, (1.070) N'-(2,5-dimethyl-4-{3-[(pentafluoroethyl)sulfanyl]phenoxy}phenyl)-N-ethyl-N-methylimidoformamide, (1.071) N'-(2,5-dimethyl-4-phenoxyphenyl)-N-ethyl-N-methylimidoformamide, (1.072) N'-(4-{[3-(difluoromethoxy)phenyl]sulfanyl}-2,5-dimethylphenyl)-N-ethyl-N-methylimidoformamide, (1.073) N'-(4-{3-[(difluoromethyl)sulfanyl]phenoxy}-2,5-dimethylphenyl)-N-ethyl-N-methylimidoformamide, (1.074) N'-[5-bromo-6-(2,3-dihydro-1H-inden-2-yloxy)-2-methylpyridin-3-yl]-N-ethyl-N-methylimidoformamide, (1.075) N'-{4-[(4,5-dichloro-1,3-thiazol-2-yl)oxy]-2,5-dimethylphenyl}-N-ethyl-N-methylimidoformamide, (1.076) N'-{5-bromo-6-[(1R)-1-(3,5-difluorophenyl)ethoxy]-2-methylpyridin-3-yl}-N-ethyl-N-methylimidoformamide, (1.077) N'-{5-bromo-6-[(1S)-1-(3,5-difluorophenyl)ethoxy]-2-methylpyridin-3-yl}-N-ethyl-N-methylimidoformamide, (1.078) N'-{5-bromo-6-[(cis-4-isopropylcyclohexyl)oxy]-2-methylpyridin-3-yl}-N-ethyl-N-methylimidoformamide, (1.079) N'-{5-bromo-6-[(trans-4-isopropylcyclohexyl)oxy]-2-methylpyridin-3-yl}-N-ethyl-N-methylimidoformamide, (1.080) N'-{5-bromo-6-[1-(3,5-difluorophenyl)ethoxy]-2-methylpyridin-3-yl}-N-ethyl-N-methylimidoformamide, (1.081) mefentrifluconazole, (1.082) ipfentrifluconazole.

2) Inhibitors of the respiratory chain in complex I or II, for example (2.001) benzovindiflupyr, (2.002) bixafen, (2.003) boscalid, (2.004) carboxin, (2.005) fluopyram, (2.006) flutolanil, (2.007) fluxapyroxad, (2.008) furametpyr, (2.009) isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of the syn-epimeric racemate 1RS,4SR,9RS and the anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.020) pyraziflumid, (2.021) sedaxane, (2.022) 1,3-dimethyl-N-(1,1,3-trimethyl-2,3-dihydro-1H-inden-4-yl)-1H-pyrazole-4-carboxamide, (2.023) 1,3-dimethyl-N-[(3R)-1,1,3-trimethyl-2,3-dihydro-1H-inden-4-yl]-1H-pyrazole-4-carboxamide, (2.024) 1,3-dimethyl-N-[(3S)-1,1,3-trimethyl-2,3-dihydro-1H-inden-4-yl]-1H-pyrazole-4-carboxamide, (2.025) 1-methyl-3-(trifluoromethyl)-N-[2'-(trifluoromethyl)biphenyl-2-yl]-1H-pyrazole-4-carboxamide, (2.026) 2-fluoro-6-(trifluoromethyl)-N-(1,1,3-trimethyl-2,3-dihydro-1H-inden-4-yl)benzamide, (2.027) 3-(difluoromethyl)-1-methyl-N-(1,1,3-trimethyl-2,3-dihydro-1H-inden-4-yl)-1H-pyrazole-4-carboxamide, (2.028) 3-(difluoromethyl)-1-methyl-N-[(3R)-1,1,3-trimethyl-2,3-dihydro-1H-inden-4-yl]-1H-pyrazole-4-carboxamide, (2.029) 3-(difluoromethyl)-1-methyl-N-[(3S)-1,1,3-trimethyl-2,3-dihydro-1H-inden-4-yl]-1H-pyrazole-4-carboxamide, (2.030) 3-(difluoromethyl)-N-(7-fluoro-1,1,3-trimethyl-2,3-dihydro-1H-inden-4-yl)-1-methyl-1H-pyrazole-4-carboxamide, (2.031) 3-(difluoromethyl)-N-[(3R)-7-fluoro-1,1,3-trimethyl-2,3-dihydro-1H-inden-4-yl]-1-methyl-1H-pyrazole-4-carboxamide, (2.032) 3-(difluoromethyl)-N-[(3S)-7-fluoro-1,1,3-trimethyl-2,3-dihydro-1H-inden-4-yl]-1-methyl-1H-pyrazole-4-carboxamide, (2.033) 5,8-difluoro-N-[2-(2-fluoro-4-{[4-(trifluoromethyl)pyridin-2-yl]oxy}phenyl)ethyl]quinazolin-4-amine, (2.034) N-(2-cyclopentyl-5-fluorobenzyl)-N-cyclopropyl-3-(difluoromethyl)-5-fluoro-1-methyl-1H-pyrazole-4-carboxamide, (2.035) N-(2-tert-butyl-5-methylbenzyl)-N-cyclopropyl-3-(difluoromethyl)-5-fluoro-1-methyl-1H-pyrazole-4-carboxamide, (2.036) N-(2-tert-butylbenzyl)-N-cyclopropyl-3-(difluoromethyl)-5-fluoro-1-methyl-1H-pyrazole-4-carboxamide, (2.037) N-(5-chloro-2-ethylbenzyl)-N-cyclopropyl-3-(difluoromethyl)-5-fluoro-1-methyl-1H-pyrazole-4-carboxamide, (2.038) N-(5-chloro-2-isopropylbenzyl)-N-cyclopropyl-3-(difluoromethyl)-5-fluoro-1-methyl-1H-pyrazole-4-carboxamide, (2.039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (2.040) N-[(1S,4R)-9-(dichloromethylene)-1,2,3,4-tetrahydro-1,4-methanonaphthalen-5-yl]-3-(difluoromethyl)-1-methyl-1H-pyrazole-4-carboxamide, (2.041) N-[1-(2,4-dichlorophenyl)-1-methoxypropan-2-yl]-3-(difluoromethyl)-1-methyl-1H-pyrazole-4-carboxamide, (2.042) N-[2-chloro-6-(trifluoromethyl)benzyl]-N-cyclopropyl-3-(difluoromethyl)-5-fluoro-1-methyl-1H-pyrazole-4-carboxamide, (2.043) N-[3-chloro-2-fluoro-6-(trifluoromethyl)benzyl]-N-cyclopropyl-3-(difluoromethyl)-5-fluoro-1-methyl-1H-pyrazole-4-carboxamide, (2.044) N-[5-chloro-2-(trifluoromethyl)benzyl]-N-cyclopropyl-3-(difluoromethyl)-5-fluoro-1-methyl-1H-pyrazole-4-carboxamide, (2.045) N-cyclopropyl-3-(difluoromethyl)-5-fluoro-1-methyl-N-[5-methyl-2-(trifluoromethyl)benzyl]-1H-pyrazole-4-carboxamide, (2.046) N-cyclopropyl-3-(difluoromethyl)-5-fluoro-N-(2-fluoro-6-isopropylbenzyl)-1-methyl-1H-pyrazole-4-carboxamide, (2.047) N-cyclopropyl-3-(difluoromethyl)-5-fluoro-N-(2-isopropyl-5-methylbenzyl)-1-methyl-1H-pyrazole-4-carboxamide, (2.048) N-cyclopropyl-3-(difluoromethyl)-5-fluoro-N-(2-isopropylbenzyl)-1-methyl-1H-pyrazole-4-carbothioamide, (2.049) N-cyclopropyl-3-(difluoromethyl)-5-fluoro-N-(2-isopropylbenzyl)-1-methyl-1H-pyrazole-4-carboxamide, (2.050) N-cyclopropyl-3-(difluoromethyl)-5-fluoro-N-(5-fluoro-2-isopropylbenzyl)-1-methyl-1H-pyrazole-4-carboxamide, (2.051) N-cyclopropyl-3-(difluoromethyl)-N-(2-ethyl-4,5-dimethylbenzyl)-5-fluoro-1-methyl-1H-pyrazole-4-carboxamide, (2.052) N-cyclopropyl-3-(difluoromethyl)-N-(2-ethyl-5-fluorobenzyl)-5-fluoro-1-methyl-1H-pyrazole-4-carboxamide, (2.053) N-cyclopropyl-3-(difluoromethyl)-N-(2-ethyl-5-methylbenzyl)-5-fluoro-1-methyl-1H-pyrazole-4-carboxamide, (2.054) N-cyclopropyl-N-(2-cyclopropyl-5-fluorobenzyl)-3-(difluoromethyl)-5-fluoro-1-methyl-1H-pyrazole-4-carboxamide, (2.055) N-cyclopropyl-N-(2-cyclopropyl-5-methylbenzyl)-3-(difluoromethyl)-5-fluoro-1-methyl-1H-pyrazole-4-carboxamide, (2.056) N-cyclopropyl-N-(2-cyclopropylbenzyl)-3-(difluoromethyl)-5-fluoro-1-methyl-1H-pyrazole-4-carboxamide.

3) Respiratory chain inhibitors acting on complex III, for example (3.001) ametoctradin, (3.002) amisulbrom, (3.003) azoxystrobin, (3.004) coumethoxystrobin, (3.005) coumoxystrobin, (3.006) cyazofamid, (3.007) dimoxystrobin, (3.008) enoxastrobin, (3.009) famoxadon, (3.010) fenamidon, (3.011) flufenoxystrobin, (3.012) fluoxastrobin, (3.013) kresoxim-methyl, (3.014) metominostrobin, (3.015) orysastrobin, (3.016) picoxystrobin, (3.017) pyraclostrobin, (3.018) pyrametostrobin, (3.019) pyraoxystrobin, (3.020) trifloxystrobin, (3.021) (2E)-2-{2-[({[(1E)-1-(3-{[(E)-1-fluoro-2-phenylvinyl]oxy}phenyl)ethylidene]amino}oxy)methyl]phenyl}-2-(methoxyimino)-N-methylacetamide, (3.022) (2E,3Z)-5-{[1-(4-chlorophenyl)-1H-pyrazol-3-yl]oxy}-2-(methoxyimino)-N,3-dimethylpent-3-enamide, (3.023) (2R)-2-{2-[(2,5-dimethylphenoxy)methyl]phenyl}-2-methoxy-N-methylacetamide, (3.024) (2S)-2-{2-[(2,5-dimethylphenoxy)methyl]phenyl}-2-methoxy-N-methylacetamide, (3.025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, (3.026) 2-{2-[(2,5-dimethylphenoxy)methyl]phenyl}-2-methoxy-N-methylacetamide, (3.027) N-(3-ethyl-3,5,5-trimethylcyclohexyl)-3-formamido-2-hydroxybenzamide, (3.028) (2E,3Z)-5-{[1-(4-chloro-2-fluorophenyl)-1H-pyrazol-3-yl]oxy}-2-(methoxyimino)-N,3-dimethylpent-3-enamide, (3.029) methyl {5-[3-(2,4-dimethylphenyl)-1H-pyrazol-1-yl]-2-methylbenzyl}carbamate.

4) Mitosis and cell division inhibitors, for example (4.001) carbendazim, (4.002) diethofencarb, (4.003) ethaboxam, (4.004) fluopicolid, (4.005) pencycuron, (4.006) thiabendazole, (4.007) thiophanate-methyl, (4.008) zoxamide, (4.009) 3-chloro-4-(2,6-difluorophenyl)-6-methyl-5-phenylpyridazine, (4.010) 3-chloro-5-(4-chlorophenyl)-4-(2,6-difluorophenyl)-6-methylpyridazine, (4.011) 3-chloro-5-(6-chloropyridin-3-yl)-6-methyl-4-(2,4,6-trifluorophenyl)pyridazine, (4.012) 4-(2-bromo-4-fluorophenyl)-N-(2,6-difluorophenyl)-1,3-dimethyl-1H-pyrazol-5-amine, (4.013) 4-(2-bromo-4-fluorophenyl)-N-(2-bromo-6-fluorophenyl)-1,3-dimethyl-1H-pyrazol-5-amine, (4.014) 4-(2-bromo-4-fluorophenyl)-N-(2-bromophenyl)-1,3-dimethyl-1H-pyrazol-5-amine, (4.015) 4-(2-bromo-4-fluorophenyl)-N-(2-chloro-6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, (4.017) 4-(2-bromo-4-fluorophenyl)-N-(2-fluorophenyl)-1,3-dimethyl-1H-pyrazol-5-amine, (4.018) 4-(2-chloro-4-fluorophenyl)-N-(2,6-difluorophenyl)-1,3-dimethyl-1H-pyrazol-5-amine, (4.019) 4-(2-chloro-4-fluorophenyl)-N-(2-chloro-6-fluorophenyl)-1,3-dimethyl-1H-pyrazol-5-amine, (4.020) 4-(2-chloro-4-fluorophenyl)-N-(2-chlorophenyl)-1,3-dimethyl-1H-pyrazol-5-amine, (4.021) 4-(2-chloro-4-fluorophenyl)-N-(2-fluorophenyl)-1,3-dimethyl-1H-pyrazol-5-amine, (4.022) 4-(4-chlorophenyl)-5-(2,6-difluorophenyl)-3,6-dimethylpyridazine, (4.023) N-(2-bromo-6-fluorophenyl)-4-(2-chloro-4-fluorophenyl)-1,3-dimethyl-1H-pyrazol-5-amine, (4.024) N-(2-bromophenyl)-4-(2-chloro-4-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine.

5) Compounds with multisite activity, for example (5.001) Bordeaux mixture, (5.002) captafol, (5.003) captan, (5.004) chlorthalonil, (5.005) copper hydroxide, (5.006) copper naphthenate, (5.007) copper oxide, (5.008) copper oxychloride, (5.009) copper(2+) sulfate, (5.010) dithianon, (5.011) dodine, (5.012) folpet, (5.013) mancozeb, (5.014) maneb, (5.015) metiram, (5.016) zinc metiram, (5.017) copper oxine, (5.018) propineb, (5.019) sulfur and sulfur preparations including calcium polysulfide, (5.020) thiram, (5.021) zineb, (5.022) ziram, (5.023) 6-ethyl-5,7-dioxo-6,7-dihydro-5H-pyrrolo[3',4':5,6][1,4]dithiino[2,3-c][1,2]thiazole-3-carbonitrile.

6) Compounds capable of triggering host defence, for example (6.001) acibenzolar-S-methyl, (6.002) isotianil, (6.003) probenazole, (6.004) tiadinil.

7) Amino acid and/or protein biosynthesis inhibitors, for example (7.001) cyprodinil, (7.002) kasugamycin, (7.003) kasugamycin hydrochloride hydrate, (7.004) oxytetracycline, (7.005) pyrimethanil, (7.006) 3-(5-fluoro-3,3,4,4-tetramethyl-3,4-dihydroisoquinolin-1-yl)quinoline.

8) ATP production inhibitors, for example (8.001) silthiofam.

9) Cell wall synthesis inhibitors, for example (9.001) benthiavalicarb, (9.002) dimethomorph, (9.003) flumorph, (9.004) iprovalicarb, (9.005) mandipropamid, (9.006) pyrimorph, (9.007) valifenalate, (9.008) (2E)-3-(4-tert-butylphenyl)-3-(2-chloropyridin-4-yl)-1-(morpholin-4-yl)prop-2-en-1-one, (9.009) (2Z)-3-(4-tert-butylphenyl)-3-(2-chloropyridin-4-yl)-1-(morpholin-4-yl)prop-2-en-1-one.

10) Lipid and membrane synthesis inhibitors, for example (10.001) propamocarb, (10.002) propamocarb hydrochloride, (10.003) tolclofos-methyl.

11) Melanin biosynthesis inhibitors, for example (11.001) tricyclazole, (11.002) 2,2,2-trifluoroethyl-{3-methyl-1-[(4-methylbenzoyl)amino]butan-2-yl}carbamate.

12) Nucleic acid synthesis inhibitors, for example (12.001) benalaxyl, (12.002) benalaxyl-M (kiralaxyl), (12.003) metalaxyl, (12.004) metalaxyl-M (mefenoxam).

13) Signal transduction inhibitors, for example (13.001) fludioxonil, (13.002) iprodione, (13.003) procymidone, (13.004) proquinazid, (13.005) quinoxyfen, (13.006) vinclozolin.

14) Compounds that can act as decouplers, for example (14.001) fluazinam, (14.002) meptyldinocap.

15) Further compounds, for example (15.001) abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fosetyl-sodium, (15.015) methyl isothiocyanate, (15.016) metrafenon, (15.017) mildiomycin, (15.018) natamycin, (15.019) nickel dimethyldithiocarbamate, (15.020) nitrothal-isopropyl, (15.021) oxamocarb, (15.022) oxathiapiprolin, (15.023) oxyfenthiin, (15.024) pentachlorophenol and salts, (15.025) phosphonic acid and salts thereof, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.033) 2-(6-benzylpyridin-2-yl)quinazoline, (15.034) 2,6-dimethyl-1H,5H-[1,4]dithiino[2,3-c:5,6-c']dipyrrole-1,3,5,7(2H,6H)-tetrone, (15.035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, (15.036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (15.038) 2-[6-(3-fluoro-4-methoxyphenyl)-5-methylpyridin-2-yl]quinazoline, (15.039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.041) 2-{2-[(7,8-difluoro-2-methylquinolin-3-yl)oxy]-6-fluorophenyl}propan-2-ol, (15.042) 2-{2-fluoro-6-[(8-fluoro-2-methylquinolin-3-yl)oxy]phenyl}propan-2-ol, (15.043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl]-3-chlorophenyl methanesulfonate, (15.044) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts thereof, (15.046) 3-(4,4,5-trifluoro-3,3-dimethyl-3,4-dihydroisoquinolin-1-yl)quinoline, (15.047) 3-(4,4-difluoro-3,3-dimethyl-3,4-dihydroisoquinolin-1-yl)quinoline, (15.048) 4-amino-5-fluoropyrimidin-2-ol (tautomeric form: 4-amino-5-fluoropyrimidin-2(1H)-one), (15.049) 4-oxo-4-[(2-phenylethyl)amino]butyric acid, (15.050) 5-amino-1,3,4-thiadiazole-2-thiol, (15.051) 5-chloro-N'-phenyl-N'-(prop-2-yn-1-yl)thiophene 2-sulfonohydrazide, (15.052) 5-fluoro-2-[(4-fluorobenzyl)oxy]pyrimidin-4-amine, (15.053) 5-fluoro-2-[(4-methylbenzyl)oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[({[(Z)-(1-methyl-1H-tetrazol-5-yl)(phenyl)methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2-yl}carbamate, (15.062) 5-fluoro-4-imino-3-methyl-1)sulfonyl]-3,4-dihydropyrimidin-2(1H)-one.

Preferred fungicides are selected from the group consisting of benalaxyl, bitertanol, bromuconazole, captafol, carbendazim, carpropamid, cyazofamid, cyproconazole, diethofencarb, edifenphos, fenpropimorph, fentine, fluquinconazole, fosetyl, fluoroimide, folpet, iminoctadine, iprodionem, iprovalicarb, kasugamycin, maneb, nabam, pencycuron, prochloraz, propamocarb, propineb, pyrimethanil, spiroxamine, quintozene, tebuconazole, tolylfluanid, triadimefon, triadimenol, trifloxystrobin, zineb.

Insecticidal, acaricidal, nematicidal, miticidal and related active ingredients are, for example (analogously to the herbicides and fungicides, the compounds are, if possible, referred to by their common names):

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, preferably cyclodiene-organochlorines selected from chlordane and endosulfan, or phenylpyrazoles (fiproles) selected from ethiprole and fipronil.

(3) Sodium channel modulators, preferably pyrethroids selected from acrinathrin, allethrin, d-cis-trans allethrin, d-trans allethrin, bifenthrin, bioallethrin, bioallethrin S-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans isomer], deltamethrin, empenthrin [(EZ)-(1R) isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans isomer], prallethrin, pyrethrins (pyrethrum), resmethrin, silafluofen, tefluthrin, tetramethrin, tetramethrin [(1R) isomer], tralomethrin and transfluthrin or DDT or methoxychlor.

(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam, or nicotine, or sulfoximines selected from sulfoxaflor, or butenolides selected from flupyradifurone.

(5) Nicotinic acetylcholine receptor (nAChR) allosteric modulators, preferably spinosyns selected from spinetoram and spinosad.

(6) Glutamate-gated chloride channel (GluCl) allosteric modulators, preferably avermectins/milbemycins selected from abamectin, emamectin benzoate, lepimectin and milbemectin.

(7) Juvenile hormone mimics, preferably juvenile hormone analogues selected from hydroprene, kinoprene and methoprene, or fenoxycarb or pyriproxyfen.

(8) Miscellaneous non-specific (multi-site) inhibitors, preferably alkyl halides selected from methyl bromide and other alkyl halides; or chloropicrin or sulfuryl fluoride or borax or tartar emetic or methyl isocyanate generators selected from diazomet and metam.

(9) Chordotonal organ TRPV channel modulators selected from pymetrozine and pyrifluquinazon.

(10) Mite growth inhibitors selected from clofentezine, hexythiazox, diflovidazin and etoxazole.

(11) Microbial disruptors of insect midgut membranes selected from *Bacillus thuringiensis* subspecies *israelensis, Bacillus sphaericus, Bacillus thuringiensis* subspecies *aizawai, Bacillus thuringiensis* subspecies kurstaki, *Bacillus thuringiensis* subspecies *tenebrionis*, and B.t. plant proteins selected from Cry1Ab, Cry1Ac, Cry1Fa, Cry1A.105, Cry2Ab, VIP3A, mCry3A, Cry3Ab, Cry3Bb and Cry34Ab1/35Ab1.

(12) Inhibitors of mitochondrial ATP synthase, preferably ATP disruptors selected from diafenthiuron, or organotin compounds selected from azocyclotin, cyhexatin and fenbutatin oxide, or propargite or tetradifon.

(13) Uncouplers of oxidative phosphorylation via disruption of the proton gradient, selected from chlorfenapyr, DNOC and sulfluramid.

(14) Nicotinic acetylcholine receptor channel blockers selected from bensultap, cartap hydrochloride, thiocyclam, and thiosultap-sodium.

(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, selected from buprofezin.

(17) Moulting disruptors (especially in the case of Diptera) selected from cyromazine.

(18) Ecdysone receptor agonists selected from chromafenozide, halofenozide, methoxyfenozide and tebufenozide.

(19) Octopamine receptor agonists selected from amitraz.

(20) Mitochondrial complex III electron transport inhibitors selected from hydramethylnon, acequinocyl and fluacrypyrim.

(21) Mitochondrial complex I electron transport inhibitors, preferably METI acaricides selected from fenazaquin, fenpyroximate, pyrimidifen, pyridaben, tebufenpyrad and tolfenpyrad, or rotenone (Derris).

(22) Voltage-dependent sodium channel blockers selected from indoxacarb and metaflumizone.

(23) Inhibitors of acetyl-CoA carboxylase, preferably tetronic and tetramic acid derivatives selected from spirodiclofen, spiromesifen and spirotetramat.

(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.

(25) Mitochondrial complex II electron transport inhibitors, preferably beta-keto nitrile derivatives selected from cyenopyrafen and cyflumetofen, or carboxanilides selected from pyflubumide.

(28) Ryanodine receptor modulators, preferably diamides selected from chlorantraniliprole, cyantraniliprole and flubendiamide.

(29) Chordotonal organ modulators (with undefined target structure) selected from flonicamid.

(30) Further active ingredients selected from acynonapyr, afidopyropen, afoxolaner, azadirachtin, benclothiaz, benzoximate, benzpyrimoxan, bifenazate, broflanilide, bromopropylate, chinomethionat, chloroprallethrin, cryolite, cyclaniliprole, cycloxaprid, cyhalodiamide, dicloromezotiaz, dicofol, epsilon metofluthrin, epsilon momfluthrin, flometoquin, fluazaindolizine, fluensulfone, flufenerim, flufenoxystrobin, flufiprole, fluhexafon, fluopyram, flupyrimin, fluralaner, fluxametamide, fufenozide, guadipyr, heptafluthrin, imidaclothiz, iprodione, kappa bifenthrin, kappa tefluthrin, lotilaner, meperfluthrin, oxazosulfyl, paichongding, pyridalyl, pyrifluquinazon, pyriminostrobin, spirobudiclofen, spiropidion, tetramethylfluthrin, tetraniliprole, tetrachlorantraniliprole, tigolaner, tioxazafen, thiofluoximate, triflumezopyrim and iodomethane; additionally preparations based on *Bacillus firmus* (I-1582, BioNeem, Votivo), and the following compounds: 1-{2-fluoro-4-methyl-5-[(2,2,2-trifluoroethyl)sulfinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indole-3,4'-piperidine]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl) phenyl]isonicotinamide (known from WO2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethylcarbonate (known from EP 2647626) (CAS-1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS Reg. No. 1204776-60-2), (3E)-3-[1-[(6-chloro-3-pyridyl)methyl]-2-pyridylidene]-1,1,1-trifluoropropan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)benzamide, 4-[5-(3,5-dichlorophenyl)-4,5-dihydro-5-(trifluoromethyl)-3-isoxazolyl]-2-methyl-N-(trans-1-oxido-3-thietanyl)benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]propanamide, (+)-N-[3-chloro-1-(3-pyridinyl)-1H-pyrazol-4-yl]-N-ethyl-3-[(3,3,3-trifluoropropyl)sulfinyl]propanamide and (−)-N-[3-chloro-1-(3-pyridinyl)-1H-pyrazol-4-yl]-N-ethyl-3-[(3,3,3-trifluoropropyl)sulfinyl]propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide (Liudaibenjiaxuanan, known from CN 103109816 A) (CAS 1232543-85-9); N-[4-chloro-2-[[(1,1-dimethylethyl)amino] carbonyl]-6-methylphenyl]-1-(3-chloro-2-pyridinyl)-3-(fluoromethoxy)-1H-pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy] phenoxy]propoxy]-2-methoxy-6-(trifluoromethyl) pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]hydrazinecarboxamide (known from CN 101715774 A) (CAS 1232543-85-9); cyclopropanecarboxylic acid 3-(2,2-dichloroethenyl)-2,2-dimethyl-4-(1H-benzimidazol-2-yl)phenyl ester (known from CN 103524422 A) (CAS 1542271-46-4); (4aS)-7-chloro-2,5-dihydro-2-[[(methoxycarbonyl)[4-[(trifluoromethyl)thio] phenyl]amino]carbonyl]indeno[1,2-e][1,3,4]oxadiazine-4a (3H)-carboxylic acid methyl ester (known from CN 102391261 A) (CAS 1370358-69-2); 6-deoxy-3-O-ethyl-2,4-di-O-methyl-1-[N-[4-[1-[4-(1,1,2,2,2-pentafluoroethoxy) phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethylphenoxy)-3-(6-trifluoromethylpyridazin-3-yl)-3-azabicyclo[3.2.1]octane (CAS 1253850-56-4), (8-anti)-8-(2-cyclopropylmethoxy-4-trifluoromethylphenoxy)-3-(6-trifluoromethylpyridazin-3-yl)-3-azabicyclo[3.2.1]octane (CAS 933798-27-7), (8-syn)-8-(2-cyclopropylmethoxy-4- trifluoromethylphenoxy)-3-(6-trifluoromethylpyridazin-3-yl)-3-azabicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]pyrimidine (known from WO 2013/115391 A1) (CAS 1449021-97-9), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), ethyl 3-(4-chloro-2,6-dimethylphenyl)-8-methoxy-1-methyl-2-oxo-1,8-diazaspiro[4.5]dec-3-en-4-yl-carboxylate (known from WO 2010/066780 A1, WO 2011151146 A1) (CAS 1229023-00-0), 4-[(5S)-5-(3,5-dichloro-4-fluorophenyl)-4,5-dihydro-5-(trifluoromethyl)-3-isoxazolyl]-N-[(4R)-2-ethyl-3-oxo-4-isoxazolidinyl]-2-methylbenzamide (known from WO 2011/067272, WO2013/050302) (CAS 1309959-62-3).

Insecticides that can preferably be used together with the herbicides are, for example, as follows:

acetamiprid, acrinathrin, aldicarb, amitraz, acinphos-methyl, cyfluthrin, carbaryl, cypermethrin, deltamethrin, endosulfan, ethoprophos, fenamiphos, fenthion, fipronil, imidacloprid, methamidophos, methiocarb, niclosamide, oxydemeton-methyl, prothiophos, silafluofen, thiacloprid, thiodicarb, tralomethrin, triazophos, trichlorfon, triflumuron, terbufos, fonofos, phorate, chlorpyriphos, carbofuran, tefluthrin.

The active ingredient combinations of the invention are suitable for control of a broad spectrum of weeds on uncultivated land, on pathways, on railway tracks, in industrial areas ("industrial weed control") or in plantation crops, such as temperate, subtropical and tropical climates or geographies. Examples of plantation crops are oil palms, nuts (e.g. almonds, hazelnuts, walnuts, macadamia), coconut, berries, rubber trees, citrus (e.g. oranges, lemons, mandarins), bananas, pineapples, cotton, sugarcane, tea, coffee, cacao and the like. They are likewise suitable for use in pomiculture (e.g. pomaceous fruits such as apples, pears, cherries, mangoes and kiwis) and viticulture. The compositions can also be used for preparation for seeding ("burn-down", "no-till" or "zero-till" method) or for treatment after harvesting ("chemical fallow"). The possible uses of the active ingredient combinations also extend to weed control in tree crops, for example young Christmas tree crops or *Eucalyptus* crops, in each case before planting or after planting (including "over-top" treatment).

The compositions can also be used to control unwanted plant growth in economically important crop plants such as wheat (hard and soft wheat), maize, soya, sugarbeet, sugarcane, cotton, rice, beans (for example, bush beans and broad beans), flax, barley, oats, rye, triticale, potato and millet/sorghum, pastureland and areas of grass/lawn and plantation crops. Plantation crops are, inter alia, pomaceous fruit (apple, pear, quince), *Ribes* species (blackberry, raspberry), citrus, *Prunus* species (cherries, nectarines, almonds), nuts (walnut, pecan nut, hazelnut, cashew, macadamia), mango, cacao, coffee, grapevines (for eating or for making wine), palms (such as oil palms, date palms, coconut palms), *Eucalyptus*, kaki, persimmon, caoutchouc, pineapple, banana, avocado, lychee, forest cultures (Eucalypteae, Piniaceae, Piceae, Meliaceae, etc.).

The active herbicidal ingredient combinations of the invention, in the respective use forms (=herbicidal products), have synergies with regard to herbicidal action and selectivity, and favourable action with regard to the spectrum of weeds. They have excellent herbicidal efficacy against a broad spectrum of economically important mono-cotyledonous and dicotyledonous annual harmful plants. The active ingredients also have good control over perennial harmful plants which are difficult to control and produce shoots from rhizomes, rootstocks or other perennial organs.

For application, the active ingredient combinations can be deployed onto the plants (e.g. harmful plants such as mono- or dicotyledonous weeds or unwanted crop plants), the seed (e.g. grains, seeds or vegetative propagation organs such as tubers or parts of shoots having buds), or the area in which the plants grow (e.g. the growing area).

The substances can be deployed prior to sowing (if appropriate also by incorporation into the soil), prior to emergence or after emergence. Preference is given to use by the early post-seeding pre-emergence method or by the post-emergence method in plantation crops against harmful plants that have not yet emerged or have already emerged. The application can also be integrated into weed management systems with divided repeated applications (sequentials).

Specific examples of some representatives of the mono- and dicotyledonous weed flora which can be controlled by the active ingredient combinations according to the invention are as follows, although the enumeration is not intended to impose a restriction to particular species.

Among the monocotyledonous weed species, for example, *Aegilops, Agropyron, Agrostis, Alopecurus, Apera, Avena, Brachicaria, Bromus, Cynodon, Dactyloctenium, Digitaria, Echinochloa, Eleocharis, Eleusine, Eragrostis, Eriochloa, Festuca, Fimbristylis, Imperata, Ischaemum, Heteranthera, Imperata, Leptochloa, Lolium, Monochoria, Panicum, Paspalum, Phalaris, Phleum, Poa, Rottboellia, Sagittaria, Scirpus, Setaria, Sorghum, Sphenoclea* and *Cyperus* species are covered by the annual group.

In the case of dicotyledonous weed species, the spectrum of action extends to species such as, for example, *Abutilon, Amaranthus, Ambrosia, Anoda, Anthemis, Aphanes, Artemisia, Atriplex, Bellis, Bidens, Capsella, Carduus, Cassia, Centaurea, Chenopodium, Cirsium, Convolvulus, Datura, Desmodium, Emex, Erodium, Erysimum, Euphorbia, Galeopsis, Galinsoga, Galium, Geranium, Hibiscus, Ipomoea, Kochia, Lamium, Lepidium, Lindernia, Matricaria, Mentha, Mercurialis, Mullugo, Myosotis, Papaver, Pharbitis, Plantago, Polygonum, Portulaca, Ranunculus, Raphanus, Rorippa, Rotala, Rumex, Salsola, Senecio, Sesbania, Sida, Sinapis, Solanum, Sonchus, Sphenoclea, Stellaria, Taraxacum, Thlaspi, Trifolium, Urtica, Veronica, Viola, Xanthium.*

If the active ingredient combinations of the invention are applied to the soil surface before germination, either the emergence of the weed seedlings is prevented completely or the weeds grow until they have reached the cotyledon stage, but then stop growing and ultimately die completely after three to four weeks have passed.

If the active ingredients are applied post-emergence to the green parts of the plants, growth stops after the treatment, and the harmful plants remain at the growth stage at the time of application, or they die completely after a certain time, and so this eliminates competition by the weeds, which is harmful to the crop plants, very early and in a sustained manner.

The herbicidal products of the invention are notable for a rapid onset and long duration of herbicidal action. In general, the rainfastness of the active ingredients in the combinations of the invention is favourable. A particular advantage is that the effective dosages of compounds (A) and (B) that are used in the combinations can be adjusted to such a low level that their soil action is optimally low. Therefore, the use thereof in sensitive crops is not just enabled, but groundwater contamination is also virtually prevented. The inventive combination of active ingredients allows the required application rate of the active ingredients to be reduced considerably.

The combined use of herbicides (A) and (B) achieves performance properties extending beyond what was to be expected on account of the known properties of the individual herbicides for the combination thereof. For example, the herbicidal effects for a particular harmful plant species exceed the expected value as can be estimated by standard methods, for example according to Colby or other extrapolation methods.

A synergistic effect exists whenever the effect, the herbicidal effect here, of the active ingredient combination is greater than the sum total of the effects of the active ingredients applied individually. The expected activity for a given combination of two active ingredients can be calculated according to S. R. Colby ("Calculating Synergistic and Antagonistic Responses of Herbicide Combinations", Weeds 15 (1967), 20-22) (see below).

The synergistic effects therefore permit, for example, a reduction in the application rates of the individual active ingredients, a higher efficacy at the same application rate, the control of species of harmful plants which are as yet uncovered (gaps), elevated residual action, an extended period of efficacy, an elevated speed of action, an extension of the period of application and/or a reduction in the number of individual applications required and—as a result for the user—weed control systems which are more advantageous economically and ecologically.

Even though the combinations of the invention have excellent herbicidal activity with respect to mono- and dicotyledonous weeds, many economically important crop plants, depending on the structure of the respective active ingredient combinations of the invention and the application rate thereof, are damaged only insignificantly, if at all. Economically important crops here are, for example, dicotyledonous crops from the genera of *Arachis, Beta, Brassica, Cucumis, Cucurbita, Helianthus, Daucus, Glycine, Gossypium, Ipomoea, Lactuca, Linum, Lycopersicon, Nicotiana, Phaseolus, Pisum, Solanum, Vicia*, or monocotyledonous crops from the genera of *Allium, Ananas, Asparagus, Avena, Hordeum, Oryza, Panicum, Saccharum, Secale, Sorghum, Triticale, Triticum* and *Zea*.

In addition, the compositions of the invention in some cases have outstanding growth-regulating properties in crop plants. They intervene in the plants' own metabolism with regulatory effect, and can thus be used for the controlled influencing of plant constituents and to facilitate harvesting, for example by triggering desiccation and stunted growth. Furthermore, they are also suitable for the general control and inhibition of unwanted vegetative growth without killing the plants in the process. Inhibition of vegetative growth plays a major role for many mono- and dicotyledonous crops since this can reduce or completely prevent lodging.

Owing to their herbicidal and plant growth-regulatory properties, the compositions can be used to control harmful plants in known plant crops or in tolerant crop plants still to be developed, modified by conventional mutagenesis or modified by genetic engineering. In general, transgenic plants feature particular advantageous properties in addition to resistances to the compositions of the invention, for example resistances to plant diseases or the organisms that cause plant diseases such as certain insects, or microorganisms such as fungi, bacteria or viruses. Other particular properties relate, for example, to the harvested material with regard to quantity, quality, storability, composition and specific constituents. For instance, there are known transgenic plants with an elevated starch content or altered starch quality, or those with a different fatty acid composition in the harvested material. Other particular properties may be tolerance or resistance to abiotic stressors, for example heat, low temperatures, drought, salinity and ultraviolet radiation.

The active ingredient combinations of the invention can preferably be used as herbicides in crops of crop plants that are resistant, or have been made resistant by genetic engineering, to the phytotoxic effects of the herbicides.

Conventional ways of producing novel plants which have modified properties in comparison to existing plants consist, for example, in traditional cultivation methods and the generation of mutants.

Alternatively, novel plants with modified properties can be generated with the aid of recombinant methods (see, for example, EP-A-0221044, EP-A-0131624). For example, there have been descriptions in several cases of:
genetic modifications of crop plants for the purpose of modifying the starch synthesized in the plants (e.g. WO 92/11376, WO 92/14827, WO 91/19806),
transgenic crop plants which exhibit resistances to other herbicides, for example to sulfonylureas (EP-A-0257993, U.S. Pat. No. 5,013,659),
transgenic crop plants with the ability to produce *Bacillus thuringiensis* toxins (Bt toxins), which make the plants resistant to particular pests (EP-A-0142924, EP-A-0193259),
transgenic crop plants with a modified fatty acid composition (WO 91/13972),
genetically modified crop plants with novel constituents or secondary metabolites, for example novel phytoalexins, which bring about an increased disease resistance (EPA 309862, EPA0464461),
genetically modified plants having reduced photorespiration, which have higher yields and higher stress tolerance (EPA 0305398),
transgenic crop plants which produce pharmaceutically or diagnostically important proteins ("molecular pharming"),
transgenic crop plants which feature higher yields or better quality,
transgenic crop plants which feature a combination, for example, of the abovementioned novel properties ("gene stacking").

Numerous molecular biology techniques which can be used to produce novel transgenic plants with modified properties are known in principle; see, for example, I. Potrykus and G. Spangenberg (eds.) Gene Transfer to Plants, Springer Lab Manual (1995), Springer Verlag Berlin, Heidelberg, or Christou, "Trends in Plant Science" 1 (1996) 423-431.

For such recombinant manipulations, nucleic acid molecules which allow mutagenesis or sequence alteration by recombination of DNA sequences can be introduced into plasmids. With the aid of standard methods, it is possible, for example, to undertake base exchanges, remove parts of sequences or add natural or synthetic sequences. For the connection of the DNA fragments to one another, it is possible to add adapters or linkers to the fragments; see, for example, Sambrook et al., 1989, Molecular Cloning, A Laboratory Manual, 2nd ed., Cold Spring Harbor Laboratory Press, Cold Spring Harbor, NY; or Winnacker "Gene und Klone" [Genes and Clones], VCH Weinheim, 2nd edition, 1996.

For example, the generation of plant cells with a reduced activity of a gene product can be achieved by expressing at least one corresponding antisense RNA, a sense RNA for achieving a cosuppression effect, or by expressing at least one suitably constructed ribozyme which specifically cleaves transcripts of the abovementioned gene product.

To this end, it is firstly possible to use DNA molecules which encompass the entire coding sequence of a gene product inclusive of any flanking sequences which may be present, and also DNA molecules which only encompass portions of the coding sequence, in which case it is necessary for these portions to be long enough to have an antisense effect in the cells. It is also possible to use DNA sequences which have a high degree of homology to the coding sequences of a gene product, but are not completely identical to them.

When expressing nucleic acid molecules in plants, the protein synthesized may be localized in any desired compartment of the plant cell. However, to achieve localization in a particular compartment, it is possible, for example, to join the coding region to DNA sequences which ensure localization in a particular compartment. Such sequences are known to those skilled in the art (see, for example, Braun et al., EMBO J. 11 (1992), 3219-3227; Wolter et al., Proc. Natl. Acad. Sci. USA 85 (1988), 846-850; Sonnewald et al., Plant J. 1 (1991), 95-106). The nucleic acid molecules can also be expressed in the organelles of the plant cells.

The transgenic plant cells can be regenerated by known techniques to give rise to entire plants. In principle, the transgenic plants may be plants of any desired plant species, i.e. not only monocotyledonous but also dicotyledonous plants. Obtainable in this way are transgenic plants having properties altered by overexpression, suppression or inhibition of homologous (=natural) genes or gene sequences or expression of heterologous (=foreign) genes or gene sequences.

The active ingredient combinations of the invention can preferably be used in transgenic crops that are tolerant or have been rendered tolerant to the active ingredients used.

The active ingredient combinations of the invention can preferably also be used in transgenic crops which are resistant to growth regulators, for example dicamba, or to herbicides which inhibit essential plant enzymes, for example acetolactate synthases (ALS), EPSP synthases, glutamine synthases (GS) or hydroxyphenylpyruvate dioxygenases (HPPD), or to herbicides from the group of the sulfonylureas, the glyphosates, glufosinates or benzoylisoxazoles and analogous active ingredients.

The invention therefore also provides a method of controlling unwanted plant growth, optionally in crops of crop plants, preferably on uncultivated land or in plantation crops, characterized in that one or more herbicides of type (A) is/are applied with one or more herbicides of type (B) to the harmful plants, parts of plants or plant seeds (seed) or to the growing area.

The invention also provides for the use of the novel combinations of compounds (A)+(B) for control of harmful plants, optionally in crops of crop plants, preferably on uncultivated land and plantation crops, but also for control of harmful plants before the sowing of the subsequent crop plant, such as, in particular, for preparation for seeding ("burn-down application").

The active ingredient combinations of the invention may either take the form of mixed formulations of the two components, if appropriate with further active ingredients, additives and/or customary formulation auxiliaries, which are then applied in a customary manner diluted with water, or can be prepared as what are called tank mixes by joint dilution of the separately formulated or partially separately formulated components with water.

The compounds (A) and (B) or their combinations can be formulated in various ways according to which biological and/or physicochemical parameters are required. Examples of general formulation options are: wettable powders (WP), water-soluble powders (SP), emulsifiable concentrates (EC), water-soluble concentrates, aqueous solutions (SL), emulsions (EW), such as oil-in-water and water-in-oil emulsions, sprayable solutions or emulsions, dispersions based on oil or water, oil dispersions (OD), suspoemulsions, suspension concentrates (SC), oil-miscible solutions, capsule suspensions (CS), dusting products (DP), dressings, granules for soil application or scattering, granules (GR) in the form of microgranules, spray granules, absorption and adsorption granules, water-dispersible granules (WG), water-soluble granules (SG), ULV formulations, microcapsules or waxes.

The invention therefore also provides herbicidal and plant-growth-regulating compositions containing the active ingredient combinations of the invention.

The individual types of formulation are known in principle and are described, for example, in: Winnacker-Kuchler, "Chemische Technologie" [Chemical Technology], Volume 7, C. Hanser Verlag Munich, 4th Ed. 1986; van Valkenburg, "Pesticides Formulations", Marcel Dekker, N.Y., 1973; K. Martens, "Spray Drying Handbook", 3rd Ed. 1979, G. Goodwin Ltd. London.

The formulation auxiliaries required, such as inert materials, surfactants, solvents and further additives, are likewise known and are described, for example, in: Watkins, "Handbook of Insecticide Dust Diluents and Carriers", 2nd Ed., Darland Books, Caldwell N.J.; H.v. Olphen, "Introduction to Clay Colloid Chemistry"; 2nd Ed., J. Wiley & Sons, N.Y. Marsden, "Solvents Guide", 2nd Ed., Interscience, N.Y. 1963; McCutcheon's "Detergents and Emulsifiers Annual", MC Publ. Corp., Ridgewood N.J.; Sisley and Wood, "Encyclopedia of Surface Active Agents", Chem. Publ. Co. Inc., N.Y. 1964, Schönfeldt, "Grenzflachenaktive Äthylenoxidaddukte" ["Interface-active Ethylene Oxide Adducts"], Wiss. Verlagsgesellschaft, Stuttgart 1976, Winnacker-Kuchler, "Chemische Technologie", Volume 7, C. Hanser Verlag Munich, 4th Ed. 1986.

On the basis of these formulations, it is also possible to produce combinations with other pesticidally active substances, such as other herbicides, fungicides, insecticides or other pesticides (for example acaricides, nematicides, molluscicides, rodenticides, aphicides, avicides, larvicides, ovicides, bactericides, viricides etc.), and also with fertilizers and/or growth regulators, for example in the form of a finished formulation or as a tankmix.

Wettable powders are preparations which can be dispersed uniformly in water and, in addition to the active ingredient, apart from a diluent or inert substance, also comprise surfactants of the ionic and/or nonionic type (wetting agents, dispersants), for example polyoxyethylated alkylphenols, polyoxyethylated fatty alcohols, polyoxyethylated fatty amines, fatty alcohol polyglycol ether sulfates, alkanesulfonates, alkylbenzenesulfonates, sodium lignosulfonate, sodium 2,2'-dinaphthylmethane-6,6'-disulfonate, sodium dibutylnaphthalenesulfonate or else sodium oleoylmethyltaurate. To produce the wettable powders, the active herbicidal ingredients are finely ground, for example in customary apparatuses such as hammer mills, blower mills and air-jet mills, and simultaneously or subsequently mixed with the formulation auxiliaries.

Emulsifiable concentrates are produced by dissolving the active ingredient in an organic solvent, for example butanol, cyclohexanone, dimethylformamide, xylene, or else relatively high-boiling aromatics or hydrocarbons or mixtures of the organic solvents, with addition of one or more ionic and/or nonionic surfactants (emulsifiers). Examples of emulsifiers which may be used are: calcium alkylarylsulfonate salts, such as calcium dodecylbenzenesulfonate, or nonionic emulsifiers such as fatty acid polyglycol esters, alkylaryl polyglycol ethers, fatty alcohol polyglycol ethers, propylene oxide-ethylene oxide condensation products, alkyl polyethers, sorbitan esters, for example sorbitan fatty acid esters, or for example polyoxyethylene sorbitan fatty acid esters.

Dusting products are obtained by grinding the active ingredient with finely distributed solids, for example talc, natural clays, such as kaolin, bentonite and pyrophyllite, or diatomaceous earth.

Suspension concentrates may be water- or oil-based. They may be produced, for example, by wet-grinding by means of commercial bead mills and optional addition of surfactants as already listed above, for example, for the other formulation types.

Emulsions, for example oil-in-water emulsions (EW), can be produced, for example, by means of stirrers, colloid mills and/or static mixers using aqueous organic solvents and optionally surfactants as already listed above, for example, for the other formulation types.

Granules can be produced either by spraying the active ingredient onto granular inert material capable of adsorption or by applying active ingredient concentrates to the surface of carrier substances, such as sand, kaolinites or granular inert material, by means of adhesives, for example polyvinyl alcohol, sodium polyacrylate or else mineral oils. Suitable active ingredients can also be granulated in the manner customary for the production of fertilizer granules—if desired as a mixture with fertilizers.

Water-dispersible granules are produced generally by processes such as spray-drying, fluidized bed granulation, pan granulation, mixing with high-speed mixers and extrusion without solid inert material.

The agrochemical preparations generally contain 0.1 to 99 percent by weight, especially 0.2% to 95% by weight, of active ingredients of types (A) and/or (B), the following concentrations being customary, depending on the type of formulation:

In wettable powders, the active ingredient concentration is, for example, about 10% to 95% by weight, the remainder to 100% by weight consisting of customary formulation constituents. In the case of emulsifiable concentrates, the active ingredient concentration may be about 1% to 90% by weight, preferably 5 to 80 percent by weight.

Formulations in the form of dusts usually contain 5% to 20% by weight of active ingredient; sprayable solutions contain about 0.05 to 80, preferably 2 to 50, percent by weight (% by weight) of active ingredient.

In the case of granules such as dispersible granules, the active ingredient content depends partially on whether the active compound is in liquid or solid form and on which granulation auxiliaries and fillers are used. In general, the content in the water-dispersible granules is between 1% and 95% by weight, preferably between 10% and 80% by weight.

In addition, the active ingredient formulations mentioned optionally comprise the respectively customary adhesives, wetting agents, dispersants, emulsifiers, penetrants, preservatives, antifreeze agents and solvents, fillers, colorants and carriers, antifoams, evaporation inhibitors and pH- or viscosity-modifying agents.

For application, the formulations in commercial form are, if appropriate, diluted in a customary manner, for example in the case of wettable powders, emulsifiable concentrates, dispersions and water-dispersible granules with water. Dust-type preparations, granules for soil application or broadcasting and sprayable solutions are not normally diluted further with other inert substances prior to application.

The active ingredients can be deployed onto the plants, plant parts, plant seeds or the area under cultivation (soil), preferably on the green plants and plant parts, and optionally additionally onto the soil.

One possible use is the joint application of the active ingredients in the form of tank mixes, where the optimally formulated concentrated formulations of the individual active ingredients together are mixed in a tank with water, and the spray liquor obtained is deployed.

A joint herbicidal formulation of the inventive combination of active ingredients (A) and (B) has the advantage that it can be applied more easily since the quantities of the components are already set at the correct ratio to one another. Moreover, the auxiliaries in the formulation can be adjusted optimally to one another, whereas a tank mix of different formulations may result in unwanted combinations of auxiliaries.

A. General formulation examples a) A dusting product is obtained by mixing 10 parts by weight of an active ingredient (A) or (B) or an active ingredient mixture (A)+(B) (and optionally further active ingredient components) and/or salts thereof and 90 parts by weight of talc as inert substance, and comminuting in a beater mill.

b) A wettable powder which is readily dispersible in water is obtained by mixing 25 parts by weight of an active ingredient/active ingredient mixture, 64 parts by weight of kaolin-containing quartz as inert substance, 10 parts by weight of potassium lignosulfonate and 1 part by weight of sodium oleoylmethyltaurate as wetting agent and dispersant, and grinding the mixture in a pinned-disk mill.

c) A dispersion concentrate which is readily dispersible in water is obtained by mixing 20 parts by weight of an active ingredient/active ingredient mixture with 6 parts by weight of alkylphenol polyglycol ether (Triton® X 207), 3 parts by weight of isotridecanol polyglycol ether (8 EO) and 71 parts by weight of paraffinic mineral oil (boiling range for example approximately 255 to 277° C.) and grinding the mixture in a friction ball mill to a fineness of below 5 microns.

d) An emulsifiable concentrate is obtained from 15 parts by weight of an active ingredient/active ingredient mixture, 75 parts by weight of cyclohexanone as solvent and 10 parts by weight of oxyethylated nonylphenol as emulsifier.

e) Water-dispersible granules are obtained by mixing
75 parts by weight of an active ingredient/active ingredient mixture,
10 parts by weight of calcium lignosulfonate,
5 parts by weight of sodium lauryl sulfate,
3 parts by weight of polyvinyl alcohol and
7 parts by weight of kaolin, grinding the mixture in a pinned-disk mill, and granulating the powder in a fluidized bed by spray application of water as a granulating liquid.

f) Water-dispersible granules are also obtained by homogenizing and precomminuting, in a colloid mill, 25 parts by weight of an active ingredient/active ingredient mixture, 5 parts by weight of sodium 2,2'-dinaphthylmethane-6,6'-disulfonate, 2 parts by weight of sodium oleoylmethyltaurate, 1 part by weight of polyvinyl alcohol, 17 parts by weight of calcium carbonate and 50 parts by weight of water, then grinding the mixture in a bead mill and atomizing and drying the resulting suspension in a spray tower by means of a one-phase nozzle.

B. Biological Examples

On employment of the combinations of the invention, herbicidal effects on a harmful plant species that exceed the formal sum total of the effects of the herbicides present when applied alone are frequently observed. Alternatively, in some cases, it is possible to observe that a smaller application rate for the herbicide combination is required in order to achieve the same effect for a harmful plant species compared to the individual preparations. Such increases in action or increases in effectiveness or reductions in application rate are a strong indication of a synergistic effect.

When the observed efficacies already exceed the formal sum total of the values of the tests with individual applications, they also exceed the expected value according to Colby, which is calculated using the formula below and is likewise regarded as an indication of synergism (cf. S. R. Colby; in Weeds 15 (1967) pp. 20 to 22):

$$E^C = A + B - (A \cdot B/100)$$

where:

A=efficacy of the active ingredient (A) in % at an application rate of a g a.i./ha;

B=efficacy of the active ingredient (B) in % at an application rate of b g a.i./ha;

$E^C$=expected value of the effect of the combination (A)+(B) in % at the combined application rate a+b g a.i./ha.

The observed values ($E^A$) from the experiments, given suitable low dosages, show an effect of the combinations exceeding the expected values according to Colby (Δ).

1. Post-Emergence Action Against Weeds

Seeds or rhizome pieces of mono- and dicotyledonous weeds are placed in sandy loam in pots, covered with soil and grown in a greenhouse under good growth conditions (temperature, air humidity, water supply). Three weeks after sowing, the test plants are treated at the three-leaf stage with the compositions of the invention. The compositions of the invention, formulated as spray powders or as emulsion concentrates, are sprayed onto the green plant parts in various dosages with an application rate equivalent to 300 to 800 l/ha of water. After the test plants have been left to stand in the greenhouse under optimal growth conditions for about 3 to 4 weeks, the action of the preparations is scored visually in comparison to untreated controls. The compositions of the invention also have good post-emergence herbicidal activity against a broad spectrum of economically important weed grasses and broadleaved weeds.

Effects of the combinations of the invention that exceed the formal sum total of the effects in the case of individual application of the herbicides are frequently observed here. The observed values from the experiments, given suitable low dosages, show an effect of the combinations exceeding the expected values according to Colby.

2. Herbicidal Pre-Emergence and Post-Emergence Action (Field Trials)

The experiments were conducted on outdoor plots in accordance with the greenhouse experiments from section 1. The rating was analogous to the experiment in section 1.

3. Herbicidal Action and Crop Plant Compatibility (Field Trials)

Crop plants were grown in outdoor plots under natural outdoor conditions, by laying out seeds or rhizome pieces of typical harmful plants or utilizing natural weed flora. The treatment with the compositions of the invention followed the emergence of the harmful plants and of the crop plants, generally at the 2- to 4-leaf stage; in some cases (as specified), individual active ingredients or active ingredient combinations were applied pre-emergence or as a sequential treatment partly pre-emergence and/or post-emergence.

In the case of plantation crops, in general, only the soil between the individual crop plants was treated with the active ingredients.

After application, for example 2, 4, 6 and 8 weeks after application, the effect of the preparations was rated visually by comparison with untreated controls. The compositions of the invention also have synergistic herbicidal activity in field trials against a broad spectrum of economically important weed grasses and broadleaved weeds. The comparison showed that the combinations of the invention usually have greater, and in some cases considerably greater, herbicidal action than the sum total of the effects of the individual herbicides, and therefore suggests synergism. The effects over significant parts of the rating period were also above the expected values according to Colby, and therefore likewise suggest synergism. The crop plants, by contrast, were damaged only insignificantly, if at all, as a result of the treatments with the herbicidal products.

4. Specific Trial Examples

The following abbreviations are used in the description and the tables that follow:

g a.i./ha=grams of active substance (active ingredient) (=100% active ingredient) per hectare;

The sum total of the effects of the individual applications is reported under $E^A$;

expected values according to Colby are each reported under $E^C$.

The biological results of the compositions according to the invention are summarized in Tables 3.1-3.2.

The rating period is reported in days after application (DAT).

TABLE 3.1

Synergistic effect (Δ) for herbicidal binary compositions comprising herbicides from group B2, applied by the post-emergence method

| Active ingredient(s) (Z5) | Application rate [g a.i./ha] | Herbicidal action 21 DAT [%] against *Setaria viridis* |
|---|---|---|
| (B2.18) Diflufenican | 90 | 20 |
|  | 30 | 10 |
| A1 | 5 | 90 |
|  | 1.7 | 85 |

TABLE 3.1-continued

Synergistic effect (Δ) for herbicidal binary compositions comprising herbicides from group B2, applied by the post-emergence method

| | | |
|---|---|---|
| A1 + (B2.18) Diflufenican | 5 + 90 | $E^A$ = 98 ($E^C$ = 88) Δ 10 |
| | 1.7 + 90 | $E^A$ = 97 ($E^C$ = 91) Δ 6 |
| | 5 + 30 | $E^A$ = 95 ($E^C$ = 86.5) Δ 8 |
| | 1.7 + 30 | |

| Active ingredient(s) (Z5) | Application rate [g a.i./ha] | Herbicidal action 21 DAT [%] against *Abutilon theophrasti* |
|---|---|---|
| (B2.18) Diflufenican | 270 | 30 |
| | 90 | 20 |
| | 30 | 20 |
| A1 | 5 | 60 |
| A1 + (B2.18) Diflufenican | 5 + 270 | $E^A$ = 85 ($E^C$ = 72) Δ 13 |
| | 5 + 90 | $E^A$ = 85 ($E^C$ = 68) Δ 17 |
| | 5 + 30 | $E^A$ = 85 ($E^C$ = 68) Δ 17 |

| Active ingredient(s) (Z5) | Application rate [g a.i./ha] | Herbicidal action 21 DAT [%] against *Kochia Scoparia* |
|---|---|---|
| (B2.18) Diflufenican | 270 | 25 |
| | 90 | 20 |
| | 30 | 10 |
| A1 | 45 | 85 |
| | 15 | 80 |
| | 5 | 75 |
| A1 + (B2.18) Diflufenican | 45 + 270 | $E^A$ = 95 ($E^C$ = 88) Δ 6 |
| | 15 + 270 | $E^A$ = 95 ($E^C$ = 85) Δ 10 |
| | 5 + 270 | $E^A$ = 93 ($E^C$ = 81) Δ 11 |
| | 15 + 90 | $E^A$ = 93 ($E^C$ = 84) Δ 9 |
| | 5 + 90 | $E^A$ = 90 ($E^C$ = 80) Δ 10 |
| | 45 + 30 | $E^A$ = 93 ($E^C$ = 86) Δ 6 |
| | 15 + 30 | $E^A$ = 90 ($E^C$ = 82) Δ 8 |
| | 5 + 30 | $E^A$ = 85 ($E^C$ = 77) Δ 7 |

| Active ingredient(s) (Z5) | Application rate [g a.i./ha] | Herbicidal action 21 DAT [%] against *Ipomoea purpurea* |
|---|---|---|
| (B2.18) Diflufenican | 270 | 60 |
| | 30 | 30 |
| A1 | 15 | 80 |
| | 5 | 80 |
| A1 + (B2.18) Diflufenican | 15 + 270 | $E^A$ = 99 ($E^C$ = 92) Δ 7 |
| | 15 + 30 | $E^A$ = 97 ($E^C$ = 86) Δ 11 |
| | 5 + 30 | $E^A$ = 93 ($E^C$ = 86) Δ 7 |

| Active ingredient(s) (Z5) | Application rate [g a.i./ha] | Herbicidal action 14 DAT [%] against *Alopecurus myosuroides* |
|---|---|---|
| A1 | 16 | 85 |
| | 4 | 80 |
| (B2.18) Diflufenican | 90 | 20 |
| | 30 | 20 |
| A1 + (B2.18) Diflufenican | 16 + 90 | $E^A$ = 93 ($E^C$ = 88) Δ 5 |
| | 4 + 90 | $E^A$ = 90 ($E^C$ = 84) Δ 6 |
| | 4 + 30 | $E^A$ = 93 ($E^C$ = 84) Δ 9 |

| Active ingredient(s) (Z5) | Application rate [g a.i./ha] | Herbicidal action 28 DAT [%] against *Alopecurus myosuroides* |
|---|---|---|
| A1 | 4 | 85 |
| (B2.18) Diflufenican | 270 | 20 |
| A1 + (B2.18) Diflufenican | 4 + 270 | $E^A$ = 95 ($E^C$ = 88) Δ 7 |

| Active ingredient(s) (Z5) | Application rate [g a.i./ha] | Herbicidal action 14 DAT [%] against *Lolium rigidum* |
|---|---|---|
| A1 | 4 | 70 |
| (B2.18) Diflufenican | 270 | 20 |
| | 90 | 20 |

| | | |
|---|---|---|
| A1 + (B2.18) Diflufenican | 4 + 270 | $E^A$ = 85 ($E^C$ = 76) Δ = 9 |
| | 4 + 90 | $E^A$ = 90 ($E^C$ = 76) Δ = 14 |

| Active ingredient(s) (Z5) | Application rate [g a.i./ha] | Herbicidal action 28 DAT [%] against *Lolium rigidum* |
|---|---|---|
| A1 | 4 | 75 |
| (B2.18) Diflufenican | 270 | 30 |
| A1 + (B2.18) Diflufenican | 4 + 270 | $E^A$ = 93 ($E^C$ = 83) Δ = 10 |

| Active ingredient(s) (Z5) | Application rate [g a.i./ha] | Herbicidal action 14 DAT [%] against *Matricaria inodora* |
|---|---|---|
| A1 | 4 | 70 |
| (B2.18) Diflufenican | 270 | 30 |
| A1 + (B2.18) Diflufenican | 4 + 270 | $E^A$ = 90 ($E^C$ = 79) Δ = 11 |

| Active ingredient(s) (Z5) | Application rate [g a.i./ha] | Herbicidal action 28 DAT [%] against *Matricaria inodora* |
|---|---|---|
| A1 | 16 | 85 |
| (B2.18) Diflufenican | 270 | 20 |
| A1 + (B2.18) Diflufenican | 16 + 270 | $E^A$ = 97 ($E^C$ = 88) Δ = 9 |

| Active ingredient(s) (Z5) | Application rate [g a.i./ha] | Herbicidal action 14 DAT [%] against *Phalaris minor* |
|---|---|---|
| A1 | 4 | 75 |
| | 1 | 30 |
| (B2.18) Diflufenican | 30 | 20 |
| | 270 | 30 |
| A1 + (B2.18) Diflufenican | 4 + 30 | $E^A$ = 85 ($E^C$ = 80) Δ = 5 |
| | 1 + 270 | $E^A$ = 75 ($E^C$ = 51) Δ = 24 |

| Active ingredient(s) (Z5) | Application rate [g a.i./ha] | Herbicidal action 28 DAT [%] against *Phalaris minor* |
|---|---|---|
| A1 | 16 | 85 |
| | 4 | 70 |
| (B2.18) Diflufenican | 270 | 30 |
| | 90 | 10 |
| | 30 | 10 |
| A1 + (B2.18) Diflufenican | 16 + 270 | $E^A$ = 95 ($E^C$ = 90) Δ = 5 |
| | 16 + 90 | $E^A$ = 95 ($E^C$ = 87) Δ = 8 |
| | 16 + 30 | $E^A$ = 95 ($E^C$ = 87) Δ = 8 |
| | 4 + 270 | $E^A$ = 95 ($E^C$ = 79) Δ = 16 |
| | 4 + 90 | $E^A$ = 93 ($E^C$ = 73) Δ = 20 |
| | 4 + 30 | $E^A$ = 93 ($E^C$ = 73) Δ = 20 |

| Active ingredient(s) (Z5) | Application rate [g a.i./ha] | Herbicidal action 14 DAT [%] against *Poa annua L.* |
|---|---|---|
| A1 | 16 | 80 |
| | 4 | 80 |
| (B2.18) Diflufenican | 90 | 20 |
| A1 + (B2.18) Diflufenican | 16 + 90 | $E^A$ = 90 ($E^C$ = 84) Δ = 6 |
| | 4 + 90 | $E^A$ = 90 ($E^C$ = 84) Δ = 6 |

| Active ingredient(s) (Z5) | Application rate [g a.i./ha] | Herbicidal action 28 DAT [%] against *Poa annua L.* |
|---|---|---|
| A1 | 4 | 85 |
| | 1 | 30 |
| (B2.18) Diflufenican | 270 | 30 |
| | 90 | 20 |
| | 30 | 10 |

TABLE 3.1-continued

Synergistic effect (Δ) for herbicidal binary compositions comprising herbicides from group B2, applied by the post-emergence method

| A1 + (B2.18) Diflufenican | 4 + 270 | $E^A = 97$ ($E^C = 90$) Δ = 7 |
| --- | --- | --- |
| | 4 + 90 | $E^A = 97$ ($E^C = 88$) Δ = 9 |
| | 4 + 30 | $E^A = 97$ ($E^C = 87$) Δ = 10 |
| | 1 + 270 | $E^A = 60$ ($E^C = 51$) Δ = 9 |
| | 1 + 90 | $E^A = 50$ ($E^C = 44$) Δ = 6 |

| Active ingredient(s) (Z5) | Application rate [g a.i./ha] | Herbicidal action 14 DAT [%] against *Veronica hederifolia* |
| --- | --- | --- |
| A1 | 1 | 30 |
| (B2.18) Diflufenican | 270 | 30 |
| A1 + (B2.18) Diflufenican | 1 + 270 | $E^A = 60$ ($E^C = 51$) Δ = 9 |

| Active ingredient(s) (Z5) | Application rate [g a.i./ha] | Herbicidal action 28 DAT [%] against *Veronica hederifolia* |
| --- | --- | --- |
| A1 | 4 | 40 |
| (B2.18) Diflufenican | 270 | 30 |
| | 90 | 20 |
| | 30 | 20 |
| A1 + (B2.18) Diflufenican | 4 + 270 | $E^A = 85$ ($E^C = 58$) Δ = 27 |
| | 4 + 90 | $E^A = 60$ ($E^C = 52$) Δ = 8 |
| | 4 + 30 | $E^A = 70$ ($E^C = 52$) Δ = 18 |

TABLE 3.2

Synergistic effect (Δ) for herbicidal binary compositions comprising herbicides from group B7, applied by the post-emergence method

| Active ingredient(s) (Z25) | Application rate [g a.i./ha] | Herbicidal action 21 DAT [%] against *Kochia Scoparia* |
| --- | --- | --- |
| (B7.4) Glufosinate [CAS 77182-82-2] | 150 | 50 |
| | 50 | 10 |
| A1 | 15 | 80 |
| | 5 | 75 |
| A1 + (B7.4) Glufosinate [CAS 77182-82-2] | 5 + 150 | $E^A = 93$ ($E^C = 87$) Δ 5 |
| | 15 + 50 | $E^A = 90$ ($E^C = 82$) Δ 8 |
| | 5 + 50 | $E^A = 90$ ($E^C = 77$) Δ 12 |

| Active ingredient(s) (Z25) | Application rate [g a.i./ha] | Herbicidal action 21 DAT [%] against *Abutilon theophrasti* |
| --- | --- | --- |
| (B7.4) Glufosinate [CAS 77182-82-2] | 50 | 50 |
| A1 | 5 | 60 |
| A1 + (B7.4) Glufosinate [CAS 77182-82-2] | 5 + 50 | $E^A = 90$ ($E^C = 80$) Δ 10 |

| Active ingredient(s) (Z25) | Application rate [g a.i./ha] | Herbicidal action 21 DAT [%] against *Amaranthus palmeri* |
| --- | --- | --- |
| (B7.4) Glufosinate [CAS 77182-82-2] | 150 | 90 |
| | 50 | 35 |
| A1 | 15 | 40 |
| | 5 | 30 |
| A1 + (B7.4) Glufosinate [CAS 77182-82-2] | 15 + 150 | $E^A = 100$ ($E^C = 94$) Δ 6 |
| | 5 + 150 | $E^A = 100$ ($E^C = 93$) Δ 7 |
| | 5 + 50 | $E^A = 60$ ($E^C = 54$) Δ 5 |

| Active ingredient(s) (Z25) | Application rate [g a.i./ha] | Herbicidal action 14 DAT [%] against *Centaurea cyanus* |
| --- | --- | --- |
| A1 | 1 | 10 |
| (B7.4) Glufosinate [CAS 77182-82-2] | 540 | 85 |
| | 180 | 60 |

TABLE 3.2-continued

Synergistic effect (Δ) for herbicidal binary compositions comprising herbicides from group B7, applied by the post-emergence method

| A1 + (B7.4) Glufosinate [CAS 77182-82-2] | 1 + 540 | $E^A = 95$ ($E^C = 87$) Δ = 8 |
| --- | --- | --- |
| | 1 + 180 | $E^A = 70$ ($E^C = 64$) Δ = 6 |

| Active ingredient(s) (Z25) | Application rate [g a.i./ha] | Herbicidal action 28 DAT [%] against *Centaurea cyanus* |
| --- | --- | --- |
| A1 | 1 | 10 |
| (B7.4) Glufosinate [CAS 77182-82-2] | 540 | 70 |
| | 180 | 30 |
| A1 + (B7.4) Glufosinate [CAS 77182-82-2] | 1 + 540 | $E^A = 95$ ($E^C = 73$) Δ = 22 |
| | 1 + 180 | $E^A = 50$ ($E^C = 37$) Δ = 13 |

| Active ingredient(s) (Z25) | Application rate [g a.i./ha] | Herbicidal action 14 DAT [%] against *Lolium rigidum* |
| --- | --- | --- |
| A1 | 16 | 80 |
| (B7.4) Glufosinate [CAS 77182-82-2] | 180 | 40 |
| A1 + (B7.4) Glufosinate [CAS 77182-82-2] | 16 + 180 | $E^A = 93$ ($E^C = 88$) Δ = 5 |

| Active ingredient(s) (Z25) | Application rate [g a.i./ha] | Herbicidal action 28 DAT [%] against *Lolium rigidum* |
| --- | --- | --- |
| A1 | 4 | 75 |
| | 1 | 30 |
| (B7.4) Glufosinate [CAS 77182-82-2] | 540 | 40 |
| A1 + (B7.4) Glufosinate [CAS 77182-82-2] | 4 + 540 | $E^A = 97$ ($E^C = 85$) Δ = 12 |
| | 1 + 540 | $E^A = 70$ ($E^C = 58$) Δ = 12 |

| Active ingredient(s) (Z25) | Application rate [g a.i./ha] | Herbicidal action 14 DAT [%] against *Lolium rigidum* (resistant biotype) |
| --- | --- | --- |
| A1 | 1 | 20 |
| (B7.4) Glufosinate [CAS 77182-82-2] | 540 | 50 |
| A1 + (B7.4) Glufosinate [CAS 77182-82-2] | 1 + 540 | $E^A = 80$ ($E^C = 60$) Δ = 20 |

| Active ingredient(s) (Z25) | Application rate [g a.i./ha] | Herbicidal action 28 DAT [%] against *Lolium rigidum* (resistant biotype) |
| --- | --- | --- |
| A1 | 4 | 40 |
| | 1 | 20 |
| (B7.4) Glufosinate [CAS 77182-82-2] | 540 | 30 |
| A1 + (B7.4) Glufosinate [CAS 77182-82-2] | 4 + 540 | $E^A = 70$ ($E^C = 58$) Δ = 12 |
| | 1 + 540 | $E^A = 50$ ($E^C = 44$) Δ = 6 |

| Active ingredient(s) (Z25) | Application rate [g a.i./ha] | Herbicidal action 28 DAT [%] against *Matricaria inodora* |
| --- | --- | --- |
| A1 | 16 | 85 |
| | 1 | 50 |
| (B7.4) Glufosinate [CAS 77182-82-2] | 180 | 60 |
| A1 + (B7.4) Glufosinate [CAS 77182-82-2] | 16 + 180 | $E^A = 100$ ($E^C = 94$) Δ = 6 |
| | 1 + 180 | $E^A = 99$ ($E^C = 80$) Δ = 19 |

| Active ingredient(s) (Z25) | Application rate [g a.i./ha] | Herbicidal action 14 DAT [%] against *Phalaris minor* |
| --- | --- | --- |
| A1 | 4 | 75 |
| | 1 | 30 |
| (B7.4) Glufosinate [CAS 77182-82-2] | 60 | 20 |
| | 540 | 60 |

TABLE 3.2-continued

Synergistic effect (Δ) for herbicidal binary compositions comprising herbicides from group B7, applied by the post-emergence method

| Active ingredient(s) | Application rate [g a.i./ha] | Herbicidal action |
|---|---|---|
| A1 + (B7.4) Glufosinate [CAS 77182-82-2] | 4 + 60<br>1 + 540 | $E^A = 90$ ($E^C = 80$) $\Delta = 10$<br>$E^A = 80$ ($E^C = 72$) $\Delta = 8$ |

| Active ingredient(s) (Z25) | Application rate [g a.i./ha] | Herbicidal action 28 DAT [%] against *Phalaris minor* |
|---|---|---|
| A1 | 16<br>4 | 85<br>70 |
| (B7.4) Glufosinate [CAS 77182-82-2] | 540<br>180<br>60 | 40<br>30<br>10 |
| A1 + (B7.4) Glufosinate [CAS 77182-82-2] | 16 + 540<br>16 + 180<br>16 + 60<br>4 + 60 | $E^A = 97$ ($E^C = 91$) $\Delta = 6$<br>$E^A = 95$ ($E^C = 90$) $\Delta = 5$<br>$E^A = 95$ ($E^C = 87$) $\Delta = 8$<br>$E^A = 80$ ($E^C = 73$) $\Delta = 7$ |

| Active ingredient(s) (Z25) | Application rate [g a.i./ha] | Herbicidal action 28 DAT [%] against *Poa annua* L. |
|---|---|---|
| A1 | 4 | 85 |
| (B7.4) Glufosinate [CAS 77182-82-2] | 180 | 20 |
| A1 + (B7.4) Glufosinate [CAS 77182-82-2] | 4 + 180 | $E^A = 95$ ($E^C = 88$) $\Delta = 7$ |

| Active ingredient(s) (Z25) | Application rate [g a.i./ha] | Herbicidal action 14 DAT [%] against *Veronica hederifolia* |
|---|---|---|
| A1 | 16 | 70 |
| (B7.4) Glufosinate [CAS 77182-82-2] | 60 | 50 |
| A1 + (B7.4) Glufosinate [CAS 77182-82-2] | 16 + 60 | $E^A = 97$ ($E^C = 85$) $\Delta = 12$ |

| Active ingredient(s) (Z26) | Application rate [g a.i./ha] | Herbicidal action 45 DAT [%] against *Amaranthus tuberculatus* |
|---|---|---|
| (B7.5) Glyphosate [CAS 38641-94-0] | 720 | 15 |
| A1 | 100 | 57 |
| A1 + (B7.5) Glyphosate [CAS 38641-94-0] | 100 + 720 | $E^A = 73$ ($E^C = 63$) $\Delta = 10$ |

| Active ingredient(s) (Z26) | Application rate [g a.i./ha] | Herbicidal action 45 DAT [%] against *Ipomoea* ssp |
|---|---|---|
| (B7.5) Glyphosate [CAS 38641-94-0] | 720 | 0 |
| A1 | 100 | 57 |
| A1 + (B7.5) Glyphosate [CAS 38641-94-0] | 100 + 720 | $E^A = 70$ ($E^C = 57$) $\Delta 13$ |

| Active ingredient(s) (Z26) | Application rate [g a.i./ha] | Herbicidal action 16 DAT [%] against *Richardia scabra* |
|---|---|---|
| (B7.5) Glyphosate [CAS 38641-94-0] | 720 | 62 |
| A1 | 100 | 48 |
| A1 + (B7.5) Glyphosate [CAS 38641-94-0] | 100 + 720 | $E^A = 92$ ($E^C = 80$) $\Delta = 12$ |

| Active ingredient(s) (Z26) | Application rate [g a.i./ha] | Herbicidal action 42 DAT [%] against *Geranium dissectum* |
|---|---|---|
| (B7.5) Glyphosate [CAS 38641-94-0] | 720 | 50 |
| A1 | 100 | 17 |
| A1 + (B7.5) Glyphosate [CAS 38641-94-0] | 100 + 720 | $E^A = 100$ ($E^C = 59$) $\Delta = 41.5$ |

| Active ingredient(s) (Z26) | Application rate [g a.i./ha] | Herbicidal action 45 DAT [%] against *Lysimachia nummularia* |
|---|---|---|
| (B7.5) Glyphosate [CAS 38641-94-0] | 720 | 7 |
| A1 | 100 | 25 |
| A1 + (B7.5) Glyphosate [CAS 38641-94-0] | 100 + 720 | $E^A = 60$ ($E^C = 30$) $\Delta 30$ |

| Active ingredient(s) (Z26) | Application rate [g a.i./ha] | Herbicidal action 42 DAT [%] against *Malva pusilla* |
|---|---|---|
| (B7.5) Glyphosate [CAS 38641-94-0] | 720 | 0 |
| A1 | 100 | 0 |
| A1 + (B7.5) Glyphosate [CAS 38641-94-0] | 100 + 720 | $E^A = 100$ ($E^C = 0$) $\Delta 100$ |

| Active ingredient(s) (Z26) | Application rate [g a.i./ha] | Herbicidal action 21 DAT [%] against *Amaranthus palmeri* |
|---|---|---|
| (B7.5) Glyphosate [CAS 38641-94-0] | 50 | 60 |
| A1 | 5 | 30 |
| A1 + (B7.5) Glyphosate [CAS 38641-94-0] | 5 + 50 | $E^A = 85$ ($E^C = 72$) $\Delta 13$ |

| Active ingredient(s) (Z26) | Application rate [g a.i./ha] | Herbicidal action 21 DAT [%] against *Kochia Scoparia* |
|---|---|---|
| (B7.5) Glyphosate [CAS 38641-94-0] | 150 | 20 |
| A1 | 15 | 80 |
| A1 + (B7.5) Glyphosate [CAS 38641-94-0] | 15 + 150 | $E^A = 90$ ($E^C = 84$) $\Delta 6$ |

| Active ingredient(s) (Z26) | Application rate [g a.i./ha] | Herbicidal action 28 DAT [%] against *Bromus sterilis* |
|---|---|---|
| A1 | 1 | 30 |
| (B7.5) Glyphosate [CAS 38641-94-0] | 450<br>150 | 90<br>80 |
| A1 + (B7.5) Glyphosate [CAS 38641-94-0] | 1 + 450<br>1 + 150 | $E^A = 98$ ($E^C = 93$) $\Delta = 5$<br>$E^A = 93$ ($E^C = 86$) $\Delta = 7$ |

| Active ingredient(s) (Z26) | Application rate [g a.i./ha] | Herbicidal action 14 DAT [%] against *Centaurea cyanus* |
|---|---|---|
| A1 | 16<br>4<br>1 | 40<br>30<br>10 |
| (B7.5) Glyphosate [CAS 38641-94-0] | 450<br>150 | 60<br>50 |
| A1 + (B7.5) Glyphosate [CAS 38641-94-0] | 16 + 450<br>16 + 150<br>4 + 450<br>4 + 150<br>1 + 450<br>1 + 150 | $E^A = 90$ ($E^C = 76$) $\Delta = 14$<br>$E^A = 75$ ($E^C = 70$) $\Delta = 5$<br>$E^A = 85$ ($E^C = 72$) $\Delta = 13$<br>$E^A = 80$ ($E^C = 65$) $\Delta = 15$<br>$E^A = 80$ ($E^C = 64$) $\Delta = 16$<br>$E^A = 75$ ($E^C = 55$) $\Delta = 20$ |

| Active ingredient(s) (Z26) | Application rate [g a.i./ha] | Herbicidal action 28 DAT [%] against *Centaurea cyanus* |
|---|---|---|
| A1 | 16<br>4<br>1 | 50<br>30<br>10 |

TABLE 3.2-continued

Synergistic effect (Δ) for herbicidal binary compositions comprising herbicides from group B7, applied by the post-emergence method

| Active ingredient(s) | Application rate [g a.i./ha] | Herbicidal action 28 DAT [%] |
|---|---|---|
| (B7.5) Glyphosate [CAS 38641-94-0] | 450 / 150 / 50 | 60 / 40 / 10 |
| A1 + (B7.5) Glyphosate [CAS 38641-94-0] | 16 + 450 | $E^A = 95\ (E^C = 80)\ \Delta = 15$ |
|  | 4 + 150 | $E^A = 80\ (E^C = 58)\ \Delta = 22$ |
|  | 1 + 450 | $E^A = 85\ (E^C = 64)\ \Delta = 21$ |
|  | 1 + 150 | $E^A = 70\ (E^C = 46)\ \Delta = 24$ |
|  | 1 + 50 | $E^A = 40\ (E^C = 19)\ \Delta = 21$ |

| Active ingredient(s) (Z26) | Application rate [g a.i./ha] | Herbicidal action 28 DAT [%] against *Lolium rigidum* |
|---|---|---|
| A1 | 1 | 30 |
| (B7.5) Glyphosate [CAS 38641-94-0] | 150 | 30 |
| A1 + (B7.5) Glyphosate [CAS 38641-94-0] | 1 + 150 | $E^A = 60\ (E^C = 51)\ \Delta = 9$ |

| Active ingredient(s) (Z26) | Application rate [g a.i./ha] | Herbicidal action 28 DAT [%] against *Lolium rigidum* (resistant biotype) |
|---|---|---|
| A1 | 4 | 40 |
| (B7.5) Glyphosate [CAS 38641-94-0] | 450 | 70 |
| A1 + (B7.5) Glyphosate [CAS 38641-94-0] | 4 + 450 | $E^A = 95\ (E^C = 82)\ \Delta = 13$ |

| Active ingredient(s) (Z26) | Application rate [g a.i./ha] | Herbicidal action 28 DAT [%] against *Matricaria inodora* |
|---|---|---|
| A1 | 1 | 50 |
| (B7.5) Glyphosate [CAS 38641-94-0] | 150 | 70 |
| A1 + (B7.5) Glyphosate [CAS 38641-94-0] | 1 + 150 | $E^A = 90\ (E^C = 85)\ \Delta = 5$ |

| Active ingredient(s) (Z26) | Application rate [g a.i./ha] | Herbicidal action 28 DAT [%] against *Phalaris minor* |
|---|---|---|
| A1 | 16 | 85 |
| (B7.5) Glyphosate [CAS 38641-94-0] | 50 | 30 |
| A1 + (B7.5) Glyphosate [CAS 38641-94-0] | 16 + 50 | $E^A = 95\ (E^C = 90)\ \Delta = 5$ |

| Active ingredient(s) (Z26) | Application rate [g a.i./ha] | Herbicidal action 28 DAT [%] against *Poa annua* L. |
|---|---|---|
| A1 | 1 | 30 |
| (B7.5) Glyphosate [CAS 38641-94-0] | 450 | 85 |
| A1 + Glyphosate [CAS 38641-94-0] | 1 + 450 | $E^A = 98\ (E^C = 90)\ \Delta = 8$ |

Further biological results of the compositions according to the invention are summarized in Tables 3.3-3.4. The rating period is reported in days after application (DAT).

TABLE 3.3

Synergistic effect (Δ) for herbicidal binary compositions comprising herbicide A1, applied by the post-emergence method

| Active ingredient | Application rate/ha | Herbicidal action 28 DAT against *Centaurea cyanus* |
|---|---|---|
| A1 | 4 | 50 |
|  | 1 | 40 |
|  | 50 | 30 |
|  | 450 | 70 |
| A1 + (B3.1) Bromoxynil | 4 + 50 | $E^A = 80\ (E^C = 65)\ \Delta = 15$ |
|  | 1 + 450 | $E^A = 98\ (E^C = 82)\ \Delta = 16$ |
|  | 1 + 50 | $E^A = 65\ (E^C = 58)\ \Delta = 7$ |

| Active ingredient | Application rate/ha | Herbicidal action 28 DAT against *Lolium rigidum* |
|---|---|---|
| A1 | 4 | 50 |
|  | 450 | 20 |
|  | 150 | 15 |
| A1 + (B3.1) Bromoxynil | 4 + 450 | $E^A = 65\ (E^C = 60)\ \Delta = 5$ |
|  | 4 + 150 | $E^A = 85\ (E^C = 58)\ \Delta = 27$ |

| Active ingredient | Application rate g a.i./ha | Herbicidal action 28 DAT against *Lolium rigidum* (resistant biotype) |
|---|---|---|
| A1 | 1 | 5 |
|  | 150 | 0 |
|  | 50 | 0 |
| A1 + (B3.1) Bromoxynil | 1 + 150 | $E^A = 10\ (E^C = 5)\ \Delta = 5$ |
|  | 1 + 50 | $E^A = 10\ (E^C = 5)\ \Delta = 5$ |

| Active ingredient | Application rate g a.i./ha | Herbicidal action 28 DAT against *Lolium rigidum* (resistant biotype) |
|---|---|---|
| A1 | 16 | 80 |
| (B3.1) Bromoxynil | 450 | 25 |
|  | 50 | 0 |
| A1 + (B3.1) Bromoxynil | 16 + 450 | $E^A = 93\ (E^C = 85)\ \Delta = 8$ |
|  | 16 + 50 | $E^A = 85\ (E^C = 80)\ \Delta = 5$ |

| Active ingredient | Application rate g a.i./ha | Herbicidal action 28 DAT against *Poa annua* L. |
|---|---|---|
| A1 | 16 | 75 |
|  | 1 | 20 |
|  | 450 | 25 |
|  | 150 | 0 |
|  | 50 | 0 |
| A1 + (B3.1) Bromoxynil | 16 + 450 | $E^A = 97\ (E^C = 81)\ \Delta = 16$ |
|  | 16 + 150 | $E^A = 85\ (E^C = 75)\ \Delta = 10$ |
|  | 16 + 50 | $E^A = 97\ (E^C = 75)\ \Delta = 22$ |
|  | 1 + 150 | $E^A = 35\ (E^C = 20)\ \Delta = 15$ |

| Active ingredient | Application rate g a.i. | Herbicidal action 28 DAT against *Veronica hederifolia* |
|---|---|---|
| A1 | 1 | 80 |
|  | 150 | 20 |
| A1 + (B3.1) Bromoxynil | 1 + 150 | $E^A = 93\ (E^C = 84)\ \Delta = 9$ |

| Active ingredient | Application rate g a.i./ha | Herbicidal action 28 DAT against *Viola tricolor* |
|---|---|---|
| A1 | 16 | 75 |
|  | 450 | 40 |
| A1 + (B3.1) Bromoxynil | 16 + 450 | $E^A = 90\ (E^C = 85)\ \Delta = 5$ |

TABLE 3.3-continued

Synergistic effect (Δ) for herbicidal binary compositions comprising herbicide A1, applied by the post-emergence method

| Active ingredient | Application rate g a.i./ha | Herbicidal action 28 DAT against Bromus sterilis |
|---|---|---|
| A1 | 4 | 70 |
|  | 100 | 40 |
| A1 + (B2.28) Flufenacet | 4 + 100 | $E^A = 90$ ($E^C = 82$) Δ = 8 |

| Active ingredient | Application rate g a.i./ha | Herbicidal action 28 DAT against Lolium rigidum (resistant biotype) |
|---|---|---|
| A1 | 4 | 50 |
| (B2.28) Flufenacet | 100 | 65 |
|  | 33 | 15 |
| A1 + (B2.28) Flufenacet | 4 + 100 | $E^A = 93$ ($E^C = 83$) Δ = 10 |
|  | 4 + 33 | $E^A = 95$ ($E^C = 58$) Δ = 37 |

| Active ingredient | Application rate g a.i./ha | Herbicidal action 28 DAT against Matricaria inodora |
|---|---|---|
| A1 | 16 | 80 |
|  | 1 | 30 |
|  | 300 | 40 |
|  | 100 | 20 |
|  | 33 | 15 |
| A1 + (B2.28) Flufenacet | 16 + 300 | $E^A = 95$ ($E^C = 88$) Δ = 7 |
|  | 16 + 100 | $E^A = 95$ ($E^C = 84$) Δ = 11 |
|  | 16 + 33 | $E^A = 95$ ($E^C = 83$) Δ = 12 |
|  | 1 + 300 | $E^A = 65$ ($E^C = 58$) Δ = 7 |
|  | 1 + 100 | $E^A = 60$ ($E^C = 44$) Δ = 16 |
|  | 1 + 33 | $E^A = 75$ ($E^C = 41$) Δ = 34 |

| Active ingredient | Application rate g a.i./ha | Herbicidal action 28 DAT against Poa annua L. |
|---|---|---|
| A1 | 16 | 75 |
| (B2.28) Flufenacet | 33 | 20 |
| A1 + (B2.28) Flufenacet | 16 + 33 | $E^A = 95$ ($E^C = 80$) Δ = 15 |

| Active ingredient | Application rate g a.i./ha | Herbicidal action 28 DAT against Veronica hederifolia |
|---|---|---|
| A1 | 1 | 80 |
| (B2.28) Flufenacet | 100 | 50 |
| A1 + (B2.28) Flufenacet | 1 + 100 | $E^A = 95$ ($E^C = 90$) Δ = 5 |

| Active ingredient | Application rate g a.i./ha | Herbicidal action 28 DAT against Viola tricolor |
|---|---|---|
| A1 | 16 | 75 |
|  | 1 | 50 |
| (B2.28) Flufenacet | 300 | 50 |
|  | 100 | 20 |
|  | 33 | 15 |
| A1 + (B2.28) Flufenacet | 16 + 300 | $E^A = 95$ ($E^C = 88$) Δ = 7 |
|  | 16 + 100 | $E^A = 85$ ($E^C = 80$) Δ = 5 |
|  | 16 + 33 | $E^A = 97$ ($E^C = 79$) Δ = 18 |
|  | 1 + 100 | $E^A = 80$ ($E^C = 60$) Δ = 20 |
|  | 1 + 33 | $E^A = 65$ ($E^C = 58$) Δ = 7 |

| Active ingredient | Application rate g a.i./ha | Herbicidal action 28 DAT against Matricaria inodora |
|---|---|---|
| A1 | 1 | 30 |
| (B2.31) Foramsulfuron | 9 | 65 |
| A1 + (B2.31) Foramsulfuron | 1 + 9 | $E^A = 85$ ($E^C = 76$) Δ = 9 |

| Active ingredient | Application rate g a.i./ha | Herbicidal action 28 DAT against Phalaris minor |
|---|---|---|
| A1 | 16 | 80 |
|  | 4 | 80 |
|  | 1 | 20 |
|  | 1 | 25 |
|  | 9 | 85 |
| A1 + (B2.31) Foramsulfuron | 16 + 1 | $E^A = 95$ ($E^C = 85$) Δ = 10 |
|  | 4 + 1 | $E^A = 90$ ($E^C = 85$) Δ = 5 |
|  | 1 + 9 | $E^A = 95$ ($E^C = 88$) Δ = 7 |

| Active ingredient | Application rate g a.i./ha | Herbicidal action 28 DAT against Lolium rigidum |
|---|---|---|
| A1 | 4 | 50 |
| (B5.31) Halauxifen | 9 | 25 |
|  | 3 | 0 |
|  | 1 | 0 |
| A1 + (B5.31) Halauxifen | 4 + 9 | $E^A = 70$ ($E^C = 63$) Δ = 7 |
|  | 4 + 3 | $E^A = 80$ ($E^C = 50$) Δ = 30 |
|  | 4 + 1 | $E^A = 65$ ($E^C = 50$) Δ = 15 |

| Active ingredient | Application rate g a.i./ha | Herbicidal action 28 DAT against Lolium rigidum (resistant biotype) |
|---|---|---|
| A1 | 16 | 30 |
|  | 1 | 5 |
| (B5.31) Halauxifen | 1 | 0 |
| A1 + (B5.31) Halauxifen | 16 + 1 | $E^A = 35$ ($E^C = 30$) Δ = 5 |
|  | 1 + 1 | $E^A = 15$ ($E^C = 5$) Δ = 10 |

| Active ingredient | Application rate g a.i./ha | Herbicidal action 28 DAT against Matricaria inodora |
|---|---|---|
| A1 | 1 | 30 |
| (B5.31) Halauxifen | 3 | 70 |
| A1 + (B5.31) Halauxifen | 1 + 3 | $E^A = 90$ ($E^C = 79$) Δ = 11 |

| Active ingredient | Application rate g a.i./ha | Herbicidal action 28 DAT against Phalaris minor |
|---|---|---|
| A1 | 16 | 80 |
| (B5.31) Halauxifen | 9 | 15 |
|  | 3 | 10 |
|  | 1 | 0 |
| A1 + (B5.31) Halauxifen | 16 + 9 | $E^A = 95$ ($E^C = 83$) Δ = 12 |
|  | 16 + 3 | $E^A = 95$ ($E^C = 82$) Δ = 13 |
|  | 16 + 1 | $E^A = 95$ ($E^C = 80$) Δ = 15 |

| Active ingredient | Application rate g a.i./ha | Herbicidal action 28 DAT against Poa annua L. |
|---|---|---|
| A1 | 16 | 75 |
|  | 1 | 20 |
| (B5.31) Halauxifen | 9 | 15 |
|  | 3 | 10 |
|  | 1 | 0 |
| A1 + (B5.31) Halauxifen | 16 + 9 | $E^A = 95$ ($E^C = 79$) Δ = 16 |
|  | 16 + 3 | $E^A = 90$ ($E^C = 78$) Δ = 12 |
|  | 16 + 1 | $E^A = 90$ ($E^C = 75$) Δ = 15 |
|  | 1 + 1 | $E^A = 35$ (v = 20) Δ = 15 |

TABLE 3.3-continued

Synergistic effect (Δ) for herbicidal binary compositions comprising herbicide A1, applied by the post-emergence method

| Active ingredient | Application rate g a.i./ha | Herbicidal action 28 DAT against *Bromus sterilis* |
|---|---|---|
| A1 | 4 | 70 |
| (B11.6) Indaziflam | 12 | 25 |
| A1 + (B11.6) Indaziflam | 4 + 12 | $E^A = 90$ ($E^C = 78$) Δ = 12 |

| Active ingredient | Application rate g a.i./ha | Herbicidal action 28 DAT against *Lamium purpureum* L. |
|---|---|---|
| A1 | 1 | 80 |
|  | 4 | 35 |
| A1 + (B11.6) Indaziflam | 1 + 4 | $E^A = 97$ ($E^C = 87$) Δ = 10 |

| Active ingredient | Application rate g a.i./ha | Herbicidal action 28 DAT against *Lolium rigidum* |
|---|---|---|
| A1 | 4 | 50 |
| (B11.6) Indaziflam | 12 | 20 |
|  | 4 | 30 |
| A1 + (B11.6) Indaziflam | 4 + 12 | $E^A = 80$ ($E^C = 60$) Δ = 20 |
|  | 4 + 4 | $E^A = 95$ ($E^C = 65$) Δ = 30 |

| Active ingredient | Application rate g a.i./ha | Herbicidal action 28 DAT against *Lolium rigidum* (resistant biotype) |
|---|---|---|
| A1 | 16 | 30 |
|  | 4 | 20 |
|  | 1 | 5 |
| (B11.6) Indaziflam | 36 | 35 |
|  | 12 | 30 |
| A1 + (B11.6) Indaziflam | 16 + 36 | $E^A = 65$ ($E^C = 55$) Δ = 10 |
|  | 4 + 12 | $E^A = 60$ ($E^C = 44$) Δ = 16 |
|  | 1 + 36 | $E^A = 70$ ($E^C = 38$) Δ = 32 |

| Active ingredient | Application rate g a.i./ha | Herbicidal action 28 DAT against *Matricaria inodora* |
|---|---|---|
| A1 | 16 | 80 |
|  | 1 | 30 |
| (B11.6) Indaziflam | 4 | 65 |
| A1 + (B11.6) Indaziflam | 16 + 4 | $E^A = 98$ ($E^C = 93$) Δ = 5 |
|  | 1 + 4 | $E^A = 95$ ($E^C = 76$) Δ = 19 |

| Active ingredient | Application rate g a.i./ha | Herbicidal action 28 DAT against *Phalaris minor* |
|---|---|---|
| A1 | 16 | 80 |
|  | 4 | 80 |
| (B11.6) Indaziflam | 36 | 60 |
|  | 4 | 0 |
| A1 + (B11.6) Indaziflam | 16 + 36 | $E^A = 97$ ($E^C = 92$) Δ = 5 |
|  | 16 + 4 | $E^A = 95$ ($E^C = 80$) Δ = 15 |
|  | 4 + 36 | $E^A = 100$ ($E^C = 92$) Δ = 8 |

| Active ingredient | Application rate g a.i./ha | Herbicidal action 28 DAT against *Poa annua* L. |
|---|---|---|
| A1 | 16 | 75 |
|  | 1 | 20 |
| (B11.6) Indaziflam | 4 | 20 |
| A1 + (B11.6) Indaziflam | 16 + 4 | $E^A = 85$ ($E^C = 80$) Δ = 5 |
|  | 1 + 4 | $E^A = 50$ ($E^C = 36$) Δ = 14 |

| Active ingredient | Application rate g a.i./ha | Herbicidal action 28 DAT against *Viola tricolor* |
|---|---|---|
| A1 | 1 | 50 |
| (B2.37) Mesosulfuron | 15 | 80 |
| A1 + (B2.37) Mesosulfuron | 1 + 15 | $E^A = 97$ ($E^C = 90$) Δ = 7 |

| Active ingredient | Application rate g a.i./ha | Herbicidal action 28 DAT against *Alopecurus myosuroides* |
|---|---|---|
| A1 | 1 | 15 |
| (B2.58) Propyzamide | 100 | 0 |
| A1 + (B2.58) Propyzamide | 1 + 100 | $E^A = 20$ ($E^C = 15$) Δ = 5 |

| Active ingredient | Application rate g a.i./ha | Herbicidal action 28 DAT against *Bromus sterilis* |
|---|---|---|
| A1 | 4 | 60 |
|  | 1 | 25 |
| (B2.58) Propyzamide | 900 | 30 |
|  | 300 | 15 |
| A1 + (B2.58) Propyzamide | 4 + 900 | $E^A = 97$ ($E^C = 72$) Δ = 25 |
|  | 4 + 300 | $E^A = 85$ ($E^C = 66$) Δ = 19 |
|  | 1 + 900 | $E^A = 70$ ($E^C = 48$) Δ = 22 |

| Active ingredient | Application rate g a.i./ha | Herbicidal action 28 DAT against *Centaurea cyanus* |
|---|---|---|
| A1 | 1 | 0 |
| (B2.58) Propyzamide | 900 | 15 |
|  | 100 | 10 |
| A1 + (B2.58) Propyzamide | 1 + 900 | $E^A = 30$ ($E^C = 15$) Δ = 15 |
|  | 1 + 100 | $E^A = 15$ ($E^C = 10$) Δ = 5 |

| Active ingredient | Application rate g a.i./ha | Herbicidal action 28 DAT against *Galium aparine* |
|---|---|---|
| A1 | 16 | 80 |
|  | 1 | 20 |
| (B2.58) Propyzamide | 300 | 20 |
|  | 900 | 20 |
|  | 100 | 10 |
| A1 + (B2.58) Propyzamide | 16 + 300 | $E^A = 93$ ($E^C = 84$) Δ = 9 |
|  | 1 + 900 | $E^A = 93$ ($E^C = 36$) Δ = 57 |
|  | 1 + 300 | $E^A = 80$ ($E^C = 36$) Δ = 44 |
|  | 1 + 100 | $E^A = 70$ ($E^C = 28$) Δ = 42 |

| Active ingredient | Application rate g a.i./ha | Herbicidal action 28 DAT against *Matricaria inodora* |
|---|---|---|
| A1 | 16 | 65 |
|  | 4 | 40 |
| (B2.58) Propyzamide | 900 | 15 |
|  | 300 | 0 |
|  | 100 | 0 |
| A1 + B2.58) Propyzamide | 16 + 900 | $E^A = 80$ ($E^C = 70$) Δ = 10 |
|  | 16 + 300 | $E^A = 98$ ($E^C = 65$) Δ = 33 |
|  | 16 + 100 | $E^A = 80$ ($E^C = 65$) Δ = 15 |
|  | 4 + 900 | $E^A = 80$ ($E^C = 49$) Δ = 31 |
|  | 4 + 300 | $E^A = 85$ ($E^C = 40$) Δ = 45 |
|  | 4 + 100 | $E^A = 60$ ($E^C = 40$) Δ = 20 |

TABLE 3.3-continued

Synergistic effect (Δ) for herbicidal binary compositions comprising herbicide A1, applied by the post-emergence method

| Active ingredient | Application rate g a.i./ha | Herbicidal action 28 DAT against *Phalaris minor* |
|---|---|---|
| A1 | 4 | 65 |
|  | 1 | 25 |
| (B2.58) Propyzamide | 300 | 20 |
|  | 900 | 30 |
| A1 + (B2.58) Propyzamide | 4 + 300 | $E^A = 95$ ($E^C = 72$) $\Delta = 23$ |
|  | 1 + 900 | $E^A = 65$ ($E^C = 48$) $\Delta = 17$ |

| Active ingredient | Application rate g a.i./ha | Herbicidal action 28 DAT against *Poa annua* L. |
|---|---|---|
| A1 | 4 | 70 |
|  | 1 | 30 |
| (B2.58) Propyzamide | 300 | 50 |
|  | 100 | 15 |
| A1 + (B2.58) Propyzamide | 4 + 300 | $E^A = 98$ ($E^C = 85$) $\Delta = 13$ |
|  | 4 + 100 | $E^A = 98$ ($E^C = 75$) $\Delta = 23$ |
|  | 1 + 100 | $E^A = 65$ ($E^C = 41$) $\Delta = 24$ |

| Active ingredient | Application rate g a.i./ha | Herbicidal action 28 DAT against *Veronica hederifolia* |
|---|---|---|
| A1 | 16 | 90 |
|  | 4 | 85 |
|  | 1 | 15 |
| (B2.58) Propyzamide | 100 | 0 |
|  | 900 | 40 |
|  | 300 | 80 |
| A1 + (B2.58) Propyzamide | 16 + 100 | $E^A = 95$ ($E^C = 90$) $\Delta = 5$ |
|  | 4 + 100 | $E^A = 90$ ($E^C = 85$) $\Delta = 5$ |
|  | 1 + 900 | $E^A = 90$ ($E^C = 49$) $\Delta = 41$ |
|  | 1 + 300 | $E^A = 90$ ($E^C = 83$) $\Delta = 7$ |
|  | 1 + 100 | $E^A = 30$ ($E^C = 15$) $\Delta = 15$ |

| Active ingredient | Application rate g a.i./ha | Herbicidal action 28 DAT against *Viola tricolor* |
|---|---|---|
| A1 | 16 | 70 |
|  | 4 | 50 |
|  | 1 | 15 |
| (B2.58) | 900 | 0 |
|  | 300 | 20 |
| A1 + (B2.58) Propyzamide | 16 + 900 | $E^A = 95$ ($E^C = 70$) $\Delta = 25$ |
|  | 16 + 300 | $E^A = 95$ ($E^C = 76$) $\Delta = 19$ |
|  | 4 + 900 | $E^A = 95$ ($E^C = 50$) $\Delta = 45$ |
|  | 1 + 900 | $E^A = 95$ ($E^C = 15$) $\Delta = 80$ |

| Active ingredient | Application rate g a.i./ha | Herbicidal action 28 DAT against *Bromus sterilis* |
|---|---|---|
| A1 | 4 | 60 |
|  | 1 | 25 |
| (B4.22) Pyrasulfotole | 45 | 20 |
|  | 15 | 10 |
| A1 + (B4.22) Pyrasulfotole | 4 + 45 | $E^A = 90$ ($E^C = 68$) $\Delta = 22$ |
|  | 4 + 15 | $E^A = 80$ ($E^C = 64$) $\Delta = 16$ |
|  | 1 + 45 | $E^A = 55$ ($E^C = 40$) $\Delta = 15$ |
|  | 1 + 15 | $E^A = 50$ ($E^C = 33$) $\Delta = 17$ |

| Active ingredient | Application rate g a.i./ha | Herbicidal action 28 DAT against *Centaurea cyanus* |
|---|---|---|
| A1 | 4 | 15 |
|  | 1 | 0 |
| (B4.22) Pyrasulfotole | 5 | 0 |
|  | 45 | 15 |
|  | 15 | 10 |
| A1 + (B4.22) Pyrasulfotole | 4 + 5 | $E^A = 25$ ($E^C = 15$) $\Delta = 10$ |
|  | 1 + 45 | $E^A = 30$ ($E^C = 15$) $\Delta = 15$ |
|  | 1 + 15 | $E^A = 15$ ($E^C = 10$) $\Delta = 5$ |
|  | 1 + 5 | $E^A = 25$ ($E^C = 0$) $\Delta = 25$ |

| Active ingredient | Application rate g a.i./ha | Herbicidal action 28 DAT against *Galium aparine* |
|---|---|---|
| A1 | 1 | 20 |
| (B4.22) Pyrasulfotole | 45 | 60 |
|  | 15 | 0 |
|  | 5 | 0 |
| A1 + (B4.22) Pyrasulfotole | 1 + 45 | $E^A = 95$ ($E^C = 68$) $\Delta = 27$ |
|  | 1 + 15 | $E^A = 40$ ($E^C = 20$) $\Delta = 20$ |
|  | 1 + 5 | $E^A = 35$ ($E^C = 20$) $\Delta = 15$ |

| Active ingredient | Application rate g a.i./ha | Herbicidal action 28 DAT against *Lolium rigidum* (resistant biotype) |
|---|---|---|
| A1 | 16 | 40 |
| (B4.22) Pyrasulfotole | 15 | 0 |
|  | 5 | 0 |
| A1 + (B4.22) Pyrasulfotole | 16 + 15 | $E^A = 50$ ($E^C = 40$) $\Delta = 10$ |
|  | 16 + 5 | $E^A = 60$ ($E^C = 40$) $\Delta = 20$ |

| Active ingredient | Application rate g a.i./ha | Herbicidal action 28 DAT against *Matricaria inodora* |
|---|---|---|
| A1 | 16 | 65 |
|  | 4 | 40 |
| (B4.22) Pyrasulfotole | 45 | 15 |
|  | 15 | 0 |
|  | 5 | 0 |
| A1 + (B4.22) Pyrasulfotole | 16 + 45 | $E^A = 98$ ($E^C = 70$) $\Delta = 28$ |
|  | 16 + 15 | $E^A = 80$ ($E^C = 65$) $\Delta = 15$ |
|  | 16 + 5 | $E^A = 80$ ($E^C = 65$) $\Delta = 15$ |
|  | 4 + 45 | $E^A = 80$ ($E^C = 49$) $\Delta = 31$ |
|  | 4 + 15 | $E^A = 70$ ($E^C = 40$) $\Delta = 30$ |
|  | 4 + 5 | $E^A = 50$ ($E^C = 40$) $\Delta = 10$ |

| Active ingredient | Application rate g a.i./ha | Herbicidal action 28 DAT against *Phalaris minor* |
|---|---|---|
| A1 | 4 | 65 |
|  | 1 | 25 |
| (B4.22) Pyrasulfotole | 5 | 0 |
| A1 + (B4.22) Pyrasulfotole | 4 + 5 | $E^A = 70$ ($E^C = 65$) $\Delta = 5$ |
|  | 1 + 5 | $E^A = 30$ ($E^C = 25$) $\Delta = 5$ |

| Active ingredient | Application rate g a.i./ha | Herbicidal action 28 DAT against *Poa annua* L. |
|---|---|---|
| A1 | 4 | 70 |
| (B4.22) Pyrasulfotole | 15 | 0 |
|  | 5 | 0 |
| A1 + (B4.22) Pyrasulfotole | 4 + 15 | $E^A = 80$ ($E^C = 70$) $\Delta = 10$ |
|  | 4 + 5 | $E^A = 97$ ($E^C = 70$) $\Delta = 27$ |

| Active ingredient | Application rate g a.i./ha | Herbicidal action 28 DAT against *Veronica hederifolia* |
|---|---|---|
| A1 | 1 | 15 |
| (B4.22) Pyrasulfotole | 45 | 65 |
|  | 5 | 10 |
| A1 + (B4.22) Pyrasulfotole | 1 + 45 | $E^A = 97$ ($E^C = 70$) $\Delta = 27$ |
|  | 1 + 5 | $E^A = 70$ ($E^C = 24$) $\Delta = 46$ |

TABLE 3.3-continued

Synergistic effect (Δ) for herbicidal binary compositions comprising herbicide A1, applied by the post-emergence method

| Active ingredient | Application rate g a.i./ha | Herbicidal action 28 DAT against *Alopecurus myosuroides* |
|---|---|---|
| A1 | 1 | 15 |
| (B2.68) Thiencarbazone [CAS 317815-83-1] | 1.5 | 40 |
| A1 + (B2.68) Thiencarbazone [CAS 317815-83-1] | 1 + 1.5 | $E^A = 65$ ($E^C = 49$) $\Delta = 16$ |

| Active ingredient | Application rate g a.i./ha | Herbicidal action 28 DAT against *Bromus sterilis* |
|---|---|---|
| A1 | 4 | 60 |
|  | 1 | 25 |
| (B2.68) Thiencarbazone [CAS 317815-83-1] | 1.5 | 25 |
|  | 0.5 | 20 |
| A1 + (B2.68) Thiencarbazone [CAS 317815-83-1] | 4 + 1.5 | $E^A = 90$ ($E^C = 70$) $\Delta = 20$ |
|  | 4 + 0.5 | $E^A = 90$ ($E^C = 68$) $\Delta = 22$ |
|  | 1 + 0.5 | $E^A = 70$ ($E^C = 40$) $\Delta = 30$ |

| Active ingredient | Application rate g a.i./ha | Herbicidal action 28 DAT against *Centaurea cyanus* |
|---|---|---|
| A1 | 4 | 15 |
|  | 1 | 0 |
| (B2.68) Thiencarbazone [CAS 317815-83-1] | 0.5 | 10 |
|  | 1.5 | 20 |
|  | 0.17 | 15 |
| A1 + (B2.68) Thiencarbazone [CAS 317815-83-1] | 4 + 0.5 | $E^A = 30$ ($E^C = 24$) $\Delta = 6$ |
|  | 1 + 1.5 | $E^A = 35$ ($E^C = 20$) $\Delta = 15$ |
|  | 1 + 0.5 | $E^A = 25$ ($E^C = 10$) $\Delta = 15$ |
|  | 1 + 0.17 | $E^A = 20$ ($E^C = 15$) $\Delta = 5$ |

| Active ingredient | Application rate g a.i./ha | Herbicidal action 28 DAT against *Galium aparine* |
|---|---|---|
| A1 | 1 | 20 |
| (B2.68) Thiencarbazone [CAS 317815-83-1] | 1.5 | 35 |
|  | 0.5 | 0 |
|  | 0.17 | 30 |
| A1 + (B2.68) Thiencarbazone [CAS 317815-83-1] | 1 + 1.5 | $E^A = 75$ ($E^C = 48$) $\Delta = 27$ |
|  | 1 + 0.5 | $E^A = 25$ ($E^C = 20$) $\Delta = 5$ |
|  | 1 + 0.17 | $E^A = 50$ ($E^C = 44$) $\Delta = 6$ |

| Active ingredient | Application rate g a.i./ha | Herbicidal action 28 DAT against *Lolium rigidum* (resistant biotype) |
|---|---|---|
| A1 | 16 | 40 |
| (B2.68) Thiencarbazone [CAS 317815-83-1] | 0.17 | 10 |
| A1 + (B2.68) Thiencarbazone [CAS 317815-83-1] | 16 + 0.17 | $E^A = 65$ ($E^C = 46$) $\Delta = 19$ |

| Active ingredient | Application rate g a.i./ha | Herbicidal action 28 DAT against *Matricaria inodora* |
|---|---|---|
| A1 | 4 | 40 |
| (B2.68) Thiencarbazone [CAS 317815-83-1] | 0.5 | 30 |
| A1 + (B2.68) Thiencarbazone [CAS 317815-83-1] | 4 + 0.5 | $E^A = 80$ ($E^C = 58$) $\Delta = 22$ |

| Active ingredient | Application rate g a.i./ha | Herbicidal action 28 DAT against *Phalaris minor* |
|---|---|---|
| A1 | 4 | 65 |
| (B2.68) Thiencarbazone [CAS 317815-83-1] | 0.5 | 25 |
| A1 + (B2.68) Thiencarbazone [CAS 317815-83-1] | 4 + 0.5 | $E^A = 97$ ($E^C = 74$) $\Delta = 23$ |

| Active ingredient | Application rate g a.i./ha | Herbicidal action 28 DAT against *Poa annua* L. |
|---|---|---|
| A1 | 4 | 70 |
| (B2.68) Thiencarbazone [CAS 317815-83-1] | 0.5 | 25 |
| A1 + (B2.68) Thiencarbazone [CAS 317815-83-1] | 4 + 0.5 | $E^A = 98$ ($E^C = 78$) $\Delta = 20$ |

| Active ingredient | Application rate g a.i./ha | Herbicidal action 28 DAT against *Veronica hederifolia* |
|---|---|---|
| A1 | 1 | 15 |
| (B2.68) Thiencarbazone [CAS 317815-83-1] | 0.5 | 40 |
| A1 + (B2.68) Thiencarbazone [CAS 317815-83-1] | 1 + 0.5 | $E^A = 65$ ($E^C = 49$) $\Delta = 16$ |

| Active ingredient | Application rate g a.i./ha | Herbicidal action 28 DAT against *Viola tricolor* |
|---|---|---|
| A1 | 4 | 50 |
|  | 1 | 15 |
| (B2.68) Thiencarbazone [CAS 317815-83-1] | 1.5 | 20 |
| A1 + (B2.68) Thiencarbazone [CAS 317815-83-1] | 4 + 1.5 | $E^A = 95$ ($E^C = 60$) $\Delta = 35$ |
|  | 1 + 1.5 | $E^A = 80$ ($E^C = 32$) $\Delta = 48$ |

TABLE 3.4

Synergistic effect (Δ) for herbicidal binary compositions comprising herbicide A8, applied by the post-emergence method

| Active ingredient | Application rate g a.i./ha | Herbicidal action 28 DAT against *Alopecurus myosuroides* |
|---|---|---|
| A8 | 16 | 80 |
|  | 4 | 35 |
| (B2.18) Diflufenican | 270 | 30 |
|  | 90 | 15 |
|  | 30 | 10 |
| A8 + (B2.18) Diflufenican | 16 + 270 | $E^A = 93$ ($E^C = 86$) $\Delta = 7$ |
|  | 16 + 90 | $E^A = 95$ ($E^C = 83$) $\Delta = 12$ |
|  | 4 + 30 | $E^A = 50$ ($E^C = 42$) $\Delta = 8$ |

| Active ingredient | Application rate g a.i./ha | Herbicidal action 28 DAT against *Bromus sterilis* |
|---|---|---|
| A8 | 4 | 35 |
| (B2.18) Diflufenican | 270 | 20 |
|  | 90 | 15 |
|  | 30 | 0 |
| A8 + (B2.18) Diflufenican | 4 + 270 | $E^A = 80$ ($E^C = 48$) $\Delta = 32$ |
|  | 4 + 90 | $E^A = 95$ ($E^C = 45$) $\Delta = 50$ |
|  | 4 + 30 | $E^A = 60$ ($E^C = 35$) $\Delta = 25$ |

TABLE 3.4-continued

Synergistic effect (Δ) for herbicidal binary compositions comprising herbicide A8, applied by the post-emergence method

| Active ingredient | Application rate g a.i./ha | Herbicidal action 28 DAT against *Galium aparine* |
|---|---|---|
| A8 | 1 | 25 |
| (B2.18) Diflufenican | 270 | 60 |
| A8 + (B2.18) Diflufenican | 1 + 270 | $E^A = 75$ ($E^C = 70$) Δ = 5 |

| Active ingredient | Application rate g a.i./ha | Herbicidal action 28 DAT against *Lamium purpureum* L. |
|---|---|---|
| A8 | 16 | 80 |
|  | 4 | 50 |
| (B2.18) Diflufenican | 270 | 20 |
|  | 90 | 20 |
| A8 + (B2.18) Diflufenican | 16 + 270 | $E^A = 97$ ($E^C = 84$) Δ = 13 |
|  | 16 + 90 | $E^A = 98$ ($E^C = 84$) Δ = 14 |
|  | 4 + 270 | $E^A = 100$ ($E^C = 60$) Δ = 40 |
|  | 4 + 90 | $E^A = 97$ ($E^C = 60$) Δ = 37 |

| Active ingredient | Application rate g a.i./ha | Herbicidal action 28 DAT against *Lolium rigidum* |
|---|---|---|
| A8 | 16 | 40 |
| (B2.18) Diflufenican | 270 | 20 |
|  | 90 | 10 |
|  | 30 | 0 |
| A8 + (B2.18) Diflufenican | 16 + 270 | $E^A = 60$ ($E^C = 52$) Δ = 8 |
|  | 16 + 90 | $E^A = 80$ ($E^C = 46$) Δ = 34 |
|  | 16 + 30 | $E^A = 60$ ($E^C = 40$) Δ = 20 |

| Active ingredient | Application rate g a.i./ha | Herbicidal action 28 DAT against *Lolium rigidum* (resistant biotype) |
|---|---|---|
| A8 | 4 | 20 |
| (B2.18) Diflufenican | 30 | 0 |
| A8 + (B2.18) Diflufenican | 4 + 30 | $E^A = 25$ ($E^C = 20$) Δ = 5 |

| Active ingredient | Application rate g a.i./ha | Herbicidal action 28 DAT against *Matricaria inodora* |
|---|---|---|
| A8 | 16 | 80 |
|  | 4 | 40 |
| (B2.18) Diflufenican | 270 | 15 |
|  | 90 | 15 |
| A8 + (B2.18) Diflufenican | 16 + 270 | $E^A = 98$ ($E^C = 83$) Δ = 15 |
|  | 16 + 90 | $E^A = 97$ ($E^C = 83$) Δ = 14 |
|  | 4 + 270 | $E^A = 85$ ($E^C = 49$) Δ = 36 |

| Active ingredient | Application rate g a.i./ha | Herbicidal action 28 DAT against *Phalaris minor* |
|---|---|---|
| A8 | 16 | 60 |
|  | 1 | 0 |
| (B2.18) Diflufenican | 30 | 10 |
| A8 + (B2.18) Diflufenican | 16 + 30 | $E^A = 80$ ($E^C = 64$) Δ = 16 |
|  | 1 + 30 | $E^A = 15$ ($E^C = 10$) Δ = 5 |

| Active ingredient | Application rate g a.i./ha | Herbicidal action 28 DAT against *Poa annua* L. |
|---|---|---|
| A8 | 16 | 40 |
|  | 4 | 20 |
| (B2.18) Diflufenican | 270 | 25 |
|  | 90 | 20 |
|  | 30 | 0 |
| A8 + (B2.18) Diflufenican | 16 + 270 | $E^A = 70$ ($E^C = 55$) Δ = 15 |
|  | 16 + 90 | $E^A = 65$ ($E^C = 52$) Δ = 13 |
|  | 16 + 30 | $E^A = 93$ ($E^C = 40$) Δ = 53 |
|  | 4 + 270 | $E^A = 90$ ($E^C = 40$) Δ = 50 |
|  | 4 + 90 | $E^A = 65$ ($E^C = 36$) Δ = 29 |
|  | 4 + 30 | $E^A = 85$ ($E^C = 20$) Δ = 65 |

| Active ingredient | Application rate g a.i./ha | Herbicidal action 28 DAT against *Veronica hederifolia* |
|---|---|---|
| A8 | 16 | 35 |
|  | 4 | 80 |
| (B2.18) Diflufenican | 270 | 40 |
|  | 90 | 20 |
|  | 30 | 40 |
| A8 + (B2.18) Diflufenican | 16 + 270 | $E^A = 98$ ($E^C = 61$) Δ = 37 |
|  | 16 + 90 | $E^A = 65$ ($E^C = 48$) Δ = 17 |
|  | 16 + 30 | $E^A = 97$ ($E^C = 61$) Δ = 36 |
|  | 4 + 270 | $E^A = 97$ ($E^C = 88$) Δ = 9 |
|  | 4 + 30 | $E^A = 97$ ($E^C = 88$) Δ = 9 |

| Active ingredient | Application rate g a.i./ha | Herbicidal action 28 DAT against *Viola tricolor* |
|---|---|---|
| A8 | 4 | 0 |
|  | 1 | 20 |
| (B2.18) Diflufenican | 90 | 75 |
|  | 30 | 65 |
| A8 + (B2.18) Diflufenican | 4 + 90 | $E^A = 100$ ($E^C = 75$) Δ = 25 |
|  | 4 + 30 | $E^A = 100$ ($E^C = 65$) Δ = 35 |
|  | 1 + 90 | $E^A = 100$ ($E^C = 80$) Δ = 20 |
|  | 1 + 30 | $E^A = 100$ ($E^C = 72$) Δ = 28 |

| Active ingredient | Application rate g a.i./ha | Herbicidal action 28 DAT against *Alopecurus myosuroides* |
|---|---|---|
| A8 | 16 | 80 |
| (B7.4) Glufosinate [CAS 77182-82-2] | 540 | 40 |
|  | 60 | 15 |
| A8 + (B7.4) Glufosinate [CAS 77182-82-2] | 16 + 540 | $E^A = 97$ ($E^C = 88$) Δ = 9 |
|  | 16 + 60 | $E^A = 93$ ($E^C = 83$) Δ = 10 |

| Active ingredient | Application rate g a.i./ha | Herbicidal action 28 DAT against *Bromus sterilis* |
|---|---|---|
| A8 | 4 | 35 |
| (B7.4) Glufosinate [CAS 77182-82-2] | 540 | 35 |
|  | 180 | 25 |
|  | 60 | 0 |
| A8 + (B7.4) Glufosinate [CAS 77182-82-2] | 4 + 540 | $E^A = 95$ ($E^C = 58$) Δ = 37 |
|  | 4 + 180 | $E^A = 65$ ($E^C = 51$) Δ = 14 |
|  | 4 + 60 | $E^A = 70$ ($E^C = 35$) Δ = 35 |

| Active ingredient | Application rate g a.i./ha | Herbicidal action 28 DAT against *Lamium purpureum* L. |
|---|---|---|
| A8 | 16 | 80 |
|  | 4 | 50 |
| (B7.4) Glufosinate [CAS 77182-82-2] | 60 | 0 |
| A8 + (B7.4) Glufosinate [CAS 77182-82-2] | 16 + 60 | $E^A = 98$ ($E^C = 80$) Δ = 18 |
|  | 4 + 60 | $E^A = 70$ ($E^C = 50$) Δ = 20 |

| Active ingredient | Application rate g a.i./ha | Herbicidal action 28 DAT against *Lolium rigidum* |
|---|---|---|
| A8 | 16 | 40 |
|  | 4 | 20 |
| (B7.4) Glufosinate [CAS 77182-82-2] | 540 | 30 |
|  | 180 | 10 |
| A8 + (B7.4) Glufosinate [CAS 77182-82-2] | 16 + 540 | $E^A = 98$ ($E^C = 58$) Δ = 40 |
|  | 16 + 180 | $E^A = 70$ ($E^C = 46$) Δ = 24 |
|  | 4 + 540 | $E^A = 50$ ($E^C = 44$) Δ = 6 |
|  | 4 + 180 | $E^A = 50$ ($E^C = 28$) Δ = 22 |

TABLE 3.4-continued

Synergistic effect (Δ) for herbicidal binary compositions comprising herbicide A8, applied by the post-emergence method

| Active ingredient | Application rate g a.i./ha | Herbicidal action 28 DAT against *Phalaris minor* |
|---|---|---|
| A8 | 16 | 60 |
| (B7.4) Glufosinate [CAS 77182-82-2] | 540 | 25 |
|  | 180 | 15 |
|  | 60 | 0 |
| A8 + (B7.4) Glufosinate [CAS 77182-82-2] | 16 + 540 | $E^A = 97$ ($E^C = 70$) $\Delta = 27$ |
|  | 16 + 180 | $E^A = 80$ ($E^C = 66$) $\Delta = 14$ |
|  | 16 + 60 | $E^A = 80$ ($E^C = 60$) $\Delta = 20$ |

| Active ingredient | Application rate g a.i./ha | Herbicidal action 28 DAT against *Poa annua* L. |
|---|---|---|
| A8 | 16 | 40 |
|  | 4 | 20 |
|  | 1 | 20 |
| (B7.4) Glufosinate [CAS 77182-82-2] | 540 | 15 |
|  | 180 | 0 |
|  | 60 | 0 |
| A8 + (B7.4) Glufosinate [CAS 77182-82-2] | 16 + 540 | $E^A = 97$ ($E^C = 49$) $\Delta = 48$ |
|  | 16 + 180 | $E^A = 90$ ($E^C = 40$) $\Delta = 50$ |
|  | 4 + 540 | $E^A = 100$ ($E^C = 32$) $\Delta = 68$ |
|  | 4 + 180 | $E^A = 95$ ($E^C = 20$) $\Delta = 75$ |
|  | 4 + 60 | $E^A = 30$ ($E^C = 20$) $\Delta = 10$ |
|  | 1 + 540 | $E^A = 40$ ($E^C = 32$) $\Delta = 8$ |

| Active ingredient | Application rate g a.i./ha | Herbicidal action 28 DAT against *Veronica hederifolia* |
|---|---|---|
| A8 | 16 | 35 |
|  | 1 | 20 |
| (B7.4) Glufosinate [CAS 77182-82-2] | 540 | 90 |
|  | 60 | 40 |
|  | 180 | 70 |
| A8 + (B7.4) Glufosinate [CAS 77182-82-2] | 16 + 540 | $E^A = 100$ ($E^C = 94$) $\Delta = 6$ |
|  | 16 + 60 | $E^A = 70$ ($E^C = 61$) $\Delta = 9$ |
|  | 1 + 540 | $E^A = 100$ ($E^C = 92$) $\Delta = 8$ |
|  | 1 + 180 | $E^A = 95$ ($E^C = 76$) $\Delta = 19$ |

| Active ingredient | Application rate g a.i./ha | Herbicidal action 28 DAT against *Viola tricolor* |
|---|---|---|
| A8 | 4 | 0 |
| (B7.4) Glufosinate [CAS 77182-82-2] | 60 | 10 |
| A8 + (B7.4) Glufosinate [CAS 77182-82-2] | 4 + 60 | $E^A = 50$ ($E^C = 10$) $\Delta = 40$ |

| Active ingredient | Application rate g a.i./ha | Herbicidal action 28 DAT against *Alopecurus myosuroides* |
|---|---|---|
| A8 | 16 | 80 |
| (B7.5) Glyphosate [CAS 38641-94-0] | 150 | 25 |
| A8 + (B7.5) Glyphosate [CAS 38641-94-0] | 16 + 150 | $E^A = 93$ ($E^C = 85$) $\Delta = 8$ |

| Active ingredient | Application rate g a.i./ha | Herbicidal action 28 DAT against *Bromus sterilis* |
|---|---|---|
| A8 | 4 | 35 |
|  | 1 | 15 |
| (B7.5) Glyphosate [CAS 38641-94-0] | 450 | 50 |
|  | 150 | 20 |
|  | 50 | 0 |
| A8 + (B7.5) Glyphosate [CAS 38641-94-0] | 4 + 450 | $E^A = 98$ ($E^C = 68$) $\Delta = 30$ |
|  | 4 + 150 | $E^A = 95$ ($E^C = 48$) $\Delta = 47$ |
|  | 4 + 50 | $E^A = 65$ ($E^C = 35$) $\Delta = 30$ |
|  | 1 + 50 | $E^A = 20$ ($E^C = 15$) $\Delta = 5$ |

| Active ingredient | Application rate g a.i./ha | Herbicidal action 28 DAT against *Centaurea cyanus* |
|---|---|---|
| A8 | 1 | 30 |
| (B7.5) Glyphosate [CAS 38641-94-0] | 450 | 65 |
| A8 + (B7.5) Glyphosate [CAS 38641-94-0] | 1 + 450 | $E^A = 97$ ($E^C = 76$) $\Delta = 21$ |

| Active ingredient | Application rate g a.i./ha | Herbicidal action 28 DAT against *Galium aparine* |
|---|---|---|
| A8 | 1 | 25 |
| (B7.5) Glyphosate [CAS 38641-94-0] | 450 | 40 |
| A8 + (B7.5) Glyphosate [CAS 38641-94-0] | 1 + 450 | $E^A = 60$ ($E^C = 55$) $\Delta = 5$ |

| Active ingredient | Application rate g a.i./ha | Herbicidal action 28 DAT against *Lolium rigidum* |
|---|---|---|
| A8 | 16 | 40 |
|  | 4 | 20 |
| (B7.5) Glyphosate [CAS 38641-94-0] | 450 | 35 |
|  | 150 | 30 |
|  | 50 | 0 |
| A8 + (B7.5) Glyphosate [CAS 38641-94-0] | 16 + 450 | $E^A = 70$ ($E^C = 61$) $\Delta = 9$ |
|  | 16 + 150 | $E^A = 85$ ($E^C = 58$) $\Delta = 27$ |
|  | 16 + 50 | $E^A = 70$ ($E^C = 40$) $\Delta = 30$ |
|  | 4 + 450 | $E^A = 60$ ($E^C = 48$) $\Delta = 12$ |
|  | 4 + 50 | $E^A = 25$ ($E^C = 20$) $\Delta = 5$ |

| Active ingredient | Application rate g a.i./ha | Herbicidal action 28 DAT against *Matricaria inodora* |
|---|---|---|
| A8 | 16 | 80 |
|  | 4 | 40 |
|  | 1 | 35 |
| (B7.5) Glyphosate [CAS 38641-94-0] | 450 | 20 |
|  | 50 | 0 |
|  | 150 | 0 |
| A8 + (B7.5) Glyphosate [CAS 38641-94-0] | 16 + 450 | $E^A = 95$ ($E^C = 84$) $\Delta = 11$ |
|  | 4 + 450 | $E^A = 70$ ($E^C = 52$) $\Delta = 18$ |
|  | 4 + 50 | $E^A = 65$ ($E^C = 40$) $\Delta = 25$ |
|  | 1 + 150 | $E^A = 70$ ($E^C = 35$) $\Delta = 35$ |
|  | 1 + 50 | $E^A = 40$ ($E^C = 35$) $\Delta = 5$ |

| Active ingredient | Application rate g a.i./ha | Herbicidal action 28 DAT against *Phalaris minor* |
|---|---|---|
| A8 | 16 | 60 |
|  | 1 | 0 |
| (B7.5) Glyphosate [CAS 38641-94-0] | 450 | 20 |
|  | 150 | 10 |
|  | 50 | 0 |
| A8 + (B7.5) Glyphosate [CAS 38641-94-0] | 16 + 450 | $E^A = 75$ ($E^C = 68$) $\Delta = 7$ |
|  | 16 + 150 | $E^A = 75$ ($E^C = 64$) $\Delta = 11$ |
|  | 16 + 50 | $E^A = 80$ ($E^C = 60$) $\Delta = 20$ |
|  | 1 + 450 | $E^A = 25$ ($E^C = 20$) $\Delta = 5$ |

| Active ingredient | Application rate g a.i./ha | Herbicidal action 28 DAT against *Poa annua* L. |
|---|---|---|
| A8 | 16 | 40 |
|  | 4 | 20 |
|  | 1 | 20 |
| (B7.5) Glyphosate [CAS 38641-94-0] | 50 | 0 |
|  | 450 | 40 |
|  | 150 | 40 |

TABLE 3.4-continued

Synergistic effect (Δ) for herbicidal binary compositions comprising herbicide A8, applied by the post-emergence method

| | | |
|---|---|---|
| A8 + (B7.5) Glyphosate | 16 + 50 | $E^A = 56$ ($E^C = 40$) Δ = 16 |
| [CAS 38641-94-0] | 4 + 450 | $E^A = 65$ ($E^C = 52$) Δ = 13 |
| | 4 + 150 | $E^A = 80$ ($E^C = 52$) Δ = 28 |
| | 4 + 50 | $E^A = 40$ ($E^C = 20$) Δ = 20 |
| | 1 + 450 | $E^A = 60$ ($E^C = 52$) Δ = 8 |

| Active ingredient | Application rate g a.i./ha | Herbicidal action 28 DAT against *Veronica hederifolia* |
|---|---|---|
| A8 | 16 | 35 |
| | 1 | 20 |
| (B7.5) Glyphosate | 450 | 60 |
| [CAS 38641-94-0] | 50 | 15 |
| A8 + (B7.5) Glyphosate | 16 + 450 | $E^A = 90$ ($E^C = 74$) Δ = 16 |
| [CAS 38641-94-0] | 16 + 50 | $E^A = 60$ ($E^C = 45$) Δ = 15 |
| | 1 + 450 | $E^A = 95$ ($E^C = 68$) Δ = 27 |
| | 1 + 50 | $E^A = 90$ ($E^C = 32$) Δ = 58 |

| Active ingredient | Application rate g a.i./ha | Herbicidal action 28 DAT against *Viola tricolor* |
|---|---|---|
| A8 | 16 | 15 |
| | 4 | 0 |
| | 1 | 20 |
| (B7.5) Glyphosate | 450 | 10 |
| [CAS 38641-94-0] | 150 | 0 |
| | 50 | 0 |
| A8 + (B7.5) Glyphosate | 16 + 450 | $E^A = 50$ ($E^C = 24$) Δ = 26 |
| [CAS 38641-94-0] | 16 + 150 | $E^A = 20$ ($E^C = 15$) Δ = 5 |
| | 16 + 50 | $E^A = 20$ ($E^C = 15$) Δ = 5 |
| | 4 + 450 | $E^A = 40$ ($E^C = 10$) Δ = 30 |
| | 4 + 150 | $E^A = 30$ ($E^C = 0$) Δ = 30 |
| | 4 + 50 | $E^A = 15$ ($E^C = 0$) Δ = 15 |
| | 1 + 450 | $E^A = 60$ ($E^C = 28$) Δ = 32 |
| | 1 + 50 | $E^A = 30$ ($E^C = 20$) Δ = 10 |

The invention claimed is:

1. A composition comprising:
a component (A) selected from A1 and A8, or an agrochemically acceptable salt thereof, where components A1 and A8 are defined as follows:

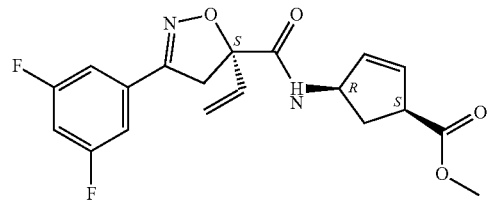

A1

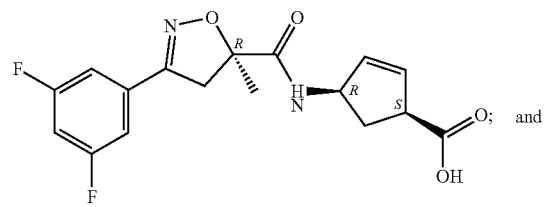

A8; and one or more components (B) selected from:

| (B2.18) | diflufenican, |
|---|---|
| (B2.28) | flufenacet, |
| (B2.31) | foramsulfuron, |
| (B2.37) | mesosulfuron, |
| (B2.58) | propyzamide, |
| (B2.68) | thiencarbazone, |
| (B3.1) | bromoxynil, |
| (B4.22) | pyrasulfotole, |
| (B5.31) | halauxifen, |
| (B7.4) | glufosinate, |
| (B7.5) | glyphosate, and |
| (B11.6) | Indaziflam. |

2. The herbicidal composition according to claim 1, comprising the active ingredient components (A) and (B) in a weight ratio of from 1:100 000 to 2000:1.

3. The herbicidal composition according to claim 1, comprising the active ingredient components (A) and (B) in a weight ratio of from 1:15 000 to 500:1.

4. The herbicidal composition according to claim 3, further comprising one or more additional active crop protection ingredients.

5. A herbicidal product comprising the herbicidal composition according to claim 4 and one or more additives customary in crop protection.

* * * * *